(12) United States Patent
Sakuragi et al.

(10) Patent No.: US 10,995,167 B2
(45) Date of Patent: May 4, 2021

(54) METALLOCENE COMPOUND, CATALYST COMPONENT FOR OLEFIN POLYMERIZATION AND CATALYST FOR OLEFIN POLYMERIZATION CONTAINING THE SAME, AND METHOD FOR PRODUCING OLEFIN POLYMER USING CATALYST FOR OLEFIN POLYMERIZATION

(71) Applicant: JAPAN POLYETHYLENE CORPORATION, Tokyo (JP)

(72) Inventors: Tsutomu Sakuragi, Mie (JP); Yoshiyuki Ishihama, Mie (JP)

(73) Assignee: JAPAN POLYETHYLENE CORPORATION, Tokyo (JP)

( * ) Notice: Subject to any disclaimer, the term of this patent is extended or adjusted under 35 U.S.C. 154(b) by 11 days.

(21) Appl. No.: 16/084,787

(22) PCT Filed: Mar. 10, 2017

(86) PCT No.: PCT/JP2017/009833
§ 371 (c)(1),
(2) Date: Sep. 13, 2018

(87) PCT Pub. No.: WO2017/159578
PCT Pub. Date: Sep. 21, 2017

(65) Prior Publication Data
US 2019/0092887 A1 Mar. 28, 2019

(30) Foreign Application Priority Data
Mar. 15, 2016 (JP) .............................. JP2016-051152

(51) Int. Cl.
*C07F 17/00* (2006.01)
*C08F 4/6592* (2006.01)
*C08F 210/16* (2006.01)
*C08F 4/659* (2006.01)

(52) U.S. Cl.
CPC ............ *C08F 210/16* (2013.01); *C07F 17/00* (2013.01); *C08F 4/65912* (2013.01); *C08F 4/65916* (2013.01); *C08F 2420/01* (2013.01)

(58) Field of Classification Search
CPC ...... C07F 17/00; C08F 4/65927; C08F 10/02; C08F 210/16
See application file for complete search history.

(56) References Cited

U.S. PATENT DOCUMENTS

| | | |
|---|---|---|
| 2003/0171211 A1 | 9/2003 | Holtcamp |
| 2004/0127348 A1 | 7/2004 | Holtcamp et al. |
| 2005/0075242 A1 | 4/2005 | Holtcamp et al. |
| 2014/0179872 A1 | 6/2014 | Fiscus et al. |
| 2014/0179884 A1 | 6/2014 | McCullough |
| 2019/0263942 A1 | 8/2019 | Jeong et al. |

FOREIGN PATENT DOCUMENTS

| | | |
|---|---|---|
| JP | H05-43619 A | 2/1993 |
| JP | H07-500622 A | 1/1995 |
| JP | H07-224079 A | 8/1995 |
| JP | H08-048711 A | 2/1996 |
| JP | 2005-539095 A | 12/2005 |
| JP | 2008-050278 A | 3/2008 |
| JP | 2011-137146 A | 7/2011 |
| JP | 2012-25664 A | 2/2012 |
| JP | 2012/116871 A | 6/2012 |
| JP | 2013-227271 A | 11/2013 |
| JP | 2014-070029 A | 4/2014 |
| JP | 2016-017039 A | 2/2016 |
| JP | 2016-172714 A | 9/2016 |
| WO | 93/08221 A2 | 4/1993 |
| WO | 03/064433 A1 | 8/2003 |
| WO | 2014/099303 A1 | 6/2014 |
| WO | 2014/099307 A1 | 6/2014 |
| WO | 2017/188602 A1 | 11/2017 |

OTHER PUBLICATIONS

Extended European Search Report dated Feb. 21, 2019 in the corresponding European patent application (Application No. 17766578.3).

Office Action in corresponding European Patent Application No. 17766578.3, dated Jul. 23, 2019.

International Search Report issued with respect to Patent Application No. PCT/JP2017/009833, dated May 16, 2017.

(Continued)

*Primary Examiner* — Caixia Lu

(74) *Attorney, Agent, or Firm* — Greenblum & Bernstein, P.L.C.

(57) ABSTRACT

The metallocene compound represented by the following general formula (1):

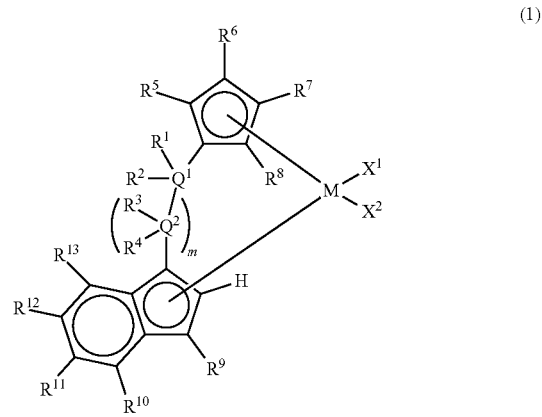

(the numerals and signs in the general formula (1) are as described in the description).

13 Claims, 1 Drawing Sheet

(56) References Cited

OTHER PUBLICATIONS

International Preliminary Report on Patentability issued with respect to Patent Application No. PCT/JP2017/009833, dated Sep. 18, 2018.
Office Action issued in corresponding European patent Application No. 17766578.3, dated Dec. 9, 2019.
Chinese Office Action, Chinese Patent Office, Application No. 201780017782.1, dated Mar. 23, 2020, with English translation thereof.
European Office Action, European Patent Office, Application No. 17766578.3, dated Apr. 6, 2020.
Chinese Office Action in corresponding Chinese Application No. 201780017782.1, dated Oct. 10, 2020 with English translation.
Notice of Reasons for Refusal, Japanese Patent Office, Application No. 2017-046245, dated Aug. 4, 2020, English translation thereof.

METALLOCENE COMPOUND, CATALYST COMPONENT FOR OLEFIN POLYMERIZATION AND CATALYST FOR OLEFIN POLYMERIZATION CONTAINING THE SAME, AND METHOD FOR PRODUCING OLEFIN POLYMER USING CATALYST FOR OLEFIN POLYMERIZATION

TECHNICAL FIELD

The present invention relates to a metallocene compound, a catalyst component for olefin polymerization and a catalyst for olefin polymerization containing the same, and a method for producing an olefin polymer using the catalyst for olefin polymerization. More specifically, the invention relates to a metallocene compound having a substituent on a cyclopentadienyl ring and having a bridged cyclopentadiene-indene as a basic skeleton, a catalyst component for olefin polymerization and a catalyst for olefin polymerization containing the same, and a method for producing an olefin polymer (particularly, ethylene-based polymer) using the catalyst for olefin polymerization.

BACKGROUND ART

As a method for improving molding processability of a metallocene-based polyethylene that is generally poor in molding processability, there are known a method of blending a high-pressure process low density polyethylene into the metallocene-based polyethylene and a method of introducing long-chain branches into polyethylene by a polymerization reaction using a specific metallocene. Since the former requires a blending step, production costs become high. Moreover, the resulting blend is excellent in molding processability but mechanical strength that is an advantage of the metallocene-based polyethylene decreases. On the other hand, there is known a method of using a bridged bisindenyl compound (see, for example, Patent Document 1) or a geometrical constraint half metallocene (see, for example, Patent Document 2) as the latter specific metallocene for introducing the long-chain branches.

Patent Document 3 reports that, when homopolymerization of ethylene is performed by solution polymerization using an asymmetric metallocene, in which a cyclopentadienyl group and an indenyl group were bridged with carbon, and methylaluminoxane, it is possible to produce a polyethylene having branches.

Moreover, Patent Document 4 reports polymerization of propylene by means of a polymerization catalyst obtained by combining an asymmetric metallocene compound in which a cyclopentadienyl group having a specific substituent and an indenyl group having a specific substituent are bridged and methylaluminoxane.

Furthermore, Patent Document 5 reports a catalyst system for producing an ethylene polymer and an ethylene/butene copolymer that are each useful as a macromonomer, using, among asymmetric metallocenes in which a cyclopentadienyl group and an indenyl group were bridged with silicon, a metallocene having methyl groups at the 2, 4, and 7 positions of the indenyl group and a modified clay compound.

Recently, the present inventors have proposed in Patent Document 6, among asymmetric metallocenes in which a cyclopentadienyl group and an indenyl group were bridged with a bridging group, a supported catalyst for olefin polymerization containing, as an essential component, a specific asymmetric metallocene having no substituent other than the bridging group on the cyclopentadienyl group and having an aryl group at the 4 position of the indenyl group and further, a method for producing an ethylene-based polymer having improved molding processability, using the supported catalyst for olefin polymerization.

Moreover, the present inventors have also proposed in Patent Documents 7 and 8 a supported catalyst for olefin polymerization containing an asymmetric metallocene in which a cyclopentadienyl group having various substituents and an indenyl group were bridged with a bridging group, as an essential component, and further, a method for producing an ethylene-based polymer using the supported catalyst for olefin polymerization.

Furthermore, Patent Document 9 proposes, among asymmetric metallocenes in which a cyclopentadienyl group and an indenyl group were bridged with a bridging group, a supported catalyst for olefin polymerization containing, as an essential component, a specific asymmetric metallocene having a linear alkyl group other than the bridging group on the cyclopentadienyl group and having an aryl group at the 3 position of the indenyl group and further, a method for producing an ethylene-based polymer with high activity using the supported catalyst for olefin polymerization.

Background Art Documents

Patent Documents

Patent Document 1: JP-A-08-048711
Patent Document 2: JP-T-07-500622
Patent Document 3: JP-A-05-043619
Patent Document 4: JP-A-07-224079
Patent Document 5: JP-A-2008-050278
Patent Document 6: JP-A-2011-137146
Patent Document 7: JP-A-2012-025664
Patent Document 8: JP-A-2014-070029
Patent Document 9: JP-A-2016-017039

SUMMARY OF THE INVENTION

Problems that the Invention is to Solve

However, according to Patent Documents 1 and 2, the number of terminal double bonds and long-chain branches in the resulting polymer are small and thus an effect of improving the molding processability is not yet sufficient.

According to Patent Document 3, the length of the branches is described to be a carbon number of 1 to 20 and the length of the branches is too short for exhibiting an effect of improving the molding processability as long-chain branches.

Patent Document 4 has no description of the formation of long-chain branches in the case of the application to the polymerization of ethylene. Further, in Patent Document 5, the number of the terminal double bonds of the polymer is small and there is no description of the formation of long-chain branches by the catalyst alone.

Moreover, according to Patent Document 6, since an ethylene-based polymer having a large degree of strain hardening of elongation viscosity is obtained, an improvement in molding processability is observed as compared with a conventional long-chain branch type polyethylene but it cannot be said that polymerization activity is sufficiently high. Even according to Patent Documents 7 and 8, from an industrial viewpoint, an improvement of the polymerization activity has been still required.

Furthermore, even according to Patent Document 9, as compared with the results showing relatively high activity among the conventional metallocenes shown as asymmetric metallocenes in which a cyclopentadienyl group and an indenyl group are bridged in Comparative Examples, the polymerization activity of Examples is about 2 to 3 times and thus it cannot be said that the polymerization activity is sufficiently high.

Under such circumstances, in the production of the metallocene-based polyethylene having sufficient number and length of long-chain branches introduced therein, it is required to develop a metallocene compound having sufficiently high polymerization activity from the industrial viewpoint, a catalyst component for olefin polymerization and a catalyst for olefin polymerization containing the same, and a method for producing an olefin polymer early.

Considering the problems in the above-described conventional techniques, in order to improve the molding processability of the metallocene-based polyethylene, an object of the present invention is to provide a metallocene compound capable of producing an ethylene-based polymer having sufficient number and length of long-chain branches introduced therein with high polymerization activity, and a catalyst component for olefin polymerization and a catalyst for olefin polymerization containing the same, and further a method for producing an olefin polymer (particularly, an ethylene-based polymer) using the catalyst for olefin polymerization.

Incidentally, in the present invention, the polyethylene is a generic name of an ethylene homopolymer and a copolymer of ethylene and an olefin to be mentioned later, and can be paraphrased as an ethylene-based polymer.

Means for Solving the Problems

As a result of extensive studies to solve the above-described problems, the present inventors have found that, when a metallocene compound having a specific substituent, that is, a metallocene compound in which a cyclopentadienyl ring having a specific number or more of substituents and an indenyl ring are bridged and which further has an aryl substituent or a heteroaryl substituent at the 4-position of the indenyl ring is used as a catalyst component for olefin polymerization and a catalyst composition obtained by combining the metallocene compound with a compound reacting with it to form a cationic metallocene compound and a fine particle carrier is used, a metallocene-based polyethylene having sufficient number and length of long-chain branches can be produced with high polymerization activity. Based on these findings, they have accomplished the present invention.

That is, the present invention provides:
[1] A metallocene compound represented by the following general formula (1):

[Chem 1]

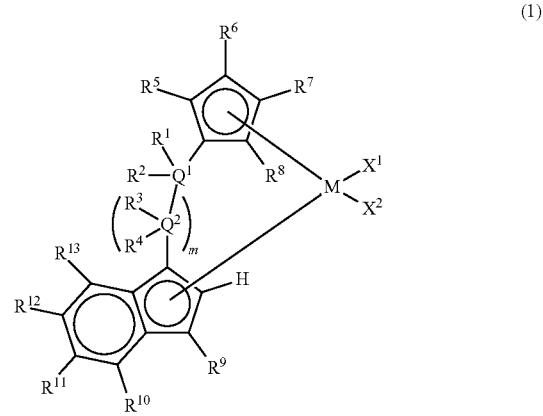

(1)

wherein M represents any transition metal of Ti, Zr, and Hf; $X^1$ and $X^2$ represent each independently a hydrogen atom, a halogen, a hydrocarbon group having a carbon number of 1 to 20, an oxygen or nitrogen-containing hydrocarbon group having a carbon number of 1 to 20, an amino group substituted with a hydrocarbon group having a carbon number of 1 to 20, or an alkoxy group having a carbon number of 1 to 20; $Q^1$ and $Q^2$ represent each independently a carbon atom, a silicon atom, or a germanium atom; $R^1$, $R^2$, $R^3$, and $R^4$ represent each independently a hydrogen atom or a hydrocarbon group having a carbon number of 1 to 10, and may form a ring together with at least one of $Q^1$ and $Q^2$ bonded thereto; m is 0 or 1 and, in the case where m is 0, $Q^1$ is directly bonded to a conjugated 5-membered ring containing $R^9$; $R^5$, $R^6$, $R^7$, $R^8$, $R^9$, $R^{11}$, $R^{12}$, and $R^{13}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen, sulfur, or nitrogen-containing hydrocarbon group having a carbon number of 1 to 20, or a silyl group substituted with a hydrocarbon group having a carbon number of 1 to 20; provided that at least three of $R^5$, $R^6$, $R^7$, and $R^8$ represent any of the above substituents other than a hydrogen atom; in the case where $R^{13}$ is any of the above substituents other than a hydrogen atom, $R^9$ represents any of the above substituents other than a hydrogen atom; and $R^{10}$ represents a substituted or unsubstituted aryl group represented by the following general formula (1-a):

[Chem 2]

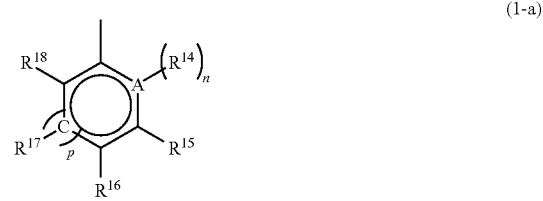

(1-a)

wherein A represents an atom of Group 14, 15, or 16 of the Periodic Table; $R^{14}$, $R^{15}$, $R^{16}$, $R^{17}$, and $R^{18}$ represent each independently a hydrogen atom, a halogen atom, a hydrocarbon group having a carbon number of 1 to 20, an oxygen, sulfur, or nitrogen-containing hydrocarbon group having a carbon number of 1 to 20, an amino group substituted with a hydrocarbon group having a carbon number of 1 to 20, an alkoxy group having a carbon number of 1 to 20, a silicon-containing hydrocarbon group having a carbon number of 1 to 18, which contains a silicon number of 1 to 6, a halogen-containing hydrocarbon group having a carbon number of 1 to 20, or a silyl group substituted with a hydrocarbon group having a carbon number of 1 to 20, and adjacent substituents of $R^{14}$, $R^{15}$, $R^{16}$, $R^{17}$, and $R^{18}$ may form a ring together with the atoms bonded thereto; n is 0 or 1 and, in the case where n is 0, the substituent $R^{14}$ is not present on A; p is 0 or 1 and, in the case where p is 0, $R^{17}$ and the carbon atom to which $R^{17}$ is bonded are not present and the carbon atom to which $R^{16}$ is bonded and the carbon atom to which $R^{18}$ is bonded are directly bonded.

[2] A metallocene compound represented by the following general formula (2):

[Chem 3]

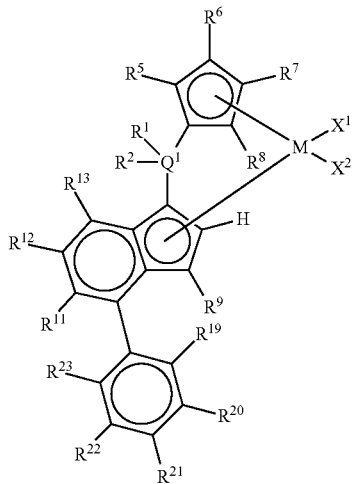

(2)

wherein M represents any transition metal of Ti, Zr, and Hf; $X^1$ and $X^2$ represent each independently a hydrogen atom, a halogen, a hydrocarbon group having a carbon number of 1 to 20, an oxygen or nitrogen-containing hydrocarbon group having a carbon number of 1 to 20, an amino group substituted with a hydrocarbon group having a carbon number of 1 to 20, or an alkoxy group having a carbon number of 1 to 20; $Q^1$ represents a carbon atom, a silicon atom, or a germanium atom; $R^1$ and $R^2$ represent each independently a hydrogen atom or a hydrocarbon group having a carbon number of 1 to 10, and may form a ring together with $Q^1$ bonded thereto; $R^5$, $R^6$, $R^7$, $R^8$, $R^9$, $R^{11}$, $R^{12}$, and $R^{13}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen, sulfur, or nitrogen-containing hydrocarbon group having a carbon number of 1 to 20, or a silyl group substituted with a hydrocarbon group having a carbon number of 1 to 20; provided that at least three of $R^5$, $R^6$, $R^7$, and $R^8$ represent any of the above substituents other than a hydrogen atom; in the case where $R^{13}$ is any of the above substituents other than a hydrogen atom, $R^9$ represents any of the above substituents other than a hydrogen atom; $R^{19}$, $R^{20}$, $R^{21}$, $R^{22}$, and $R^{23}$ represent each independently a hydrogen atom, a halogen atom, a hydrocarbon group having a carbon number of 1 to 20, an oxygen, sulfur, or nitrogen-containing hydrocarbon group having a carbon number of 1 to 20, an amino group substituted with a hydrocarbon group having a carbon number of 1 to 20, an alkoxy group having a carbon number of 1 to 20, a silicon-containing hydrocarbon group having a carbon number of 1 to 18, which contains a silicon number of 1 to 6, a halogen-containing hydrocarbon group having a carbon number of 1 to 20, or a silyl group substituted with a hydrocarbon group having a carbon number of 1 to 20, and adjacent substituents of them may form a ring together with the atoms bonded thereto.

[3] A metallocene compound represented by the following general formula (3):

[Chem 4]

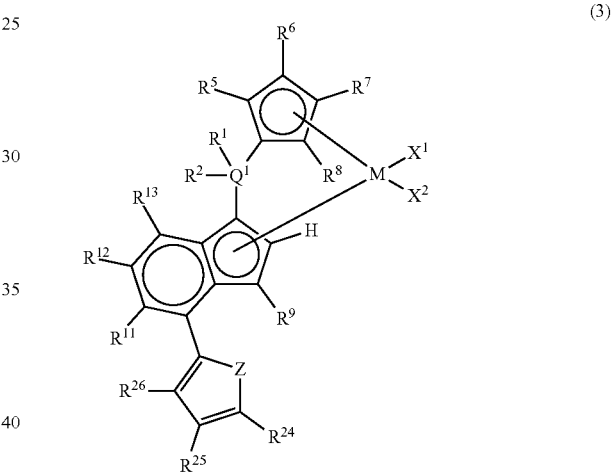

(3)

wherein M represents any transition metal of Ti, Zr, and Hf; $X^1$ and $X^2$ represent each independently a hydrogen atom, a halogen, a hydrocarbon group having a carbon number of 1 to 20, an oxygen or nitrogen-containing hydrocarbon group having a carbon number of 1 to 20, an amino group substituted with a hydrocarbon group having a carbon number of 1 to 20, or an alkoxy group having a carbon number of 1 to 20; $Q^1$ represents a carbon atom, a silicon atom, or a germanium atom; $R^1$ and $R^2$ represent each independently a hydrogen atom or a hydrocarbon group having a carbon number of 1 to 10, and may form a ring together with $Q^1$ bonded thereto; $R^5$, $R^6$, $R^7$, $R^8$, $R^9$, $R^{11}$, $R^{12}$, and $R^{13}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen, sulfur, or nitrogen-containing hydrocarbon group having a carbon number of 1 to 20, or a silyl group substituted with a hydrocarbon group having a carbon number of 1 to 20; provided that at least three of $R^5$, $R^6$, $R^7$, and $R^8$ represent any of the above substituents other than a hydrogen atom; Z represents an oxygen atom or a sulfur atom; $R^{24}$, $R^{25}$, and $R^{26}$ represent each independently a hydrogen atom, a halogen atom, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen, sulfur, or nitrogen-containing hydrocarbon group having a carbon number of 1 to 20, or a silyl group substituted with a hydrocarbon group having a carbon number of 1 to 20, and adjacent substituents of $R^{24}$, $R^{25}$, and $R^{26}$ may form a ring together with the carbon atoms to which they are bonded.

[4] The metallocene compound according to any one of the [1] to [3], wherein M is Zr or Hf in the above general formula (1), (2), or (3).

[5] The metallocene compound according to any one of the [1] to [3], wherein M is Zr in the above general formula (1), (2), or (3).

[6] The metallocene compound according to any one of the [1] to [5], wherein $R^5$, $R^6$, $R^7$, and $R^8$ are each a hydrocarbon group having a carbon number of 1 to 20 in the above general formula (1), (2), or (3).

[7] The metallocene compound according to any one of the [1] to [5], wherein $R^5$, $R^6$, $R^7$, and $R^8$ are each a methyl group in the above general formula (1), (2), or (3).

[8] The metallocene compound according to any one of the [1] to [7], wherein $R^9$ is a hydrocarbon group having a carbon number of 1 to 20 in the above general formula (1), (2), or (3).

[9] The metallocene compound according to any one of the [1] to [7], wherein $R^9$ is a methyl group in the above general formula (1), (2), or (3).

[10] A catalyst component for olefin polymerization, comprising the metallocene compound according to any one of the [1] to [9].

[11] A catalyst for olefin polymerization, comprising the metallocene compound according to any one of the [1] to [9].

[12] A catalyst for olefin polymerization, comprising the following essential components (A), (B) and (C):
Component (A): the metallocene compound according to any one of the [1] to [9], Component (B): a compound reacting with the metallocene compound of the component (A) to form a cationic metallocene compound, and
Component (C): a fine particle carrier.

[13] The catalyst for olefin polymerization according to the [12], wherein the component (B) is an aluminoxane.

[14] The catalyst for olefin polymerization according to the [12] or [13], wherein the component (C) is silica.

[15] The catalyst for olefin polymerization according to any one of the [12] to [14], which further comprises the following component (D):
Component (D): an organoaluminum compound.

[16] A method for producing an olefin-based polymer, comprising polymerizing an olefin using the catalyst for olefin polymerization according to any one of the [11] to [15].

[17] The method for producing an olefin-based polymer according to the [16], wherein the olefin contains at least ethylene.

[18] The method for producing an olefin-based polymer according to the [17], wherein the olefin-based polymer is an ethylene-based polymer.

Advantage of the Invention

In the metallocene compound of the present invention, a cyclopentadienyl ring having a specific number or more of substituents and an indenyl ring are bridged and further the metallocene compound has an aryl substituent or a heteroaryl substituent at the 4-position of the indenyl ring. Thereby, the metallocene compound has an excellent feature that a metallocene-based polyethylene having sufficient number and length of long-chain branches can be produced with high polymerization activity. Also, by using the metallocene compound of the present invention as a catalyst component for olefin polymerization, there can be obtained an olefin-based polymer (particularly, an ethylene-based polymer) having sufficient number and length of long-chain branches introduced therein and having further improved molding processability.

MODE FOR CARRYING OUT THE INVENTION

Figure 1:
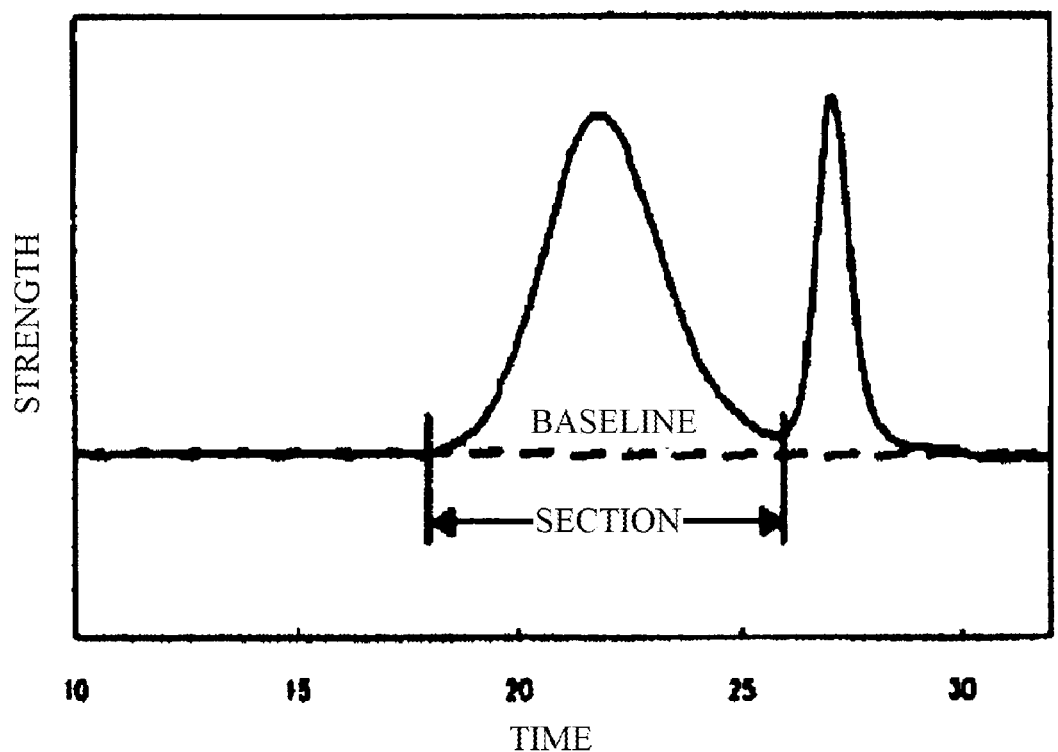
FIG. 1 is a drawing explaining a baseline and a section of a chromatogram in GPC.

The following will describe the metallocene compound of the present invention, a catalyst component for olefin polymerization and a catalyst for olefin polymerization containing the same, and a method for producing an olefin polymer using the catalyst for olefin polymerization in detail.

1. Metallocene Compound

The metallocene compound of the present invention is a metallocene compound represented by the following general formula (1).

[Chem 5]

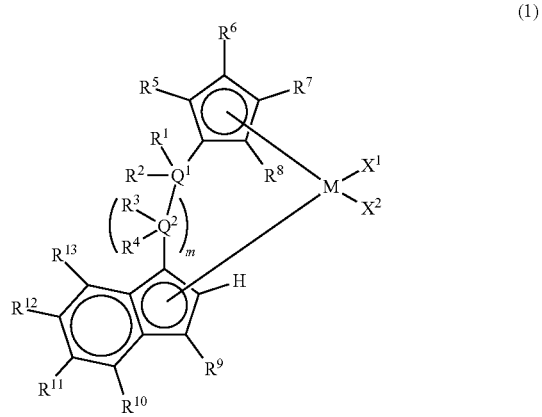

(1)

In the metallocene compound of the present invention, a cyclopentadienyl ring having three or more substituents and an indenyl ring are bridged and an aryl substituent or a heteroaryl substituent is present at the 4-position($R^{10}$) of the indenyl ring. Therefore, both of the formation of a macromer (terminal vinyl polymer) by β-hydrogen elimination and the copolymerization of the macromer can be performed and also the reaction rates thereof can be accelerated by using the metallocene compound of the present invention as a catalyst component for olefin polymerization. Accordingly, when a catalyst containing the metallocene compound of the present invention is used, an olefin-based polymer (particularly, an ethylene-based polymer) having sufficient number and length of long-chain branches introduced therein and having further improved molding processability can be obtained with high productivity.

The metallocene compound of the present invention has a structure that a ligand having a structure that the cyclopentadienyl ring and the indenyl ring having an aryl substituent or a heteroaryl substituent at the 4-position as a basic skeleton are bridged is coordinated to the transition metal described in the present invention. The structure is a structure capable of accelerating both reactions of the formation of a macromer (terminal vinyl polymer) by β-hydrogen elimination and the copolymerization of the macromer. Furthermore, the cyclopentadienyl ring has three or more substituents, so that it is presumed that the cyclopentadienyl ring has an electronic influence on the central metal and thus the polymerization reaction rate is increased. Moreover, it is presumed that the deactivation reaction at the central metal that is one factor of the decrease in polymerization activity is suppressed by a shielding effect attributable to the substituents and thus high polymerization activity is maintained.

In the general formula (1), M represents any transition metal of Ti, Zr, and Hf, preferably Zr or Hf, and more preferably Zr.

In the general formula (1), $X^1$ and $X^2$ represent each independently a hydrogen atom, a halogen, a hydrocarbon group having a carbon number of 1 to 20, an oxygen or nitrogen-containing hydrocarbon group having a carbon number of 1 to 20, an amino group substituted with a hydrocarbon group having a carbon number of 1 to 20, or an alkoxy group having a carbon number of 1 to 20.

The halogen represented by $X^1$ and $X^2$ includes a chlorine atom, a bromine atom, an iodine atom, and the like. The hydrocarbon group having a carbon number of 1 to 20 represented by $X^1$ and $X^2$ includes an alkyl group, an aryl group, and the like and examples thereof include a methyl group, an ethyl group, an n-propyl group, an i-propyl group, an n-butyl group, an i-butyl group, a t-butyl group, an n-pentyl group, a neopentyl group, a cyclopentyl group, an n-hexyl group, a cyclohexyl group, a phenyl group, a benzyl group, a naphthyl group, and the like.

The oxygen-containing hydrocarbon group having a carbon number of 1 to 20 represented by $X^1$ and $X^2$ includes hydrocarbon groups having an ether-bond, a carbonyl group, an ester bond, a heteroaryl group, or the like, and examples thereof include a methoxymethyl group, an ethoxymethyl group, an n-propoxymethyl group, an i-propoxymethyl group, an n-butoxymethyl group, an i-butoxymethyl group, a t-butoxymethyl group, a methoxyethyl group, an ethoxyethyl group, an acetyl group, a 1-oxopropyl group, a 1-oxo-n-butyl group, a 2-methyl-1-oxopropyl group, a 2,2-dimethyl-1-oxo-propyl group, a phenylacetyl group, a diphenylacetyl group, a benzoyl group, a 2-methoxyphenyl group, a 3-methoxyphenyl group, a 4-methoxyphenyl group, a 2-furyl group, a 2-tetrahydrofuryl group, a 2-(5-methyl) furyl group, and the like. The nitrogen-containing hydrocarbon group having a carbon number of 1 to 20 includes hydrocarbon groups having an amino group, an imino group, a nitrile group, a pyridyl group, a pyrrole group, an imidazole group, a pyrozole group, an indole group, or the like, and examples thereof include a dimethylaminomethyl group, a diethylaminomethyl group, a di-i-propylaminomethyl group, a bis(dimethylamino)methyl group, a bis(di-i-propylamino)methyl group, a (dimethylamino)(phenyl)methyl group, a methylimino group, an ethylimino group, a 1-(methylimino)ethyl group, a 1-(phenylimino)ethyl group, a 1-[(phenylmethyl)imino]ethyl group, and the like.

Examples of the amino group substituted with a hydrocarbon group having a carbon number of 1 to 20 represented by $X^1$ and $X^2$ include a dimethylamino group, a diethylamino group, a di-n-propylamino group, a di-i-propylamino group, a di-n-butylamino group, a di-i-butylamino group, a di-t-butylamino group, a diphenylamino group, and the like.

Examples of the alkoxy group having a carbon number of 1 to 20 represented by $X^1$ and $X^2$ include a methoxy group, an ethoxy group, an n-propoxy group, an i-propoxy group, an n-butoxy group, an i-butoxy group, a t-butoxy group, a phenoxy group, and the like.

Preferred $X^1$ and $X^2$ include a halogen, an alkyl group having a carbon number of 1 to 4, an alkoxy group having a carbon number of 1 to 6, and an amino group substituted with a hydrocarbon group having a carbon number of 1 to 6. Among them, there may be mentioned a chlorine atom, a bromine atom, a methyl group, an n-butyl group, an i-butyl group, a methoxy group, an ethoxy group, an i-propoxy group, an n-butoxy group, a phenoxy group, a dimethylamino group, and a di-i-propylamino group. Of these, a chlorine atom, a methyl group, and a dimethylamino group are particularly preferred.

In the general formula (1), $Q^1$ and $Q^2$ represent each independently a carbon atom, a silicon atom, or a germanium atom, preferably a carbon atom or a silicon atom, and more preferably a silicon atom.

In the general formula (1), $R^1$, $R^2$, $R^3$, and $R^4$ represent each independently a hydrogen atom or a hydrocarbon group having a carbon number of 1 to 10, and may form a ring together with at least one of $Q^1$ and $Q^2$ bonded thereto. m is 0 or 1 and, in the case where m is 0, $Q^1$ is directly bonded to a conjugated 5-membered ring containing $R^9$.

The hydrocarbon group having a carbon number of 1 to 10 represented by $R^1$, $R^2$, $R^3$, and $R^4$ includes alkyl groups, aryl groups, and the like, and examples thereof include a methyl group, an ethyl group, an n-propyl group, an i-propyl group, an n-butyl group, an i-butyl group, a t-butyl group, an n-pentyl group, a neopentyl group, a cyclopentyl group, an n-hexyl group, a cyclohexyl group, a phenyl group, and the like.

Moreover, as the cases where $R^1$ and $R^2$ form a ring together with $Q^1$ bonded thereto or $R^3$ and $R^4$ form a ring together with $Q^2$ bonded thereto, there may be mentioned a cyclobutylidene group, a cyclopentylidene group, a cyclohexylidene group, a silacyclobutyl group, a silacyclopentyl group, a silacyclohexyl group, and the like. Furthermore, as the case where $R^1$, $R^2$, $R^3$, and $R^4$ form a ring together with $Q^1$ and $Q^2$ bonded thereto, a cyclohexylene group and the like may be mentioned.

Preferred $R^1$, $R^2$, $R^3$, and $R^4$ include a hydrogen atom, a methyl group, an ethyl group, a phenyl group, an ethylene group, and a cyclobutylidene group in the case where $Q^1$ and/or $Q^2$ are a carbon atom, and include a methyl group, an ethyl group, a phenyl group, and a silacyclobutyl group in the case where $Q^1$ and/or $Q^2$ are a silicon atom.

$R^5$, $R^6$, $R^7$, $R^8$, $R^9$, $R^{11}$, $R^{12}$, and $R^{13}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen, sulfur, or nitrogen-containing hydrocarbon group having a carbon number of 1 to 20, or a silyl group substituted with a hydrocarbon group having a carbon number of 1 to 20. However, at least three of $R^5$, $R^6$, $R^7$, and $R^8$ represent any of the above substituents other than a hydrogen atom. In the case where $R^{13}$ is any of the above substituents other than a hydrogen atom, $R^9$ represents any of the above substituents other than a hydrogen atom.

As specific examples of the substituents other than a hydrogen atom, which are represented by each of $R^5$, $R^6$, $R^7$, $R^8$, $R^9$, $R^{11}$, $R^{12}$, and $R^{13}$, with regard to the halogen, the hydrocarbon group having a carbon number of 1 to 20, or the oxygen or nitrogen-containing hydrocarbon group having a carbon number of 1 to 20, there may be mentioned those the same as the groups represented in the description of the aforementioned $X^1$ and $X^2$.

Examples of the silicon-containing hydrocarbon group having a carbon number of 1 to 18, which contains a silicon number of 1 to 6, include a bis(trimethylsilyl)methyl group, a bis(t-butyldimethylsilyl)methyl group, and the like, and examples of the halogen-containing hydrocarbon group having a carbon number of 1 to 20 include a bromomethyl group, a chloromethyl group, a trifluoromethyl group, a 2-chloroethyl group, a 2-bromoethyl group, a 2-bromopropyl group, a 3-bromopropyl group, a 2-bromocyclopentyl group, a 2,3-dibromocyclopentyl group, a 2-bromo-3-iodocyclopentyl group, a 2,3-dibromocyclohexyl group, a 2-chloro-3-iodocyclohexyl group, a 2-chlorophenyl group, a 4-chlorophenyl group, a 2,3,4,5,6-pentafluorophenyl group, a 4-trifluoromethylphenyl group, and the like.

Further, examples of the sulfur-containing hydrocarbon group having a carbon number of 1 to 20 includes, for example, a methylthiomethyl group, an ethylthiomethyl group, an n-propylthiomethyl group, an i-propylthiomethyl group, an n-butylthiomethyl group, an i-butylthiomethyl group, a t-butylthiomethyl group, a methylthioethyl group, an ethylthioethyl group, a thioacetyl group, a 1-thioxopropyl group, a 1-thioxo-n-butyl group, a 2-methyl-1-thioxopropyl group, a 2,2-dimethyl-1-thioxo-propyl group, a phenylthioacetyl group, a diphenylthioacetyl group, a thiobenzoyl group, a 2-methylthiophenyl group, a 3-methylthiophenyl group, a 4-methylthiophenyl group, a 2-thienyl group, a 2-tetrahydrothienyl group, a 2-(5-methyl)thienyl group, and the like.

Moreover, the silyl group substituted with a hydrocarbon group having a carbon number of 1 to 20 includes trialkylsilyl groups, dialkylmonoarylsilyl groups, monoalkyldiarylsilyl groups, triarylsilyl groups, and the like, and examples thereof include a trimethylsilyl group, a tri-t-butylsilyl group, a di-t-butylmethylsilyl group, a t-butyldimethylsilyl group, a triphenylsilyl group, a diphenylmethylsilyl group, a phenyldimethylsilyl group, and the like.

In the formula (1), at least three of $R^5$, $R^6$, $R^7$, and $R^8$ are any of the above substituents other than a hydrogen atom and, particularly, $R^5$, $R^6$, $R^7$, and $R^8$ are preferably any of the above substituents other than a hydrogen atom.

As any of the above substituents other than a hydrogen atom in the $R^5$, $R^6$, $R^7$, and $R^8$, preferred are a hydrocarbon group having a carbon number of 1 to 20 or a silyl group substituted with a hydrocarbon group having a carbon number of 1 to 20, more preferred is a hydrocarbon group having a carbon number of 1 to 10 or a silyl group substituted with a hydrocarbon group having a carbon number of 1 to 18, and still further preferred is a hydrocarbon group having a carbon number of 1 to 6 or a silyl group substituted with a hydrocarbon group having a carbon number of 1 to 6.

Examples of the hydrocarbon group having a carbon number of 1 to 10 include alkyl groups having a carbon number of 1 to 10, phenyl groups which may substituted with an alkyl group having a carbon number of 6 to 10, and a naphthyl group. Preferred examples of the silyl group substituted with a hydrocarbon group having a carbon number of 1 to 18 include a trimethylsilyl group, an ethyldimethylsilyl group, an n-propyldimethylsilyl group, an i-propyldimethylsilyl group, an n-butyldimethylsilyl group, an i-butyldimethylsilyl group, a t-butyldimethylsilyl group, a triethylsilyl group, a t-butyldiethylsilyl group, a tri-i-propylsilyl group, a dimethylphenylsilyl group, a methyldiphenylsilyl group, and a t-butyldiphenylsilyl group.

Moreover, preferred examples of the hydrocarbon group having a carbon number of 1 to 6 include alkyl groups having a carbon number of 1 to 6, and preferred examples of the alkyl group having a carbon number of 1 to 6 include a methyl group, an ethyl group, an n-propyl group, an i-propyl group, an n-butyl group, an i-butyl group, a t-butyl group, an n-pentyl group, a neopentyl group, a cyclopentyl group, an n-hexyl group, and a cyclohexyl group.

As particularly preferred any of the above substituents other than a hydrogen atom in $R^5$, $R^6$, $R^7$, and $R^8$, more preferred is a methyl group, an ethyl group, an n-propyl group, an i-propyl group, an n-butyl group, an i-butyl group, a t-butyl group, a trimethylsilyl group, a triethylsilyl group, or a t-butyldimethylsilyl group, and further preferred is a methyl group, a t-butyl group, or a trimethylsilyl group, and particularly preferred is a methyl group.

Moreover, $R^9$, $R^{11}$, $R^{12}$, and $R^{13}$ are preferably a hydrogen atom, a hydrocarbon group having a carbon number of 1 to 20, or a silyl group substituted with a hydrocarbon group having a carbon number of 1 to 20, more preferably a hydrogen atom, a hydrocarbon group having a carbon number of 1 to 10, or a silyl group substituted with a hydrocarbon group having a carbon number of 1 to 18, and still further preferably a hydrogen atom, a hydrocarbon group having a carbon number of 1 to 6, or a silyl group substituted with a hydrocarbon group having a carbon number of 1 to 6. Examples of these substituents include the same substituents as described in the above.

$R^9$, $R^{11}$, $R^{12}$, and $R^{13}$ are particularly preferably a hydrogen atom, an alkyl group having a carbon number of 1 to 6, a phenyl group, or a silyl group substituted with a hydrocarbon group having a carbon number of 1 to 6. As the substituents other than the hydrogen atom, more preferred is a methyl group, an ethyl group, an n-propyl group, an i-propyl group, an n-butyl group, an i-butyl group, a t-butyl group, a trimethylsilyl group, a triethylsilyl group, or a t-butyldimethylsilyl group, and further preferred is a methyl group, a t-butyl group, or a trimethylsilyl group.

Of these, the case where $R^9$ is any of the above substituents other than a hydrogen atom is preferred in view of higher polymerization activity.

Incidentally, in the case where $R^{13}$ is any of the above substituents other than a hydrogen atom, $R^9$ represents any of the above substituents other than a hydrogen atom.

The substituent $R^{10}$ represents a substituted or unsubstituted aryl group having a structure represented by the following general formula (1-a).

[Chem 6]

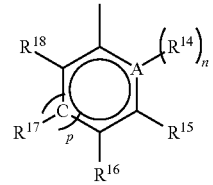

(1-a)

wherein A represents an atom of Group 14, 15, or 16 of the Periodic Table; $R^{14}$, $R^{15}$, $R^{16}$, $R^{17}$, and $R^{18}$ represent each independently a hydrogen atom, a halogen atom, a hydrocarbon group having a carbon number of 1 to 20, an oxygen, sulfur, or nitrogen-containing hydrocarbon group having a carbon number of 1 to 20, an amino group substituted with a hydrocarbon group having a carbon number of 1 to 20, an alkoxy group having a carbon number of 1 to 20, a silicon-containing hydrocarbon group having a carbon number of 1 to 18, which contains a silicon number of 1 to 6, a halogen-containing hydrocarbon group having a carbon number of 1 to 20, or a silyl group substituted with a hydrocarbon group having a carbon number of 1 to 20, and adjacent substituents of $R^{14}$, $R^{15}$, $R^{16}$, $R^{17}$, and $R^{18}$ may form a ring together with the atoms bonded thereto; n is 0 or 1 and, in the case where n is 0, the substituent $R^{14}$ is not present on A; p is 0 or 1 and, in the case where p is 0, $R^{17}$ and the carbon atom to which $R^{17}$ is bonded are not present and the carbon atom to which $R^{16}$ is bonded and the carbon atom to which $R^{18}$ is bonded are directly bonded.

A in the general formula (1-a) is preferably any of a carbon atom, a nitrogen atom, an oxygen atom, and a sulfur atom and further preferably any of a carbon atom, an oxygen atom, and a sulfur atom. Preferred unsubstituted aryl groups having the structure represented by the above general formula (1-a) include a phenyl group, a furyl group, a thienyl group, and the like.

In the general formula (1-a), as specific examples of the substituents other than a hydrogen atom, which are represented by each of $R^{14}$, $R^{15}$, $R^{16}$, $R^{17}$ and $R^{18}$, there may be mentioned those the same as the groups shown in the description of the aforementioned $X^1$ and $X^2$ and $R^5$, $R^6$, $R^7$, $R^8$, $R^9$, $R^{11}$, $R^{12}$, and $R^{13}$.

The substituted or unsubstituted aryl group having a structure represented by the above general formula (1-a) in the substituent $R^{10}$ specifically includes a phenyl group, a 4-methylphenyl group, a 4-i-propylphenyl group, a 4-t-butylphenyl group, a 4-biphenyl group, a 2,6-dimethylphenyl group, a 2,5-dimethylphenyl group, a 3,5-dimethylphenyl group, a 3,5-i-propylphenyl group, a 3,5-t-butylphenyl group, a 2,4,6-trimethylphenyl group, a 2,3,5,6-tetramethylphenyl group, a 2,3,4,5,6-pentamethylphenyl group, a 4-trimethylsilylphenyl group, a 4-(t-butyldimethylsilyl)phenyl group, a 3,5-bistrimethylsilylphenyl group, a 4-fluorophenyl group, a 4-chlorophenyl group, a 4-bromophenyl group, a 4-trifluoromethylphenyl group, a 3,5-difluorophenyl group, a 3,5-dichlorophenyl group, a 2,4,6-trifluorophenyl group, a 3,4,5-trifluorophenyl group, a 2,4,6-trichlorophenyl group, a 2,3,5,6-tetrafluorophenyl group, a 2,3,4,5,6-pentafluorophenyl group, a 4-methoxyphenyl group, a 4-ethoxyphenyl group, a 4-isopropoxyphenyl group, a 4-n-butoxyphenyl group, a 4-phenoxyphenyl group, a 3,5-dimethoxyphenyl group, a 2-furyl group, a 2-(5-methyl)furyl group, a 2-(5-ethyl)furyl group, a 2-(5-n-propyl)furyl group, a 2-(5-i-propyl)furyl group, a 2-(5-n-butyl)furyl group, a 2-(5-i-butyl)furyl group, a 2-(5-t-butyl)furyl group, a 2-(5-trimethylsilyl)furyl group, a 2-(5-triethylsilyl)furyl group, a 2-(5-phenyl)furyl group, a 2-(5-tolyl)furyl group, a 2-(5-fluorophenyl)furyl group, a 2-(5-chlorophenyl)furyl group, a 2-(4,5-dimethyl)furyl group, a 2-benzofuryl group, a 2-thienyl group, a 2-(5-methyl)thienyl group, a 2-(5-t-butyl)thienyl group, a 2-(5-trimethylsilyl)thienyl group, a 2-(4,5-dimethyl)thienyl group, and the like.

Moreover, adjacent substituents of $R^{14}$, $R^{15}$, $R^{16}$, $R'^{7}$, and $R'^{8}$ may form one or more aromatic rings or aliphatic rings together with the atoms linked therewith.

Preferred examples of the aromatic ring or aliphatic ring to be formed include a 1-naphthyl group, a 2-naphthyl group, a 1-anthryl group, a 2-anthryl group, a 9-anthryl group, a 1-phenanthryl group, a 2-phenanthryl group, a 3-phenanthryl group, a 4-phenanthryl group, a 9-phenanthryl group, a 5-1,2,3,4-tetrahydronaphthyl group, a 6-1,2,3,4-tetrahydronaphthyl group, and a 9-1,2,3,4,5,6,7,8-octahydroanthryl group. Of these, a 1-naphthyl group, a 2-naphthyl group, and a 9-anthryl group are more preferred, and a 1-naphthyl group and a 2-naphthyl group are further preferred.

The metallocene compound of the present invention is preferably one represented by the following general formula (2).

[Chem 7]

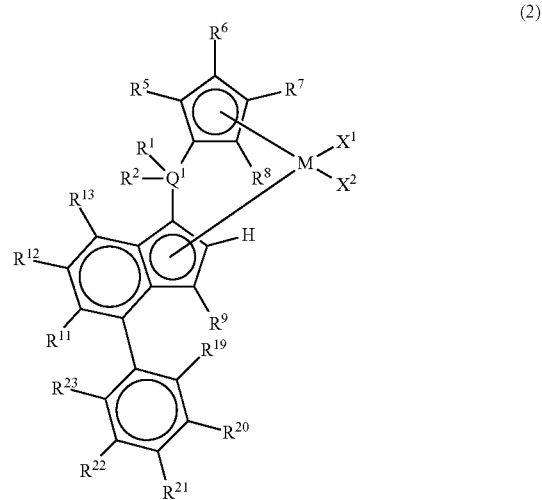

(2)

wherein M represents any transition metal of Ti, Zr, and Hf; $X^1$ and $X^2$ represent each independently a hydrogen atom, a halogen, a hydrocarbon group having a carbon number of 1 to 20, an oxygen or nitrogen-containing hydrocarbon group having a carbon number of 1 to 20, an amino group substituted with a hydrocarbon group having a carbon number of 1 to 20, or an alkoxy group having a carbon number of 1 to 20; $Q^1$ represents a carbon atom, a silicon atom, or a germanium atom; $R^1$ and $R^2$ represent each independently a hydrogen atom or a hydrocarbon group having a carbon number of 1 to 10, and may form a ring together with $Q^1$ bonded thereto; $R^5$, $R^6$, $R^7$, $R^8$, $R^9$, $R^{11}$, $R^{12}$, and $R^{13}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen, sulfur, or nitrogen-containing hydrocarbon group having a carbon number of 1 to 20, or a silyl group substituted with a hydrocarbon group having a carbon number of 1 to 20; provided that at least three of $R^5$, $R^6$, $R^7$, and $R^8$ represent any of the above substituents other than a hydrogen atom; in the case where $R^{13}$ is any of the above substituents other than a hydrogen atom, $R^9$ represents any of the above substituents other than a hydrogen atom; $R^{19}$, $R^{20}$, $R^{21}$, $R^{22}$, and $R^{23}$ represent each independently a hydrogen atom, a halogen atom, a hydrocarbon group having a carbon number of 1 to 20, an oxygen, sulfur, or nitrogen-containing hydrocarbon group having a carbon number of 1 to 20, an amino group substituted with a hydrocarbon group having a carbon number of 1 to 20, an alkoxy group having a carbon number of 1 to 20, a silicon-containing hydrocarbon group having a carbon number of 1 to 18, which contains a silicon number of 1 to 6, a halogen-containing hydrocarbon group having a carbon number of 1 to 20, or a silyl group substituted with a hydrocarbon group having a carbon number of 1 to 20, and adjacent substituents of them may form a ring together with the atoms bonded thereto.

In the metallocene compound represented by the above general formula (2), as M, $X^1$, $X^2$, $Q^1$, $R^1$, $R^2$, $R^5$, $R^6$, $R^7$, $R^8$, $R^9$, $R^{11}$, $R^{12}$, and $R^{13}$, structures the same as the atoms and groups represented in the description of the metallocene compound represented by the aforementioned general formula (1) can be selected. Moreover, as $R^{19}$, $R^{20}$ and $R^{23}$, structures the same as the atoms and groups of $R^{14}$, $R^{15}$, $R^{16}$, $R^{17}$, and $R^{18}$ represented in the description of the metallocene compound represented by the aforementioned general formula (1) can be selected.

In addition, the metallocene compound of the present invention is preferably one represented by the following general formula (3), similarly to the above general formula (2).

[Chem 8]

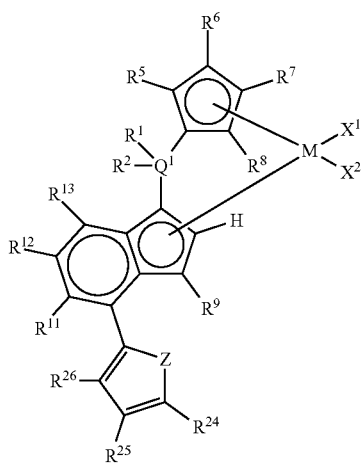

(3)

wherein M represents any transition metal of Ti, Zr, and Hf; $X^1$ and $X^2$ represent each independently a hydrogen atom, a halogen, a hydrocarbon group having a carbon number of 1 to 20, an oxygen or nitrogen-containing hydrocarbon group having a carbon number of 1 to 20, an amino group substituted with a hydrocarbon group having a carbon number of 1 to 20, or an alkoxy group having a carbon number of 1 to 20; $Q^1$ represents a carbon atom, a silicon atom, or a germanium atom; $R^1$ and $R^2$ represent each independently a hydrogen atom or a hydrocarbon group having a carbon number of 1 to 10, and may form a ring together with $Q^1$ bonded thereto; $R^5$, $R^6$, $R^7$, $R^8$, $R^9$, $R^{11}$, $R^{12}$, and $R^{13}$ represent each independently a hydrogen atom, a halogen, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen, sulfur, or nitrogen-containing hydrocarbon group having a carbon number of 1 to 20, or a silyl group substituted with a hydrocarbon group having a carbon number of 1 to 20; provided that at least three of $R^5$, $R^6$, $R^7$, and $R^8$ represent any of the above substituents other than a hydrogen atom; Z represents an oxygen atom or a sulfur atom; $R^{24}$, $R^{25}$, and $R^{26}$ represent each independently a hydrogen atom, a halogen atom, a hydrocarbon group having a carbon number of 1 to 20, a silicon-containing hydrocarbon group having a carbon number of 1 to 18, which contains a silicon number of 1 to 6, a halogen-containing hydrocarbon group having a carbon number of 1 to 20, an oxygen, sulfur, or nitrogen-containing hydrocarbon group having a carbon number of 1 to 20, or a silyl group substituted with a hydrocarbon group having a carbon number of 1 to 20, and adjacent substituents of $R^{24}$, $R^{25}$, and $R^{26}$ may form a ring together with the carbon atoms to which they are bonded.

In the metallocene compound represented by the above general formula (3), as M, $X^1$, $X^2$, $Q^1$, $R^1$, $R^2$, $R^5$, $R^6$, $R^7$, $R^8$, $R^9$, $R^{11}$, $R^{12}$, and $R^{13}$, structures the same as the atoms and groups represented in the description of the metallocene compound represented by the aforementioned general formula (1) can be selected. Moreover, as $R^{24}$, $R^{25}$, and $R^{26}$, structures the same as the atoms and groups of $R^{14}$, $R^{15}$, $R^{16}$, $R^{17}$, and $R^{18}$ represented in the description of the metallocene compound represented by the aforementioned general formula (1) can be selected. Z represents an oxygen atom or a sulfur atom.

As the metallocene compound of the present invention, among the compounds represented by the above general formula (1), a compound represented by the following general formula (4) may be mentioned as a preferred compound.

[Chem 9]

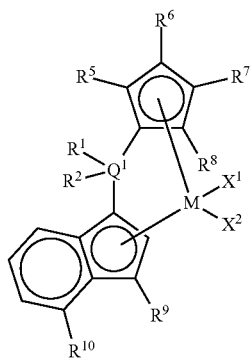

(4)

In the metallocene compound represented by the above general formula (4), as M, $X^1$, $X^2$, $Q^1$, $R^1$, $R^2$, $R^5$, $R^6$, $R^7$, $R^8$, $R^9$, and $R^{10}$, configurations the same as the atoms and groups represented in the description of the metallocene compound represented by the aforementioned general formula (1) can be selected.

Specific examples of the metallocene compound of the present invention are shown in the above general formula (4) and Tables 1 to 13 but are not limited thereto.

Incidentally, in the following Tables, abbreviations are as follows.

Me: methyl, Et: ethyl, Pr: propyl, Bu: butyl, Ph: phenyl, Cp: cyclopentadienyl, TMS: trimethylsilyl, TES: triethylsilyl.

TABLE 1

| Number | M | $X^1$, $X^2$ | $R^1R^2Q$ | $R^5R^6R^7R^8Cp$ | $R^9$ | $R^{10}$ |
|---|---|---|---|---|---|---|
| 1 | Zr | Cl | Me$_2$Si | 2,3,4,5-Me$_4$Cp | Me | 5-Me-2-furyl |
| 2 | Zr | Cl | Me$_2$Si | 2,3,4,5-Me$_4$Cp | Me | 2-furyl |
| 3 | Zr | Cl | Me$_2$Si | 2,3,4,5-Me$_4$Cp | Me | 5-Et-2-furyl |
| 4 | Zr | Cl | Me$_2$Si | 2,3,4,5-Me$_4$Cp | Me | 5-$^n$Pr-2-furyl |
| 5 | Zr | Cl | Me$_2$Si | 2,3,4,5-Me$_4$Cp | Me | 5-$^i$Pr-2-furyl |
| 6 | Zr | Cl | Me$_2$Si | 2,3,4,5-Me$_4$Cp | Me | 5-$^n$Bu-2-furyl |
| 7 | Zr | Cl | Me$_2$Si | 2,3,4,5-Me$_4$Cp | Me | 5-$^i$Bu-2-furyl |
| 8 | Zr | Cl | Me$_2$Si | 2,3,4,5-Me$_4$Cp | Me | 5-$^t$Bu-2-furyl |
| 9 | Zr | Cl | Me$_2$Si | 2,3,4,5-Me$_4$Cp | Me | 5-TMS-2-furyl |
| 10 | Zr | Cl | Me$_2$Si | 2,3,4,5-Me$_4$Cp | Me | 5-TES-2-furyl |
| 11 | Zr | Cl | Me$_2$Si | 2,3,4,5-Me$_4$Cp | Me | 5-Ph-2-furyl |
| 12 | Zr | Cl | Me$_2$Si | 2,3,4,5-Me$_4$Cp | Me | 5-tolyl-2-furyl |
| 13 | Zr | Cl | Me$_2$Si | 2,3,4,5-Me$_4$Cp | Me | 5-fluorophenyl-2-furyl |
| 14 | Zr | Cl | Me$_2$Si | 2,3,4,5-Me$_4$Cp | Me | 5-chlorophenyl-2-furyl |
| 15 | Zr | Cl | Me$_2$Si | 2,3,4,5-Me$_4$Cp | Me | 4,5-Me$_2$-2-furyl |
| 16 | Zr | Cl | Me$_2$Si | 2,3,4,5-Me$_4$Cp | Me | 2-benzofuryl |
| 17 | Zr | Cl | Me$_2$Si | 2,3,4,5-Me$_4$Cp | Me | 2-thienyl |
| 18 | Zr | Cl | Me$_2$Si | 2,3,4,5-Me$_4$Cp | Me | 5-Me-2-thienyl |
| 19 | Zr | Cl | Me$_2$Si | 2,3,4,5-Me$_4$Cp | Me | Ph |
| 20 | Zr | Cl | Me$_2$Si | 2,3,4,5-Me$_4$Cp | Me | 4-Me—Ph |
| 21 | Zr | Cl | Me$_2$Si | 2,3,4,5-Me$_4$Cp | Me | 4-$^i$Pr—Ph |
| 22 | Zr | Cl | Me$_2$Si | 2,3,4,5-Me$_4$Cp | Me | 4-$^t$Bu—Ph |
| 23 | Zr | Cl | Me$_2$Si | 2,3,4,5-Me$_4$Cp | Me | 4-Ph—Ph |
| 24 | Zr | Cl | Me$_2$Si | 2,3,4,5-Me$_4$Cp | Me | 4-TMS-Ph |
| 25 | Zr | Cl | Me$_2$Si | 2,3,4,5-Me$_4$Cp | Me | 4-MeO—Ph |
| 26 | Zr | Cl | Me$_2$Si | 2,3,4,5-Me$_4$Cp | Me | 4-PhO—Ph |
| 27 | Zr | Cl | Me$_2$Si | 2,3,4,5-Me$_4$Cp | Me | 4-F—Ph |
| 28 | Zr | Cl | Me$_2$Si | 2,3,4,5-Me$_4$Cp | Me | 4-Cl—Ph |
| 29 | Zr | Cl | Me$_2$Si | 2,3,4,5-Me$_4$Cp | Me | 4-CF$_3$—Ph |
| 30 | Zr | Cl | Me$_2$Si | 2,3,4,5-Me$_4$Cp | Me | 2,6-Me$_2$—Ph |
| 31 | Zr | Cl | Me$_2$Si | 2,3,4,5-Me$_4$Cp | Me | 2,5-Me$_2$—Ph |
| 32 | Zr | Cl | Me$_2$Si | 2,3,4,5-Me$_4$Cp | Me | 3,5-Me$_2$—Ph |
| 33 | Zr | Cl | Me$_2$Si | 2,3,4,5-Me$_4$Cp | Me | 3,5-$^i$Pr$_2$—Ph |
| 34 | Zr | Cl | Me$_2$Si | 2,3,4,5-Me$_4$Cp | Me | 3,5-$^t$Bu$_2$—Ph |
| 35 | Zr | Cl | Me$_2$Si | 2,3,4,5-Me$_4$Cp | Me | 3,5-(MeO)$_2$—Ph |
| 36 | Zr | Cl | Me$_2$Si | 2,3,4,5-Me$_4$Cp | Me | 3,5-F$_2$—Ph |
| 37 | Zr | Cl | Me$_2$Si | 2,3,4,5-Me$_4$Cp | Me | 3,5-Cl$_2$—Ph |
| 38 | Zr | Cl | Me$_2$Si | 2,3,4,5-Me$_4$Cp | Me | 2,4,6-Me$_3$—Ph |
| 39 | Zr | Cl | Me$_2$Si | 2,3,4,5-Me$_4$Cp | Me | 2,4,6-F$_3$—Ph |
| 40 | Zr | Cl | Me$_2$Si | 2,3,4,5-Me$_4$Cp | Me | 3,4,5-F$_3$—Ph |
| 41 | Zr | Cl | Me$_2$Si | 2,3,4,5-Me$_4$Cp | Me | 2,3,5,6-Me$_4$—Ph |
| 42 | Zr | Cl | Me$_2$Si | 2,3,4,5-Me$_4$Cp | Me | 2,3,5,6-F$_4$—Ph |
| 43 | Zr | Cl | Me$_2$Si | 2,3,4,5-Me$_4$Cp | Me | 2,3,4,5,6-Me$_5$—Ph |
| 44 | Zr | Cl | Me$_2$Si | 2,3,4,5-Me$_4$Cp | Me | 2,3,4,5,6-F$_5$—Ph |

TABLE 2

| Number | M | $X^1$, $X^2$ | $R^1R^2Q$ | $R^5R^6R^7R^8Cp$ | $R^9$ | $R^{10}$ |
|---|---|---|---|---|---|---|
| 45 | Zr | Cl | Me$_2$Si | 2,3,4,5-Me$_4$Cp | Et | 5-Me-2-furyl |
| 46 | Zr | Cl | Me$_2$Si | 2,3,4,5-Me$_4$Cp | Et | 2-furyl |
| 47 | Zr | Cl | Me$_2$Si | 2,3,4,5-Me$_4$Cp | Et | 5-$^t$Bu-2-furyl |
| 48 | Zr | Cl | Me$_2$Si | 2,3,4,5-Me$_4$Cp | Et | 5-TMS-2-furyl |
| 49 | Zr | Cl | Me$_2$Si | 2,3,4,5-Me$_4$Cp | Et | 5-TES-2-furyl |
| 50 | Zr | Cl | Me$_2$Si | 2,3,4,5-Me$_4$Cp | Et | 4,5-Me$_2$-2-furyl |
| 51 | Zr | Cl | Me$_2$Si | 2,3,4,5-Me$_4$Cp | Et | 2-benzofuryl |
| 52 | Zr | Cl | Me$_2$Si | 2,3,4,5-Me$_4$Cp | Et | 2-thienyl |
| 53 | Zr | Cl | Me$_2$Si | 2,3,4,5-Me$_4$Cp | Et | 5-Me-2-thienyl |
| 54 | Zr | Cl | Me$_2$Si | 2,3,4,5-Me$_4$Cp | Et | Ph |
| 55 | Zr | Cl | Me$_2$Si | 2,3,4,5-Me$_4$Cp | Et | 4-Me—Ph |
| 56 | Zr | Cl | Me$_2$Si | 2,3,4,5-Me$_4$Cp | Et | 4-$^i$Pr—Ph |
| 57 | Zr | Cl | Me$_2$Si | 2,3,4,5-Me$_4$Cp | Et | 4-$^t$Bu—Ph |
| 58 | Zr | Cl | Me$_2$Si | 2,3,4,5-Me$_4$Cp | Et | 4-Ph—Ph |
| 59 | Zr | Cl | Me$_2$Si | 2,3,4,5-Me$_4$Cp | Et | 4-TMS-Ph |
| 60 | Zr | Cl | Me$_2$Si | 2,3,4,5-Me$_4$Cp | Et | 4-F—Ph |
| 61 | Zr | Cl | Me$_2$Si | 2,3,4,5-Me$_4$Cp | Et | 4-Cl—Ph |
| 62 | Zr | Cl | Me$_2$Si | 2,3,4,5-Me$_4$Cp | Et | 4-CF$_3$—Ph |
| 63 | Zr | Cl | Me$_2$Si | 2,3,4,5-Me$_4$Cp | Et | 2,6-Me$_2$—Ph |
| 64 | Zr | Cl | Me$_2$Si | 2,3,4,5-Me$_4$Cp | Et | 2,5-Me$_2$—Ph |
| 65 | Zr | Cl | Me$_2$Si | 2,3,4,5-Me$_4$Cp | Et | 3,5-Me$_2$—Ph |
| 66 | Zr | Cl | Me$_2$Si | 2,3,4,5-Me$_4$Cp | Et | 3,5-$^i$Pr$_2$—Ph |
| 67 | Zr | Cl | Me$_2$Si | 2,3,4,5-Me$_4$Cp | Et | 3,5-$^t$Bu$_2$—Ph |
| 68 | Zr | Cl | Me$_2$Si | 2,3,4,5-Me$_4$Cp | $^n$Pr | 5-Me-2-furyl |
| 69 | Zr | Cl | Me$_2$Si | 2,3,4,5-Me$_4$Cp | $^n$Pr | 2-furyl |
| 70 | Zr | Cl | Me$_2$Si | 2,3,4,5-Me$_4$Cp | $^n$Pr | 5-$^t$Bu-2-furyl |
| 71 | Zr | Cl | Me$_2$Si | 2,3,4,5-Me$_4$Cp | $^n$Pr | 5-TMS-2-furyl |
| 72 | Zr | Cl | Me$_2$Si | 2,3,4,5-Me$_4$Cp | $^n$Pr | 5-TES-2-furyl |
| 73 | Zr | Cl | Me$_2$Si | 2,3,4,5-Me$_4$Cp | $^n$Pr | 4,5-Me$_2$-2-furyl |
| 74 | Zr | Cl | Me$_2$Si | 2,3,4,5-Me$_4$Cp | $^n$Pr | 2-benzofuryl |
| 75 | Zr | Cl | Me$_2$Si | 2,3,4,5-Me$_4$Cp | $^n$Pr | 2-thienyl |
| 76 | Zr | Cl | Me$_2$Si | 2,3,4,5-Me$_4$Cp | $^n$Pr | 5-Me-2-thienyl |
| 77 | Zr | Cl | Me$_2$Si | 2,3,4,5-Me$_4$Cp | $^n$Pr | Ph |
| 78 | Zr | Cl | Me$_2$Si | 2,3,4,5-Me$_4$Cp | $^n$Pr | 4-Me—Ph |
| 79 | Zr | Cl | Me$_2$Si | 2,3,4,5-Me$_4$Cp | $^n$Pr | 4-$^i$Pr—Ph |
| 80 | Zr | Cl | Me$_2$Si | 2,3,4,5-Me$_4$Cp | $^n$Pr | 4-$^t$Bu—Ph |
| 81 | Zr | Cl | Me$_2$Si | 2,3,4,5-Me$_4$Cp | $^n$Pr | 4-Ph—Ph |
| 82 | Zr | Cl | Me$_2$Si | 2,3,4,5-Me$_4$Cp | $^n$Pr | 4-TMS-Ph |
| 83 | Zr | Cl | Me$_2$Si | 2,3,4,5-Me$_4$Cp | $^n$Pr | 4-F—Ph |
| 84 | Zr | Cl | Me$_2$Si | 2,3,4,5-Me$_4$Cp | $^n$Pr | 4-Cl—Ph |
| 85 | Zr | Cl | Me$_2$Si | 2,3,4,5-Me$_4$Cp | $^n$Pr | 4-CF$_3$—Ph |
| 86 | Zr | Cl | Me$_2$Si | 2,3,4,5-Me$_4$Cp | $^n$Pr | 2,6-Me$_2$—Ph |
| 87 | Zr | Cl | Me$_2$Si | 2,3,4,5-Me$_4$Cp | $^n$Pr | 2,5-Me$_2$—Ph |
| 88 | Zr | Cl | Me$_2$Si | 2,3,4,5-Me$_4$Cp | $^n$Pr | 3,5-Me$_2$—Ph |
| 89 | Zr | Cl | Me$_2$Si | 2,3,4,5-Me$_4$Cp | $^n$Pr | 3,5-$^i$Pr$_2$—Ph |
| 90 | Zr | Cl | Me$_2$Si | 2,3,4,5-Me$_4$Cp | $^n$Pr | 3,5-$^t$Bu$_2$—Ph |

TABLE 3

| Number | M | $X^1$, $X^2$ | $R^1R^2Q$ | $R^5R^6R^7R^8Cp$ | $R^9$ | $R^{10}$ |
|---|---|---|---|---|---|---|
| 91 | Zr | Cl | Me$_2$Si | 2,3,4,5-Me$_4$Cp | $^i$Pr | 5-Me-2-furyl |
| 92 | Zr | Cl | Me$_2$Si | 2,3,4,5-Me$_4$Cp | $^i$Pr | 2-furyl |
| 93 | Zr | Cl | Me$_2$Si | 2,3,4,5-Me$_4$Cp | $^i$Pr | 5-$^t$Bu-2-furyl |
| 94 | Zr | Cl | Me$_2$Si | 2,3,4,5-Me$_4$Cp | $^i$Pr | 5-TMS-2-furyl |
| 95 | Zr | Cl | Me$_2$Si | 2,3,4,5-Me$_4$Cp | $^i$Pr | 5-TES-2-furyl |
| 96 | Zr | Cl | Me$_2$Si | 2,3,4,5-Me$_4$Cp | $^i$Pr | 4,5-Me$_2$-2-furyl |
| 97 | Zr | Cl | Me$_2$Si | 2,3,4,5-Me$_4$Cp | $^i$Pr | 2-benzofuryl |
| 98 | Zr | Cl | Me$_2$Si | 2,3,4,5-Me$_4$Cp | $^i$Pr | 2-thienyl |
| 99 | Zr | Cl | Me$_2$Si | 2,3,4,5-Me$_4$Cp | $^i$Pr | 5-Me-2-thienyl |
| 100 | Zr | Cl | Me$_2$Si | 2,3,4,5-Me$_4$Cp | $^i$Pr | Ph |
| 101 | Zr | Cl | Me$_2$Si | 2,3,4,5-Me$_4$Cp | $^i$Pr | 4-Me—Ph |
| 102 | Zr | Cl | Me$_2$Si | 2,3,4,5-Me$_4$Cp | $^i$Pr | 4-$^i$Pr—Ph |
| 103 | Zr | Cl | Me$_2$Si | 2,3,4,5-Me$_4$Cp | $^i$Pr | 4-$^t$Bu—Ph |
| 104 | Zr | Cl | Me$_2$Si | 2,3,4,5-Me$_4$Cp | $^i$Pr | 4-Ph—Ph |
| 105 | Zr | Cl | Me$_2$Si | 2,3,4,5-Me$_4$Cp | $^i$Pr | 4-TMS-Ph |
| 106 | Zr | Cl | Me$_2$Si | 2,3,4,5-Me$_4$Cp | $^i$Pr | 4-F—Ph |
| 107 | Zr | Cl | Me$_2$Si | 2,3,4,5-Me$_4$Cp | $^i$Pr | 4-Cl—Ph |
| 108 | Zr | Cl | Me$_2$Si | 2,3,4,5-Me$_4$Cp | $^i$Pr | 4-CF$_3$—Ph |
| 109 | Zr | Cl | Me$_2$Si | 2,3,4,5-Me$_4$Cp | $^i$Pr | 2,6-Me$_2$—Ph |
| 110 | Zr | Cl | Me$_2$Si | 2,3,4,5-Me$_4$Cp | $^i$Pr | 2,5-Me$_2$—Ph |
| 111 | Zr | Cl | Me$_2$Si | 2,3,4,5-Me$_4$Cp | $^i$Pr | 3,5-Me$_2$—Ph |
| 112 | Zr | Cl | Me$_2$Si | 2,3,4,5-Me$_4$Cp | $^i$Pr | 3,5-$^i$Pr$_2$—Ph |
| 113 | Zr | Cl | Me$_2$Si | 2,3,4,5-Me$_4$Cp | $^i$Pr | 3,5-$^t$Bu$_2$—Ph |
| 114 | Zr | Cl | Me$_2$Si | 2,3,4,5-Me$_4$Cp | $^n$Bu | 5-Me-2-furyl |
| 115 | Zr | Cl | Me$_2$Si | 2,3,4,5-Me$_4$Cp | $^n$Bu | 2-furyl |
| 116 | Zr | Cl | Me$_2$Si | 2,3,4,5-Me$_4$Cp | $^n$Bu | 5-$^t$Bu-2-furyl |
| 117 | Zr | Cl | Me$_2$Si | 2,3,4,5-Me$_4$Cp | $^n$Bu | 5-TMS-2-furyl |
| 118 | Zr | Cl | Me$_2$Si | 2,3,4,5-Me$_4$Cp | $^n$Bu | 5-TES-2-furyl |
| 119 | Zr | Cl | Me$_2$Si | 2,3,4,5-Me$_4$Cp | $^n$Bu | 4,5-Me$_2$-2-furyl |
| 120 | Zr | Cl | Me$_2$Si | 2,3,4,5-Me$_4$Cp | $^n$Bu | 2-benzofuryl |
| 121 | Zr | Cl | Me$_2$Si | 2,3,4,5-Me$_4$Cp | $^n$Bu | 2-thienyl |
| 122 | Zr | Cl | Me$_2$Si | 2,3,4,5-Me$_4$Cp | $^n$Bu | 5-Me-2-thienyl |
| 123 | Zr | Cl | Me$_2$Si | 2,3,4,5-Me$_4$Cp | $^n$Bu | Ph |
| 124 | Zr | Cl | Me$_2$Si | 2,3,4,5-Me$_4$Cp | $^n$Bu | 4-Me—Ph |
| 125 | Zr | Cl | Me$_2$Si | 2,3,4,5-Me$_4$Cp | $^n$Bu | 4-$^i$Pr—Ph |
| 126 | Zr | Cl | Me$_2$Si | 2,3,4,5-Me$_4$Cp | $^n$Bu | 4-$^t$Bu—Ph |
| 127 | Zr | Cl | Me$_2$Si | 2,3,4,5-Me$_4$Cp | $^n$Bu | 4-Ph—Ph |
| 128 | Zr | Cl | Me$_2$Si | 2,3,4,5-Me$_4$Cp | $^n$Bu | 4-TMS-Ph |
| 129 | Zr | Cl | Me$_2$Si | 2,3,4,5-Me$_4$Cp | $^n$Bu | 4-F—Ph |
| 130 | Zr | Cl | Me$_2$Si | 2,3,4,5-Me$_4$Cp | $^n$Bu | 4-Cl—Ph |
| 131 | Zr | Cl | Me$_2$Si | 2,3,4,5-Me$_4$Cp | $^n$Bu | 4-CF$_3$—Ph |
| 132 | Zr | Cl | Me$_2$Si | 2,3,4,5-Me$_4$Cp | $^n$Bu | 2,6-Me$_2$—Ph |
| 133 | Zr | Cl | Me$_2$Si | 2,3,4,5-Me$_4$Cp | $^n$Bu | 2,5-Me$_2$—Ph |
| 134 | Zr | Cl | Me$_2$Si | 2,3,4,5-Me$_4$Cp | $^n$Bu | 3,5-Me$_2$—Ph |

TABLE 3-continued

| Number | M | $X^1, X^2$ | $R^1R^2Q$ | $R^5R^6R^7R^8Cp$ | $R^9$ | $R^{10}$ |
|---|---|---|---|---|---|---|
| 135 | Zr | Cl | Me$_2$Si | 2,3,4,5-Me$_4$Cp | $^n$Bu | 3,5-$^i$Pr$_2$—Ph |
| 136 | Zr | Cl | Me$_2$Si | 2,3,4,5-Me$_4$Cp | $^n$Bu | 3,5-$^t$Bu$_2$—Ph |

TABLE 4

| Number | M | $X^1, X^2$ | $R^1R^2Q$ | $R^5R^6R^7R^8Cp$ | $R^9$ | $R^{10}$ |
|---|---|---|---|---|---|---|
| 137 | Zr | Cl | Me$_2$Si | 2,3,4,5-Me$_4$Cp | $^i$Bu | 5-Me-2-furyl |
| 138 | Zr | Cl | Me$_2$Si | 2,3,4,5-Me$_4$Cp | $^i$Bu | 2-furyl |
| 139 | Zr | Cl | Me$_2$Si | 2,3,4,5-Me$_4$Cp | $^i$Bu | 5-$^t$Bu-2-furyl |
| 140 | Zr | Cl | Me$_2$Si | 2,3,4,5-Me$_4$Cp | $^i$Bu | 5-TMS-2-furyl |
| 141 | Zr | Cl | Me$_2$Si | 2,3,4,5-Me$_4$Cp | $^i$Bu | 5-TES-2-furyl |
| 142 | Zr | Cl | Me$_2$Si | 2,3,4,5-Me$_4$Cp | $^i$Bu | 4,5-Me$_2$-2-furyl |
| 143 | Zr | Cl | Me$_2$Si | 2,3,4,5-Me$_4$Cp | $^i$Bu | 2-benzofuryl |
| 144 | Zr | Cl | Me$_2$Si | 2,3,4,5-Me$_4$Cp | $^i$Bu | 2-thienyl |
| 145 | Zr | Cl | Me$_2$Si | 2,3,4,5-Me$_4$Cp | $^i$Bu | 5-Me-2-thienyl |
| 146 | Zr | Cl | Me$_2$Si | 2,3,4,5-Me$_4$Cp | $^i$Bu | Ph |
| 147 | Zr | Cl | Me$_2$Si | 2,3,4,5-Me$_4$Cp | $^i$Bu | 4-Me—Ph |
| 148 | Zr | Cl | Me$_2$Si | 2,3,4,5-Me$_4$Cp | $^i$Bu | 4-$^i$Pr—Ph |
| 149 | Zr | Cl | Me$_2$Si | 2,3,4,5-Me$_4$Cp | $^i$Bu | 4-$^t$Bu—Ph |
| 150 | Zr | Cl | Me$_2$Si | 2,3,4,5-Me$_4$Cp | $^i$Bu | 4-Ph—Ph |
| 151 | Zr | Cl | Me$_2$Si | 2,3,4,5-Me$_4$Cp | $^i$Bu | 4-TMS-Ph |
| 152 | Zr | Cl | Me$_2$Si | 2,3,4,5-Me$_4$Cp | $^i$Bu | 4-F—Ph |
| 153 | Zr | Cl | Me$_2$Si | 2,3,4,5-Me$_4$Cp | $^i$Bu | 4-Cl—Ph |
| 154 | Zr | Cl | Me$_2$Si | 2,3,4,5-Me$_4$Cp | $^i$Bu | 4-CF$_3$—Ph |
| 155 | Zr | Cl | Me$_2$Si | 2,3,4,5-Me$_4$Cp | $^i$Bu | 2,6-Me$_2$—Ph |
| 156 | Zr | Cl | Me$_2$Si | 2,3,4,5-Me$_4$Cp | $^i$Bu | 2,5-Me$_2$—Ph |
| 157 | Zr | Cl | Me$_2$Si | 2,3,4,5-Me$_4$Cp | $^i$Bu | 3,5-Me$_2$—Ph |
| 158 | Zr | Cl | Me$_2$Si | 2,3,4,5-Me$_4$Cp | $^i$Bu | 3,5-$^i$Pr$_2$—Ph |
| 159 | Zr | Cl | Me$_2$Si | 2,3,4,5-Me$_4$Cp | $^i$Bu | 3,5-$^t$Bu$_2$—Ph |
| 160 | Zr | Cl | Me$_2$Si | 2,3,4,5-Me$_4$Cp | $^t$Bu | 5-Me-2-furyl |
| 161 | Zr | Cl | Me$_2$Si | 2,3,4,5-Me$_4$Cp | $^t$Bu | 2-furyl |
| 162 | Zr | Cl | Me$_2$Si | 2,3,4,5-Me$_4$Cp | $^t$Bu | 5-$^t$Bu-2-furyl |
| 163 | Zr | Cl | Me$_2$Si | 2,3,4,5-Me$_4$Cp | $^t$Bu | 5-TMS-2-furyl |
| 164 | Zr | Cl | Me$_2$Si | 2,3,4,5-Me$_4$Cp | $^t$Bu | 5-TES-2-furyl |
| 165 | Zr | Cl | Me$_2$Si | 2,3,4,5-Me$_4$Cp | $^t$Bu | 4,5-Me$_2$-2-furyl |
| 166 | Zr | Cl | Me$_2$Si | 2,3,4,5-Me$_4$Cp | $^t$Bu | 2-benzofuryl |
| 167 | Zr | Cl | Me$_2$Si | 2,3,4,5-Me$_4$Cp | $^t$Bu | 2-thienyl |
| 168 | Zr | Cl | Me$_2$Si | 2,3,4,5-Me$_4$Cp | $^t$Bu | 5-Me-2-thienyl |
| 169 | Zr | Cl | Me$_2$Si | 2,3,4,5-Me$_4$Cp | $^t$Bu | Ph |
| 170 | Zr | Cl | Me$_2$Si | 2,3,4,5-Me$_4$Cp | $^t$Bu | 4-Me—Ph |
| 171 | Zr | Cl | Me$_2$Si | 2,3,4,5-Me$_4$Cp | $^t$Bu | 4-$^i$Pr—Ph |
| 172 | Zr | Cl | Me$_2$Si | 2,3,4,5-Me$_4$Cp | $^t$Bu | 4-$^t$Bu—Ph |
| 173 | Zr | Cl | Me$_2$Si | 2,3,4,5-Me$_4$Cp | $^t$Bu | 4-Ph—Ph |
| 174 | Zr | Cl | Me$_2$Si | 2,3,4,5-Me$_4$Cp | $^t$Bu | 4-TMS-Ph |
| 175 | Zr | Cl | Me$_2$Si | 2,3,4,5-Me$_4$Cp | $^t$Bu | 4-F—Ph |
| 176 | Zr | Cl | Me$_2$Si | 2,3,4,5-Me$_4$Cp | $^t$Bu | 4-Cl—Ph |
| 177 | Zr | Cl | Me$_2$Si | 2,3,4,5-Me$_4$Cp | $^t$Bu | 4-CF$_3$—Ph |
| 178 | Zr | Cl | Me$_2$Si | 2,3,4,5-Me$_4$Cp | $^t$Bu | 2,6-Me$_2$—Ph |
| 179 | Zr | Cl | Me$_2$Si | 2,3,4,5-Me$_4$Cp | $^t$Bu | 2,5-Me$_2$—Ph |
| 180 | Zr | Cl | Me$_2$Si | 2,3,4,5-Me$_4$Cp | $^t$Bu | 3,5-Me$_2$—Ph |
| 181 | Zr | Cl | Me$_2$Si | 2,3,4,5-Me$_4$Cp | $^t$Bu | 3,5-$^i$Pr$_2$—Ph |
| 182 | Zr | Cl | Me$_2$Si | 2,3,4,5-Me$_4$Cp | $^t$Bu | 3,5-$^t$Bu$_2$—Ph |

TABLE 5

| Number | M | $X^1, X^2$ | $R^1R^2Q$ | $R^5R^6R^7R^8Cp$ | $R^9$ | $R^{10}$ |
|---|---|---|---|---|---|---|
| 183 | Zr | Cl | Me$_2$Si | 2,3,4,5-Me$_4$Cp | Ph | 5-Me-2-furyl |
| 184 | Zr | Cl | Me$_2$Si | 2,3,4,5-Me$_4$Cp | Ph | 2-furyl |
| 185 | Zr | Cl | Me$_2$Si | 2,3,4,5-Me$_4$Cp | Ph | 5-$^t$Bu-2-furyl |
| 186 | Zr | Cl | Me$_2$Si | 2,3,4,5-Me$_4$Cp | Ph | 5-TMS-2-furyl |
| 187 | Zr | Cl | Me$_2$Si | 2,3,4,5-Me$_4$Cp | Ph | 5-TES-2-furyl |
| 188 | Zr | Cl | Me$_2$Si | 2,3,4,5-Me$_4$Cp | Ph | 4,5-Me$_2$-2-furyl |
| 189 | Zr | Cl | Me$_2$Si | 2,3,4,5-Me$_4$Cp | Ph | 2-benzofuryl |
| 190 | Zr | Cl | Me$_2$Si | 2,3,4,5-Me$_4$Cp | Ph | 2-thienyl |
| 191 | Zr | Cl | Me$_2$Si | 2,3,4,5-Me$_4$Cp | Ph | 5-Me-2-thienyl |
| 192 | Zr | Cl | Me$_2$Si | 2,3,4,5-Me$_4$Cp | Ph | Ph |
| 193 | Zr | Cl | Me$_2$Si | 2,3,4,5-Me$_4$Cp | Ph | 4-Me—Ph |
| 194 | Zr | Cl | Me$_2$Si | 2,3,4,5-Me$_4$Cp | Ph | 4-$^i$Pr—Ph |
| 195 | Zr | Cl | Me$_2$Si | 2,3,4,5-Me$_4$Cp | Ph | 4-$^t$Bu—Ph |
| 196 | Zr | Cl | Me$_2$Si | 2,3,4,5-Me$_4$Cp | Ph | 4-Ph—Ph |
| 197 | Zr | Cl | Me$_2$Si | 2,3,4,5-Me$_4$Cp | Ph | 4-TMS-Ph |
| 198 | Zr | Cl | Me$_2$Si | 2,3,4,5-Me$_4$Cp | Ph | 4-F—Ph |
| 199 | Zr | Cl | Me$_2$Si | 2,3,4,5-Me$_4$Cp | Ph | 4-Cl—Ph |
| 200 | Zr | Cl | Me$_2$Si | 2,3,4,5-Me$_4$Cp | Ph | 4-CF$_3$—Ph |
| 201 | Zr | Cl | Me$_2$Si | 2,3,4,5-Me$_4$Cp | Ph | 2,6-Me$_2$—Ph |
| 202 | Zr | Cl | Me$_2$Si | 2,3,4,5-Me$_4$Cp | Ph | 2,5-Me$_2$—Ph |
| 203 | Zr | Cl | Me$_2$Si | 2,3,4,5-Me$_4$Cp | Ph | 3,5-Me$_2$—Ph |
| 204 | Zr | Cl | Me$_2$Si | 2,3,4,5-Me$_4$Cp | Ph | 3,5-$^i$Pr$_2$—Ph |
| 205 | Zr | Cl | Me$_2$Si | 2,3,4,5-Me$_4$Cp | Ph | 3,5-$^t$Bu$_2$—Ph |

TABLE 6

| Number | M | $X^1, X^2$ | $R^1R^2Q$ | $R^5R^6R^7R^8Cp$ | $R^9$ | $R^{10}$ |
|---|---|---|---|---|---|---|
| 206 | Zr | Cl | Me$_2$Si | 2,3,4,5-Me$_4$Cp | H | 5-Me-2-furyl |
| 207 | Zr | Cl | Me$_2$Si | 2,3,4,5-Me$_4$Cp | H | 2-furyl |
| 208 | Zr | Cl | Me$_2$Si | 2,3,4,5-Me$_4$Cp | H | 5-Et-2-furyl |
| 209 | Zr | Cl | Me$_2$Si | 2,3,4,5-Me$_4$Cp | H | 5-$^n$Pr-2-furyl |
| 210 | Zr | Cl | Me$_2$Si | 2,3,4,5-Me$_4$Cp | H | 5-$^i$Pr-2-furyl |
| 211 | Zr | Cl | Me$_2$Si | 2,3,4,5-Me$_4$Cp | H | 5-$^n$Bu-2-furyl |
| 212 | Zr | Cl | Me$_2$Si | 2,3,4,5-Me$_4$Cp | H | 5-$^i$Bu-2-furyl |
| 213 | Zr | Cl | Me$_2$Si | 2,3,4,5-Me$_4$Cp | H | 5-$^t$Bu-2-furyl |
| 214 | Zr | Cl | Me$_2$Si | 2,3,4,5-Me$_4$Cp | H | 5-TMS-2-furyl |
| 215 | Zr | Cl | Me$_2$Si | 2,3,4,5-Me$_4$Cp | H | 5-TES-2-furyl |
| 216 | Zr | Cl | Me$_2$Si | 2,3,4,5-Me$_4$Cp | H | 5-Ph-2-furyl |
| 217 | Zr | Cl | Me$_2$Si | 2,3,4,5-Me$_4$Cp | H | 5-tolyl-2-furyl |
| 218 | Zr | Cl | Me$_2$Si | 2,3,4,5-Me$_4$Cp | H | 5-fluorophenyl-2-furyl |
| 219 | Zr | Cl | Me$_2$Si | 2,3,4,5-Me$_4$Cp | H | 5-chlorophenyl-2-furyl |
| 220 | Zr | Cl | Me$_2$Si | 2,3,4,5-Me$_4$Cp | H | 4,5-Me$_2$-2-furyl |
| 221 | Zr | Cl | Me$_2$Si | 2,3,4,5-Me$_4$Cp | H | 2-benzofuryl |
| 222 | Zr | Cl | Me$_2$Si | 2,3,4,5-Me$_4$Cp | H | 2-thienyl |
| 223 | Zr | Cl | Me$_2$Si | 2,3,4,5-Me$_4$Cp | H | 5-Me-2-thienyl |
| 224 | Zr | Cl | Me$_2$Si | 2,3,4,5-Me$_4$Cp | H | Ph |
| 225 | Zr | Cl | Me$_2$Si | 2,3,4,5-Me$_4$Cp | H | 4-Me—Ph |
| 226 | Zr | Cl | Me$_2$Si | 2,3,4,5-Me$_4$Cp | H | 4-$^i$Pr—Ph |
| 227 | Zr | Cl | Me$_2$Si | 2,3,4,5-Me$_4$Cp | H | 4-$^t$Bu—Ph |
| 228 | Zr | Cl | Me$_2$Si | 2,3,4,5-Me$_4$Cp | H | 4-Ph—Ph |
| 229 | Zr | Cl | Me$_2$Si | 2,3,4,5-Me$_4$Cp | H | 4-TMS-Ph |
| 230 | Zr | Cl | Me$_2$Si | 2,3,4,5-Me$_4$Cp | H | 4-MeO—Ph |
| 231 | Zr | Cl | Me$_2$Si | 2,3,4,5-Me$_4$Cp | H | 4-PhO—Ph |
| 232 | Zr | Cl | Me$_2$Si | 2,3,4,5-Me$_4$Cp | H | 4-F—Ph |
| 233 | Zr | Cl | Me$_2$Si | 2,3,4,5-Me$_4$Cp | H | 4-Cl—Ph |
| 234 | Zr | Cl | Me$_2$Si | 2,3,4,5-Me$_4$Cp | H | 4-CF$_3$—Ph |
| 235 | Zr | Cl | Me$_2$Si | 2,3,4,5-Me$_4$Cp | H | 2,6-Me$_2$—Ph |
| 236 | Zr | Cl | Me$_2$Si | 2,3,4,5-Me$_4$Cp | H | 2,5-Me$_2$—Ph |
| 237 | Zr | Cl | Me$_2$Si | 2,3,4,5-Me$_4$Cp | H | 3,5-Me$_2$—Ph |
| 238 | Zr | Cl | Me$_2$Si | 2,3,4,5-Me$_4$Cp | H | 3,5-$^i$Pr$_2$—Ph |
| 239 | Zr | Cl | Me$_2$Si | 2,3,4,5-Me$_4$Cp | H | 3,5-$^t$Bu$_2$—Ph |
| 240 | Zr | Cl | Me$_2$Si | 2,3,4,5-Me$_4$Cp | H | 3,5-(MeO)$_2$—Ph |
| 241 | Zr | Cl | Me$_2$Si | 2,3,4,5-Me$_4$Cp | H | 3,5-F$_2$—Ph |
| 242 | Zr | Cl | Me$_2$Si | 2,3,4,5-Me$_4$Cp | H | 3,5-Cl$_2$—Ph |
| 243 | Zr | Cl | Me$_2$Si | 2,3,4,5-Me$_4$Cp | H | 2,4,6-Me$_3$—Ph |
| 244 | Zr | Cl | Me$_2$Si | 2,3,4,5-Me$_4$Cp | H | 2,4,6-F$_3$—Ph |
| 245 | Zr | Cl | Me$_2$Si | 2,3,4,5-Me$_4$Cp | H | 3,4,5-F$_3$—Ph |
| 246 | Zr | Cl | Me$_2$Si | 2,3,4,5-Me$_4$Cp | H | 2,3,5,6-Me$_4$—Ph |
| 247 | Zr | Cl | Me$_2$Si | 2,3,4,5-Me$_4$Cp | H | 2,3,5,6-F$_4$—Ph |
| 248 | Zr | Cl | Me$_2$Si | 2,3,4,5-Me$_4$Cp | H | 2,3,4,5,6-Me$_5$—Ph |
| 249 | Zr | Cl | Me$_2$Si | 2,3,4,5-Me$_4$Cp | H | 2,3,4,5,6-F$_5$—Ph |

TABLE 7

| Number | M | $X^1, X^2$ | $R^1R^2Q$ | $R^5R^6R^7R^8Cp$ | $R^9$ | $R^{10}$ |
|---|---|---|---|---|---|---|
| 250 | Zr | Cl | Me$_2$Si | 2,4,5-Me$_3$Cp | Me | 5-Me-2-furyl |
| 251 | Zr | Cl | Me$_2$Si | 2,4,5-Me$_3$Cp | Me | 2-furyl |
| 252 | Zr | Cl | Me$_2$Si | 2,4,5-Me$_3$Cp | Me | 5-$^t$Bu-2-furyl |

TABLE 7-continued

| Number | M | $X^1, X^2$ | $R^1R^2Q$ | $R^5R^6R^7R^8Cp$ | $R^9$ | $R^{10}$ |
|---|---|---|---|---|---|---|
| 253 | Zr | Cl | $Me_2Si$ | 2,4,5-$Me_3$Cp | Me | 5-TMS-2-furyl |
| 254 | Zr | Cl | $Me_2Si$ | 2,4,5-$Me_3$Cp | Me | 5-TES-2-furyl |
| 255 | Zr | Cl | $Me_2Si$ | 2,4,5-$Me_3$Cp | Me | 4,5-$Me_2$-2-furyl |
| 256 | Zr | Cl | $Me_2Si$ | 2,4,5-$Me_3$Cp | Me | 2-benzofuryl |
| 257 | Zr | Cl | $Me_2Si$ | 2,4,5-$Me_3$Cp | Me | 2-thienyl |
| 258 | Zr | Cl | $Me_2Si$ | 2,4,5-$Me_3$Cp | Me | 5-Me-2-thienyl |
| 259 | Zr | Cl | $Me_2Si$ | 2,4,5-$Me_3$Cp | Me | Ph |
| 260 | Zr | Cl | $Me_2Si$ | 2,4,5-$Me_3$Cp | Me | 4-Me—Ph |
| 261 | Zr | Cl | $Me_2Si$ | 2,4,5-$Me_3$Cp | Me | 4-$^i$Pr—Ph |
| 262 | Zr | Cl | $Me_2Si$ | 2,4,5-$Me_3$Cp | Me | 4-$^t$Bu—Ph |
| 263 | Zr | Cl | $Me_2Si$ | 2,4,5-$Me_3$Cp | Me | 4-Ph—Ph |
| 264 | Zr | Cl | $Me_2Si$ | 2,4,5-$Me_3$Cp | Me | 4-TMS-Ph |
| 265 | Zr | Cl | $Me_2Si$ | 2,4,5-$Me_3$Cp | Me | 4-F—Ph |
| 266 | Zr | Cl | $Me_2Si$ | 2,4,5-$Me_3$Cp | Me | 4-Cl—Ph |
| 267 | Zr | Cl | $Me_2Si$ | 2,4,5-$Me_3$Cp | Me | 4-$CF_3$—Ph |
| 268 | Zr | Cl | $Me_2Si$ | 2,4,5-$Me_3$Cp | Me | 2,6-$Me_2$—Ph |
| 269 | Zr | Cl | $Me_2Si$ | 2,4,5-$Me_3$Cp | Me | 2,5-$Me_2$—Ph |
| 270 | Zr | Cl | $Me_2Si$ | 2,4,5-$Me_3$Cp | Me | 3,5-$Me_2$—Ph |
| 271 | Zr | Cl | $Me_2Si$ | 2,4,5-$Me_3$Cp | Me | 3,5-$^i$Pr$_2$—Ph |
| 272 | Zr | Cl | $Me_2Si$ | 2,4,5-$Me_3$Cp | Me | 3,5-$^t$Bu$_2$—Ph |
| 273 | Zr | Cl | $Me_2Si$ | 2,3,5-$Me_3$Cp | Me | 5-Me-2-furyl |
| 274 | Zr | Cl | $Me_2Si$ | 2,3,5-$Me_3$Cp | Me | 2-furyl |
| 275 | Zr | Cl | $Me_2Si$ | 2,3,5-$Me_3$Cp | Me | 5-$^t$Bu-2-furyl |
| 276 | Zr | Cl | $Me_2Si$ | 2,3,5-$Me_3$Cp | Me | 5-TMS-2-furyl |
| 277 | Zr | Cl | $Me_2Si$ | 2,3,5-$Me_3$Cp | Me | 5-TES-2-furyl |
| 278 | Zr | Cl | $Me_2Si$ | 2,3,5-$Me_3$Cp | Me | 4,5-$Me_2$-2-furyl |
| 279 | Zr | Cl | $Me_2Si$ | 2,3,5-$Me_3$Cp | Me | 2-benzofuryl |
| 280 | Zr | Cl | $Me_2Si$ | 2,3,5-$Me_3$Cp | Me | 2-thienyl |
| 281 | Zr | Cl | $Me_2Si$ | 2,3,5-$Me_3$Cp | Me | 5-Me-2-thienyl |
| 282 | Zr | Cl | $Me_2Si$ | 2,3,5-$Me_3$Cp | Me | Ph |
| 283 | Zr | Cl | $Me_2Si$ | 2,3,5-$Me_3$Cp | Me | 4-Me—Ph |
| 284 | Zr | Cl | $Me_2Si$ | 2,3,5-$Me_3$Cp | Me | 4-$^i$Pr—Ph |
| 285 | Zr | Cl | $Me_2Si$ | 2,3,5-$Me_3$Cp | Me | 4-$^t$Bu—Ph |
| 286 | Zr | Cl | $Me_2Si$ | 2,3,5-$Me_3$Cp | Me | 4-Ph—Ph |
| 287 | Zr | Cl | $Me_2Si$ | 2,3,5-$Me_3$Cp | Me | 4-TMS-Ph |
| 288 | Zr | Cl | $Me_2Si$ | 2,3,5-$Me_3$Cp | Me | 4-F—Ph |
| 289 | Zr | Cl | $Me_2Si$ | 2,3,5-$Me_3$Cp | Me | 4-Cl—Ph |
| 290 | Zr | Cl | $Me_2Si$ | 2,3,5-$Me_3$Cp | Me | 4-$CF_3$—Ph |
| 291 | Zr | Cl | $Me_2Si$ | 2,3,5-$Me_3$Cp | Me | 2,6-$Me_2$—Ph |
| 292 | Zr | Cl | $Me_2Si$ | 2,3,5-$Me_3$Cp | Me | 2,5-$Me_2$—Ph |
| 293 | Zr | Cl | $Me_2Si$ | 2,3,5-$Me_3$Cp | Me | 3,5-$Me_2$—Ph |
| 294 | Zr | Cl | $Me_2Si$ | 2,3,5-$Me_3$Cp | Me | 3,5-$^i$Pr$_2$—Ph |
| 295 | Zr | Cl | $Me_2Si$ | 2,3,5-$Me_3$Cp | Me | 3,5-$^t$Bu$_2$—Ph |

TABLE 8

| Number | M | $X^1, X^2$ | $R^1R^2Q$ | $R^5R^6R^7R^8Cp$ | $R^9$ | $R^{10}$ |
|---|---|---|---|---|---|---|
| 296 | Zr | Cl | $Me_2Si$ | 2,3,4-$Me_3$Cp | Me | 5-Me-2-furyl |
| 297 | Zr | Cl | $Me_2Si$ | 2,3,4-$Me_3$Cp | Me | 2-furyl |
| 298 | Zr | Cl | $Me_2Si$ | 2,3,4-$Me_3$Cp | Me | 5-$^t$Bu-2-furyl |
| 299 | Zr | Cl | $Me_2Si$ | 2,3,4-$Me_3$Cp | Me | 5-TMS-2-furyl |
| 300 | Zr | Cl | $Me_2Si$ | 2,3,4-$Me_3$Cp | Me | 5-TES-2-furyl |
| 301 | Zr | Cl | $Me_2Si$ | 2,3,4-$Me_3$Cp | Me | 4,5-$Me_2$-2-furyl |
| 302 | Zr | Cl | $Me_2Si$ | 2,3,4-$Me_3$Cp | Me | 2-benzofuryl |
| 303 | Zr | Cl | $Me_2Si$ | 2,3,4-$Me_3$Cp | Me | 2-thienyl |
| 304 | Zr | Cl | $Me_2Si$ | 2,3,4-$Me_3$Cp | Me | 5-Me-2-thienyl |
| 305 | Zr | Cl | $Me_2Si$ | 2,3,4-$Me_3$Cp | Me | Ph |
| 306 | Zr | Cl | $Me_2Si$ | 2,3,4-$Me_3$Cp | Me | 4-Me—Ph |
| 307 | Zr | Cl | $Me_2Si$ | 2,3,4-$Me_3$Cp | Me | 4-$^i$Pr—Ph |
| 308 | Zr | Cl | $Me_2Si$ | 2,3,4-$Me_3$Cp | Me | 4-$^t$Bu—Ph |
| 309 | Zr | Cl | $Me_2Si$ | 2,3,4-$Me_3$Cp | Me | 4-Ph—Ph |
| 310 | Zr | Cl | $Me_2Si$ | 2,3,4-$Me_3$Cp | Me | 4-TMS-Ph |
| 311 | Zr | Cl | $Me_2Si$ | 2,3,4-$Me_3$Cp | Me | 4-F—Ph |
| 312 | Zr | Cl | $Me_2Si$ | 2,3,4-$Me_3$Cp | Me | 4-Cl—Ph |
| 313 | Zr | Cl | $Me_2Si$ | 2,3,4-$Me_3$Cp | Me | 4-$CF_3$—Ph |
| 314 | Zr | Cl | $Me_2Si$ | 2,3,4-$Me_3$Cp | Me | 2,6-$Me_2$—Ph |
| 315 | Zr | Cl | $Me_2Si$ | 2,3,4-$Me_3$Cp | Me | 2,5-$Me_2$—Ph |
| 316 | Zr | Cl | $Me_2Si$ | 2,3,4-$Me_3$Cp | Me | 3,5-$Me_2$—Ph |
| 317 | Zr | Cl | $Me_2Si$ | 2,3,4-$Me_3$Cp | Me | 3,5-$^i$Pr$_2$—Ph |
| 318 | Zr | Cl | $Me_2Si$ | 2,3,4-$Me_3$Cp | Me | 3,5-$^t$Bu$_2$—Ph |
| 319 | Zr | Cl | $Me_2Si$ | 3,4,5-$Me_3$Cp | Me | 5-Me-2-furyl |
| 320 | Zr | Cl | $Me_2Si$ | 3,4,5-$Me_3$Cp | Me | 2-furyl |

TABLE 8-continued

| Number | M | $X^1, X^2$ | $R^1R^2Q$ | $R^5R^6R^7R^8Cp$ | $R^9$ | $R^{10}$ |
|---|---|---|---|---|---|---|
| 321 | Zr | Cl | $Me_2Si$ | 3,4,5-$Me_3$Cp | Me | 5-$^t$Bu-2-furyl |
| 322 | Zr | Cl | $Me_2Si$ | 3,4,5-$Me_3$Cp | Me | 5-TMS-2-furyl |
| 323 | Zr | Cl | $Me_2Si$ | 3,4,5-$Me_3$Cp | Me | 5-TES-2-furyl |
| 324 | Zr | Cl | $Me_2Si$ | 3,4,5-$Me_3$Cp | Me | 4,5-$Me_2$-2-furyl |
| 325 | Zr | Cl | $Me_2Si$ | 3,4,5-$Me_3$Cp | Me | 2-benzofuryl |
| 326 | Zr | Cl | $Me_2Si$ | 3,4,5-$Me_3$Cp | Me | 2-thienyl |
| 327 | Zr | Cl | $Me_2Si$ | 3,4,5-$Me_3$Cp | Me | 5-Me-2-thienyl |
| 328 | Zr | Cl | $Me_2Si$ | 3,4,5-$Me_3$Cp | Me | Ph |
| 329 | Zr | Cl | $Me_2Si$ | 3,4,5-$Me_3$Cp | Me | 4-Me—Ph |
| 330 | Zr | Cl | $Me_2Si$ | 3,4,5-$Me_3$Cp | Me | 4-$^i$Pr—Ph |
| 331 | Zr | Cl | $Me_2Si$ | 3,4,5-$Me_3$Cp | Me | 4-$^t$Bu—Ph |
| 332 | Zr | Cl | $Me_2Si$ | 3,4,5-$Me_3$Cp | Me | 4-Ph—Ph |
| 333 | Zr | Cl | $Me_2Si$ | 3,4,5-$Me_3$Cp | Me | 4-TMS-Ph |
| 334 | Zr | Cl | $Me_2Si$ | 3,4,5-$Me_3$Cp | Me | 4-F—Ph |
| 335 | Zr | Cl | $Me_2Si$ | 3,4,5-$Me_3$Cp | Me | 4-Cl—Ph |
| 336 | Zr | Cl | $Me_2Si$ | 3,4,5-$Me_3$Cp | Me | 4-$CF_3$—Ph |
| 337 | Zr | Cl | $Me_2Si$ | 3,4,5-$Me_3$Cp | Me | 2,6-$Me_2$—Ph |
| 338 | Zr | Cl | $Me_2Si$ | 3,4,5-$Me_3$Cp | Me | 2,5-$Me_2$—Ph |
| 339 | Zr | Cl | $Me_2Si$ | 3,4,5-$Me_3$Cp | Me | 3,5-$Me_2$—Ph |
| 340 | Zr | Cl | $Me_2Si$ | 3,4,5-$Me_3$Cp | Me | 3,5-$^i$Pr$_2$—Ph |
| 341 | Zr | Cl | $Me_2Si$ | 3,4,5-$Me_3$Cp | Me | 3,5-$^t$Bu$_2$—Ph |

TABLE 9

| Number | M | $X^1, X^2$ | $R^1R^2Q$ | $R^5R^6R^7R^8Cp$ | $R^9$ | $R^{10}$ |
|---|---|---|---|---|---|---|
| 342 | Zr | Cl | $Et_2Si$ | 2,3,4,5-$Me_4$Cp | Me | 5-Me-2-furyl |
| 343 | Zr | Cl | $Et_2Si$ | 2,3,4,5-$Me_4$Cp | Me | 5-$^t$Bu-2-furyl |
| 344 | Zr | Cl | $Et_2Si$ | 2,3,4,5-$Me_4$Cp | Me | 5-TMS-2-furyl |
| 345 | Zr | Cl | $Et_2Si$ | 2,3,4,5-$Me_4$Cp | Me | 4,5-$Me_2$-2-furyl |
| 346 | Zr | Cl | $Et_2Si$ | 2,3,4,5-$Me_4$Cp | Me | 2-benzofuryl |
| 347 | Zr | Cl | $Et_2Si$ | 2,3,4,5-$Me_4$Cp | Me | 2-thienyl |
| 348 | Zr | Cl | $Et_2Si$ | 2,3,4,5-$Me_4$Cp | Me | 5-Me-2-thienyl |
| 349 | Zr | Cl | $Et_2Si$ | 2,3,4,5-$Me_4$Cp | Me | Ph |
| 350 | Zr | Cl | $Et_2Si$ | 2,3,4,5-$Me_4$Cp | Me | 4-$^i$Pr—Ph |
| 351 | Zr | Cl | $Et_2Si$ | 2,3,4,5-$Me_4$Cp | Me | 4-$^t$Bu—Ph |
| 352 | Zr | Cl | $Et_2Si$ | 2,3,4,5-$Me_4$Cp | Me | 4-Ph—Ph |
| 353 | Zr | Cl | $Et_2Si$ | 2,3,4,5-$Me_4$Cp | Me | 4-TMS-Ph |
| 354 | Zr | Cl | $Et_2Si$ | 2,3,4,5-$Me_4$Cp | Me | 4-F—Ph |
| 355 | Zr | Cl | $Et_2Si$ | 2,3,4,5-$Me_4$Cp | Me | 4-Cl—Ph |
| 356 | Zr | Cl | $Et_2Si$ | 2,3,4,5-$Me_4$Cp | Me | 2,6-$Me_2$—Ph |
| 357 | Zr | Cl | $Et_2Si$ | 2,3,4,5-$Me_4$Cp | Me | 3,5-$Me_2$—Ph |
| 358 | Zr | Cl | $Et_2Si$ | 2,3,4,5-$Me_4$Cp | Me | 3,5-$^i$Pr$_2$—Ph |
| 359 | Zr | Cl | $Et_2Si$ | 2,3,4,5-$Me_4$Cp | Me | 3,5-$^t$Bu$_2$—Ph |
| 360 | Zr | Cl | $Ph_2Si$ | 2,3,4,5-$Me_4$Cp | Me | 5-Me-2-furyl |
| 361 | Zr | Cl | $Ph_2Si$ | 2,3,4,5-$Me_4$Cp | Me | 5-$^t$Bu-2-furyl |
| 362 | Zr | Cl | $Ph_2Si$ | 2,3,4,5-$Me_4$Cp | Me | 5-TMS-2-furyl |
| 363 | Zr | Cl | $Ph_2Si$ | 2,3,4,5-$Me_4$Cp | Me | 4,5-$Me_2$-2-furyl |
| 364 | Zr | Cl | $Ph_2Si$ | 2,3,4,5-$Me_4$Cp | Me | 2-benzofuryl |
| 365 | Zr | Cl | $Ph_2Si$ | 2,3,4,5-$Me_4$Cp | Me | 2-thienyl |
| 366 | Zr | Cl | $Ph_2Si$ | 2,3,4,5-$Me_4$Cp | Me | 5-Me-2-thienyl |
| 367 | Zr | Cl | $Ph_2Si$ | 2,3,4,5-$Me_4$Cp | Me | Ph |
| 368 | Zr | Cl | $Ph_2Si$ | 2,3,4,5-$Me_4$Cp | Me | 4-$^i$Pr—Ph |
| 369 | Zr | Cl | $Ph_2Si$ | 2,3,4,5-$Me_4$Cp | Me | 4-$^t$Bu—Ph |
| 370 | Zr | Cl | $Ph_2Si$ | 2,3,4,5-$Me_4$Cp | Me | 4-Ph—Ph |
| 371 | Zr | Cl | $Ph_2Si$ | 2,3,4,5-$Me_4$Cp | Me | 4-TMS-Ph |
| 372 | Zr | Cl | $Ph_2Si$ | 2,3,4,5-$Me_4$Cp | Me | 4-F—Ph |
| 373 | Zr | Cl | $Ph_2Si$ | 2,3,4,5-$Me_4$Cp | Me | 4-Cl—Ph |
| 374 | Zr | Cl | $Ph_2Si$ | 2,3,4,5-$Me_4$Cp | Me | 2,6-$Me_2$—Ph |
| 375 | Zr | Cl | $Ph_2Si$ | 2,3,4,5-$Me_4$Cp | Me | 3,5-$Me_2$—Ph |
| 376 | Zr | Cl | $Ph_2Si$ | 2,3,4,5-$Me_4$Cp | Me | 3,5-$^i$Pr$_2$—Ph |
| 377 | Zr | Cl | $Ph_2Si$ | 2,3,4,5-$Me_4$Cp | Me | 3,5-$^t$Bu$_2$—Ph |

TABLE 10

| Number | M | X¹, X² | R¹R²Q | R⁵R⁶R⁷R⁸Cp | R⁹ | R¹⁰ |
|---|---|---|---|---|---|---|
| 378 | Zr | Cl | silacyclobutylene | 2,3,4,5-Me₄Cp | Me | 5-Me-2-furyl |
| 379 | Zr | Cl | silacyclobutylene | 2,3,4,5-Me₄Cp | Me | 5-$^t$Bu-2-furyl |
| 380 | Zr | Cl | silacyclobutylene | 2,3,4,5-Me₄Cp | Me | 5-TMS-2-furyl |
| 381 | Zr | Cl | silacyclobutylene | 2,3,4,5-Me₄Cp | Me | 4,5-Me₂-2-furyl |
| 382 | Zr | Cl | silacyclobutylene | 2,3,4,5-Me₄Cp | Me | 2-benzofuryl |
| 383 | Zr | Cl | silacyclobutylene | 2,3,4,5-Me₄Cp | Me | 2-thienyl |
| 384 | Zr | Cl | silacyclobutylene | 2,3,4,5-Me₄Cp | Me | 5-Me-2-thienyl |
| 385 | Zr | Cl | silacyclobutylene | 2,3,4,5-Me₄Cp | Me | Ph |
| 386 | Zr | Cl | silacyclobutylene | 2,3,4,5-Me₄Cp | Me | 4-$^i$Pr—Ph |
| 387 | Zr | Cl | silacyclobutylene | 2,3,4,5-Me₄Cp | Me | 4-$^t$Bu—Ph |
| 388 | Zr | Cl | silacyclobutylene | 2,3,4,5-Me₄Cp | Me | 4-Ph—Ph |
| 389 | Zr | Cl | silacyclobutylene | 2,3,4,5-Me₄Cp | Me | 4-TMS-Ph |
| 390 | Zr | Cl | silacyclobutylene | 2,3,4,5-Me₄Cp | Me | 4-F—Ph |
| 391 | Zr | Cl | silacyclobutylene | 2,3,4,5-Me₄Cp | Me | 4-Cl—Ph |
| 392 | Zr | Cl | silacyclobutylene | 2,3,4,5-Me₄Cp | Me | 2,6-Me₂—Ph |
| 393 | Zr | Cl | silacyclobutylene | 2,3,4,5-Me₄Cp | Me | 3,5-Me₂—Ph |
| 394 | Zr | Cl | silacyclobutylene | 2,3,4,5-Me₄Cp | Me | 3,5-$^i$Pr₂—Ph |
| 395 | Zr | Cl | silacyclobutylene | 2,3,4,5-Me₄Cp | Me | 3,5-$^t$Bu₂—Ph |
| 396 | Zr | Cl | Me₂C | 2,3,4,5-Me₄Cp | Me | 5-Me-2-furyl |
| 397 | Zr | Cl | Me₂C | 2,3,4,5-Me₄Cp | Me | 5-$^t$Bu-2-furyl |
| 398 | Zr | Cl | Me₂C | 2,3,4,5-Me₄Cp | Me | 5-TMS-2-furyl |
| 399 | Zr | Cl | Me₂C | 2,3,4,5-Me₄Cp | Me | 4,5-Me₂-2-furyl |
| 400 | Zr | Cl | Me₂C | 2,3,4,5-Me₄Cp | Me | 2-benzofuryl |
| 401 | Zr | Cl | Me₂C | 2,3,4,5-Me₄Cp | Me | 2-thienyl |
| 402 | Zr | Cl | Me₂C | 2,3,4,5-Me₄Cp | Me | 5-Me-2-thienyl |
| 403 | Zr | Cl | Me₂C | 2,3,4,5-Me₄Cp | Me | Ph |
| 404 | Zr | Cl | Me₂C | 2,3,4,5-Me₄Cp | Me | 4-$^i$Pr—Ph |
| 405 | Zr | Cl | Me₂C | 2,3,4,5-Me₄Cp | Me | 4-$^t$Bu—Ph |
| 406 | Zr | Cl | Me₂C | 2,3,4,5-Me₄Cp | Me | 4-Ph—Ph |
| 407 | Zr | Cl | Me₂C | 2,3,4,5-Me₄Cp | Me | 4-TMS-Ph |
| 408 | Zr | Cl | Me₂C | 2,3,4,5-Me₄Cp | Me | 4-F—Ph |
| 409 | Zr | Cl | Me₂C | 2,3,4,5-Me₄Cp | Me | 4-Cl—Ph |
| 410 | Zr | Cl | Me₂C | 2,3,4,5-Me₄Cp | Me | 2,6-Me₂—Ph |
| 411 | Zr | Cl | Me₂C | 2,3,4,5-Me₄Cp | Me | 3,5-Me₂—Ph |
| 412 | Zr | Cl | Me₂C | 2,3,4,5-Me₄Cp | Me | 3,5-$^i$Pr₂—Ph |
| 413 | Zr | Cl | Me₂C | 2,3,4,5-Me₄Cp | Me | 3,5-$^t$Bu₂—Ph |

TABLE 11

| Number | M | X¹, X² | R¹R²Q | R⁵R⁶R⁷R⁸Cp | R⁹ | R¹⁰ |
|---|---|---|---|---|---|---|
| 414 | Zr | Cl | H₂C | 2,3,4,5-Me₄Cp | Me | 5-Me-2-furyl |
| 415 | Zr | Cl | H₂C | 2,3,4,5-Me₄Cp | Me | 5-$^t$Bu-2-furyl |
| 416 | Zr | Cl | H₂C | 2,3,4,5-Me₄Cp | Me | 5-TMS-2-furyl |
| 417 | Zr | Cl | H₂C | 2,3,4,5-Me₄Cp | Me | 4,5-Me₂-2-furyl |
| 418 | Zr | Cl | H₂C | 2,3,4,5-Me₄Cp | Me | 2-benzofuryl |
| 419 | Zr | Cl | H₂C | 2,3,4,5-Me₄Cp | Me | 2-thienyl |
| 420 | Zr | Cl | H₂C | 2,3,4,5-Me₄Cp | Me | 5-Me-2-thienyl |
| 421 | Zr | Cl | H₂C | 2,3,4,5-Me₄Cp | Me | Ph |
| 422 | Zr | Cl | H₂C | 2,3,4,5-Me₄Cp | Me | 4-$^i$Pr—Ph |
| 423 | Zr | Cl | H₂C | 2,3,4,5-Me₄Cp | Me | 4-$^t$Bu—Ph |
| 424 | Zr | Cl | H₂C | 2,3,4,5-Me₄Cp | Me | 4-Ph—Ph |
| 425 | Zr | Cl | H₂C | 2,3,4,5-Me₄Cp | Me | 4-TMS-Ph |
| 426 | Zr | Cl | H₂C | 2,3,4,5-Me₄Cp | Me | 4-F—Ph |
| 427 | Zr | Cl | H₂C | 2,3,4,5-Me₄Cp | Me | 4-Cl—Ph |
| 428 | Zr | Cl | H₂C | 2,3,4,5-Me₄Cp | Me | 2,6-Me₂—Ph |
| 429 | Zr | Cl | H₂C | 2,3,4,5-Me₄Cp | Me | 3,5-Me₂—Ph |
| 430 | Zr | Cl | H₂C | 2,3,4,5-Me₄Cp | Me | 3,5-$^i$Pr₂—Ph |
| 431 | Zr | Cl | H₂C | 2,3,4,5-Me₄Cp | Me | 3,5-$^t$Bu₂—Ph |
| 432 | Zr | Cl | Ph₂C | 2,3,4,5-Me₄Cp | Me | 5-Me-2-furyl |
| 433 | Zr | Cl | Ph₂C | 2,3,4,5-Me₄Cp | Me | 5-$^t$Bu-2-furyl |
| 434 | Zr | Cl | Ph₂C | 2,3,4,5-Me₄Cp | Me | 5-TMS-2-furyl |
| 435 | Zr | Cl | Ph₂C | 2,3,4,5-Me₄Cp | Me | 4,5-Me₂-2-furyl |
| 436 | Zr | Cl | Ph₂C | 2,3,4,5-Me₄Cp | Me | 2-benzofuryl |
| 437 | Zr | Cl | Ph₂C | 2,3,4,5-Me₄Cp | Me | 2-thienyl |
| 438 | Zr | Cl | Ph₂C | 2,3,4,5-Me₄Cp | Me | 5-Me-2-thienyl |
| 439 | Zr | Cl | Ph₂C | 2,3,4,5-Me₄Cp | Me | Ph |
| 440 | Zr | Cl | Ph₂C | 2,3,4,5-Me₄Cp | Me | 4-$^i$Pr—Ph |
| 441 | Zr | Cl | Ph₂C | 2,3,4,5-Me₄Cp | Me | 4-$^t$Bu—Ph |
| 442 | Zr | Cl | Ph₂C | 2,3,4,5-Me₄Cp | Me | 4-Ph—Ph |
| 443 | Zr | Cl | Ph₂C | 2,3,4,5-Me₄Cp | Me | 4-TMS-Ph |
| 444 | Zr | Cl | Ph₂C | 2,3,4,5-Me₄Cp | Me | 4-F—Ph |
| 445 | Zr | Cl | Ph₂C | 2,3,4,5-Me₄Cp | Me | 4-Cl—Ph |
| 446 | Zr | Cl | Ph₂C | 2,3,4,5-Me₄Cp | Me | 2,6-Me₂—Ph |
| 447 | Zr | Cl | Ph₂C | 2,3,4,5-Me₄Cp | Me | 3,5-Me₂—Ph |
| 448 | Zr | Cl | Ph₂C | 2,3,4,5-Me₄Cp | Me | 3,5-$^i$Pr₂—Ph |
| 449 | Zr | Cl | Ph₂C | 2,3,4,5-Me₄Cp | Me | 3,5-$^t$Bu₂—Ph |

TABLE 12

| Number | M | X¹, X² | R¹R²Q | R⁵R⁶R⁷R⁸Cp | R⁹ | R¹⁰ |
|---|---|---|---|---|---|---|
| 450 | Zr | Cl | cyclobutylene | 2,3,4,5-Me₄Cp | Me | 5-Me-2-furyl |
| 451 | Zr | Cl | cyclobutylene | 2,3,4,5-Me₄Cp | Me | 5-$^t$Bu-2-furyl |
| 452 | Zr | Cl | cyclobutylene | 2,3,4,5-Me₄Cp | Me | 5-TMS-2-furyl |
| 453 | Zr | Cl | cyclobutylene | 2,3,4,5-Me₄Cp | Me | 4,5-Me₂-2-furyl |
| 454 | Zr | Cl | cyclobutylene | 2,3,4,5-Me₄Cp | Me | 2-benzofuryl |
| 455 | Zr | Cl | cyclobutylene | 2,3,4,5-Me₄Cp | Me | 2-thienyl |
| 456 | Zr | Cl | cyclobutylene | 2,3,4,5-Me₄Cp | Me | 5-Me-2-thienyl |
| 457 | Zr | Cl | cyclobutylene | 2,3,4,5-Me₄Cp | Me | Ph |
| 458 | Zr | Cl | cyclobutylene | 2,3,4,5-Me₄Cp | Me | 4-$^i$Pr—Ph |
| 459 | Zr | Cl | cyclobutylene | 2,3,4,5-Me₄Cp | Me | 4-$^t$Bu—Ph |
| 460 | Zr | Cl | cyclobutylene | 2,3,4,5-Me₄Cp | Me | 4-Ph—Ph |
| 461 | Zr | Cl | cyclobutylene | 2,3,4,5-Me₄Cp | Me | 4-TMS-Ph |
| 462 | Zr | Cl | cyclobutylene | 2,3,4,5-Me₄Cp | Me | 4-F—Ph |
| 463 | Zr | Cl | cyclobutylene | 2,3,4,5-Me₄Cp | Me | 4-Cl—Ph |
| 464 | Zr | Cl | cyclobutylene | 2,3,4,5-Me₄Cp | Me | 2,6-Me₂—Ph |
| 465 | Zr | Cl | cyclobutylene | 2,3,4,5-Me₄Cp | Me | 3,5-Me₂—Ph |
| 466 | Zr | Cl | cyclobutylene | 2,3,4,5-Me₄Cp | Me | 3,5-$^i$Pr₂—Ph |
| 467 | Zr | Cl | cyclobutylene | 2,3,4,5-Me₄Cp | Me | 3,5-$^t$Bu₂—Ph |
| 468 | Zr | Br | Me₂Si | 2,3,4,5-Me₄Cp | Me | 5-Me-2-furyl |
| 469 | Zr | Br | Me₂Si | 2,3,4,5-Me₄Cp | Me | 5-TMS-2-furyl |
| 470 | Zr | Br | Me₂Si | 2,3,4,5-Me₄Cp | Me | 4,5-Me₂-2-furyl |
| 471 | Zr | Br | Me₂Si | 2,3,4,5-Me₄Cp | Me | 2-benzofuryl |
| 472 | Zr | Br | Me₂Si | 2,3,4,5-Me₄Cp | Me | 5-Me-2-thienyl |
| 473 | Zr | Br | Me₂Si | 2,3,4,5-Me₄Cp | Me | Ph |
| 474 | Zr | Br | Me₂Si | 2,3,4,5-Me₄Cp | Me | 4-$^i$Pr—Ph |
| 475 | Zr | Br | Me₂Si | 2,3,4,5-Me₄Cp | Me | 4-$^t$Bu—Ph |
| 476 | Zr | Br | Me₂Si | 2,3,4,5-Me₄Cp | Me | 4-Ph—Ph |
| 477 | Zr | Br | Me₂Si | 2,3,4,5-Me₄Cp | Me | 4-TMS-Ph |

TABLE 12-continued

| Number | M | $X^1, X^2$ | $R^1R^2Q$ | $R^5R^6R^7R^8Cp$ | $R^9$ | $R^{10}$ |
|---|---|---|---|---|---|---|
| 478 | Zr | Me | Me$_2$Si | 2,3,4,5-Me$_4$Cp | Me | 5-Me-2-furyl |
| 479 | Zr | Me | Me$_2$Si | 2,3,4,5-Me$_4$Cp | Me | 5-TMS-2-furyl |
| 480 | Zr | Me | Me$_2$Si | 2,3,4,5-Me$_4$Cp | Me | 4,5-Me$_2$-2-furyl |
| 481 | Zr | Me | Me$_2$Si | 2,3,4,5-Me$_4$Cp | Me | 2-benzofuryl |
| 482 | Zr | Me | Me$_2$Si | 2,3,4,5-Me$_4$Cp | Me | 5-Me-2-thienyl |
| 483 | Zr | Me | Me$_2$Si | 2,3,4,5-Me$_4$Cp | Me | Ph |
| 484 | Zr | Me | Me$_2$Si | 2,3,4,5-Me$_4$Cp | Me | 4-$^i$Pr—Ph |
| 485 | Zr | Me | Me$_2$Si | 2,3,4,5-Me$_4$Cp | Me | 4-$^t$Bu—Ph |
| 486 | Zr | Me | Me$_2$Si | 2,3,4,5-Me$_4$Cp | Me | 4-Ph—Ph |
| 487 | Zr | Me | Me$_2$Si | 2,3,4,5-Me$_4$Cp | Me | 4-TMS-Ph |

TABLE 13

| Number | M | $X^1, X^2$ | $R^1R^2Q$ | $R^5R^6R^7R^8Cp$ | $R^9$ | $R^{10}$ |
|---|---|---|---|---|---|---|
| 488 | Zr | NMe$_2$ | Me$_2$Si | 2,3,4,5-Me$_4$Cp | Me | 5-Me-2-furyl |
| 489 | Zr | NMe$_2$ | Me$_2$Si | 2,3,4,5-Me$_4$Cp | Me | 5-TMS-2-furyl |
| 490 | Zr | NMe$_2$ | Me$_2$Si | 2,3,4,5-Me$_4$Cp | Me | 4,5-Me$_2$-2-furyl |
| 491 | Zr | NMe$_2$ | Me$_2$Si | 2,3,4,5-Me$_4$Cp | Me | 2-benzofuryl |
| 492 | Zr | NMe$_2$ | Me$_2$Si | 2,3,4,5-Me$_4$Cp | Me | 5-Me-2-thienyl |
| 493 | Zr | NMe$_2$ | Me$_2$Si | 2,3,4,5-Me$_4$Cp | Me | Ph |
| 494 | Zr | NMe$_2$ | Me$_2$Si | 2,3,4,5-Me$_4$Cp | Me | 4-$^i$Pr—Ph |
| 495 | Zr | NMe$_2$ | Me$_2$Si | 2,3,4,5-Me$_4$Cp | Me | 4-$^t$Bu—Ph |
| 496 | Zr | NMe$_2$ | Me$_2$Si | 2,3,4,5-Me$_4$Cp | Me | 4-Ph—Ph |
| 497 | Zr | NMe$_2$ | Me$_2$Si | 2,3,4,5-Me$_4$Cp | Me | 4-TMS-Ph |
| 498 | Zr | OCH$_3$ | Me$_2$Si | 2,3,4,5-Me$_4$Cp | Me | 5-Me-2-furyl |
| 499 | Zr | OCH$_3$ | Me$_2$Si | 2,3,4,5-Me$_4$Cp | Me | 5-TMS-2-furyl |
| 500 | Zr | OCH$_3$ | Me$_2$Si | 2,3,4,5-Me$_4$Cp | Me | 4,5-Me$_2$-2-furyl |
| 501 | Zr | OCH$_3$ | Me$_2$Si | 2,3,4,5-Me$_4$Cp | Me | 2-benzofuryl |
| 502 | Zr | OCH$_3$ | Me$_2$Si | 2,3,4,5-Me$_4$Cp | Me | 5-Me-2-thienyl |
| 503 | Zr | OCH$_3$ | Me$_2$Si | 2,3,4,5-Me$_4$Cp | Me | Ph |
| 504 | Zr | OCH$_3$ | Me$_2$Si | 2,3,4,5-Me$_4$Cp | Me | 4-$^i$Pr—Ph |
| 505 | Zr | OCH$_3$ | Me$_2$Si | 2,3,4,5-Me$_4$Cp | Me | 4-$^t$Bu—Ph |
| 506 | Zr | OCH$_3$ | Me$_2$Si | 2,3,4,5-Me$_4$Cp | Me | 4-Ph—Ph |
| 507 | Zr | OCH$_3$ | Me$_2$Si | 2,3,4,5-Me$_4$Cp | Me | 4-TMS-Ph |
| 508 | Zr | OPh | Me$_2$Si | 2,3,4,5-Me$_4$Cp | Me | 5-Me-2-furyl |
| 509 | Zr | OPh | Me$_2$Si | 2,3,4,5-Me$_4$Cp | Me | 5-TMS-2-furyl |
| 510 | Zr | OPh | Me$_2$Si | 2,3,4,5-Me$_4$Cp | Me | 4,5-Me$_2$-2-furyl |
| 511 | Zr | OPh | Me$_2$Si | 2,3,4,5-Me$_4$Cp | Me | 2-benzofuryl |
| 512 | Zr | OPh | Me$_2$Si | 2,3,4,5-Me$_4$Cp | Me | 5-Me-2-thienyl |
| 513 | Zr | OPh | Me$_2$Si | 2,3,4,5-Me$_4$Cp | Me | Ph |
| 514 | Zr | OPh | Me$_2$Si | 2,3,4,5-Me$_4$Cp | Me | 4-$^i$Pr—Ph |
| 515 | Zr | OPh | Me$_2$Si | 2,3,4,5-Me$_4$Cp | Me | 4-$^t$Bu—Ph |
| 516 | Zr | OPh | Me$_2$Si | 2,3,4,5-Me$_4$Cp | Me | 4-Ph—Ph |
| 517 | Zr | OPh | Me$_2$Si | 2,3,4,5-Me$_4$Cp | Me | 4-TMS-Ph |

Moreover, there may be mentioned compounds in which zirconium of the above-described compounds is replaced by titanium or hafnium, and the like, as preferred ones.

2. Synthetic Method of Metallocene Compounds

The metallocene compound of the present invention can be synthesized by any methods depending on the substituents or bonding modes. An example of representative synthetic routes is shown below.

[Chem 10]

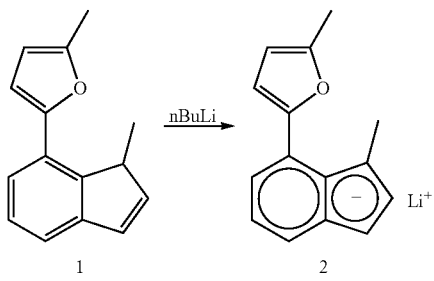

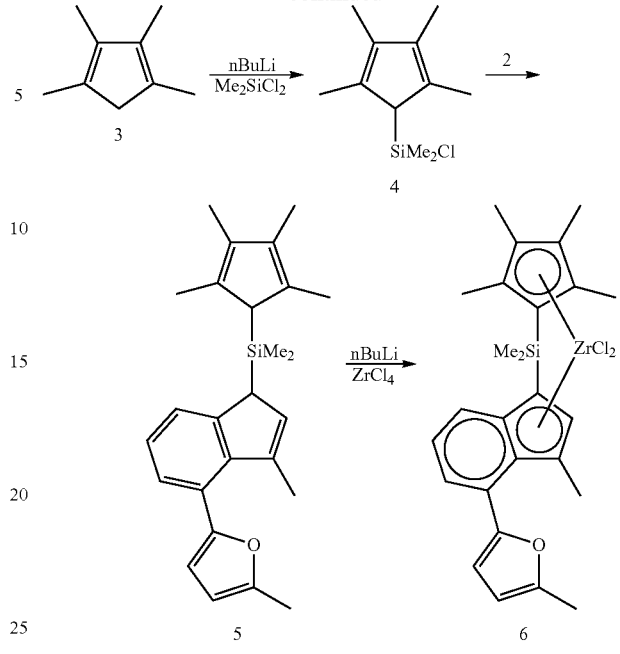

In the above synthetic route, after 3 is anionized with one equivalent of n-butyllithium or the like, the anion is reacted with an excess amount of dimethyldichlorosilane and unreacted dimethyldichlorosilane is removed by distillation to obtain 4. The resulting 4 is reacted with 2, which is obtained by treating 1 with one equivalent of an anionizing agent such as n-butyllithium beforehand, to obtain 5. After 5 is dianionized with two equivalents of n-butyllithium or the like, the reaction with zirconium tetrachloride is carried out to obtain 6.

As for the synthesis of the metallocene compound into which a substituent different from one in the above synthetic example is introduced, the synthesis can be achieved by using a corresponding substituted raw material. By using a substituted indene having a phenyl group, a 4-trimethylsilylphenyl group, a 4-methylphenyl group, a 4-i-propylphenyl group, a 4-t-butylphenyl group, a 4-chlorophenyl group, or the like instead of the 5-methyl-2-furyl group at the 7-position of the indene of 1, a metallocene compound having the each corresponding substituent introduced into the 4-position of the indenyl ring can be synthesized. Also, by using a substituted indene having an ethyl group, an i-propyl group, a t-butyl group, or a phenyl group instead of the methyl group at the 1-position of the indene of 1, a metallocene compound having the each corresponding substituent introduced into the 3-position of the indenyl ring can be synthesized. Alternatively, by using an indene having no substituent at the 1-position of the indene of 1, a metallocene compound having no substituent at the 3-position of the indenyl ring can be synthesized. Further, by using a substituted indene having a substituent also at least one of the 4-position, 5-position, and 6-position of the indene of 1, there can be synthesized a metallocene compound having the corresponding substituent introduced into the 5-position, 6-position, and 7-position of the indenyl ring, respectively.

Moreover, by using a corresponding substituted cyclopentadiene, for example, 2,3,5-trimethylcyclopentadiene, 2-ethyl-4,5-dimethylcyclopentadiene, or the like instead of 3, there can be synthesized a metallocene compound in which the each corresponding substituent is introduced into the cyclopentadiene.

Furthermore, by using a corresponding silane compound such as diethyldichlorosilane, diphenyldichlorosilane, or 1,1-dichlorosilacyclobutane instead of dimethyldichlorosilane that is a bridging agent, a metallocene compound having the corresponding bridging group can be synthesized. In addition, with reference to Z. Naturforsch. 49b, 451-458 (1994), there can be introduced a bridging group structure in the case where m is 1 and a bridging group structure in which $R^1$, $R^2$, $R^3$, and $R^4$ form a ring together with $Q^1$ and $Q^2$ bonded thereto. As for the metal M, a metallocene compound in which the metal M is titanium or hafnium can be synthesized by using titanium tetrachloride or hafnium tetrachloride, respectively, instead of zirconium tetrachloride, 3. Catalyst for Olefin Polymerization (1) Individual Components The metallocene compound of the present invention forms a catalyst component for olefin polymerization and the catalyst component can be used for a catalyst for olefin polymerization.

The catalyst for olefin polymerization of the present invention can contain known components in addition to the aforementioned metallocene compound of the present invention but preferably contains the following components (A), (B), and (C).

Component (A): the metallocene compound of the present invention

Component (B): a compound reacting with the metallocene compound of the component (A) to form a cationic metallocene compound, and Component (C): a fine particle carrier.

(2) Component (A)

The catalyst for olefin polymerization of the present invention uses the metallocene compound represented by any of the aforementioned general formulae (1) to (3) as an essential component (A), and it is also possible to use one or two or more compounds thereof.

(3) Component (B)

The catalyst for olefin polymerization of the present invention preferably contains, as a component (B), a compound reacting with the metallocene compound of the component (A) to form a cationic metallocene compound, in addition to the above component (A).

The component (B) is not particularly limited as long as it is a compound reacting with the component (A) to form a cationic metallocene compound, and known components may be used but there may be, for example, mentioned organoaluminum oxy compounds and borane compounds, borate compounds, and the like.

When an organoaluminum oxy compound is used as the component (B), the degree of strain hardening (λmax) of the resulting ethylene-based polymer becomes large and/or Mz/Mw (where Mz represents Z-average molecular weight measured by GPC and Mw represents weight-average molecular weight measured by GPC) that is a measure of the content of high-molecular-weight components increases, and thus the processability is more improved, so that the use is preferred.

When a borane compound or a borate compound is used as the component (B), the polymerization activity and copolymerizability become high, so that the productivity of the ethylene-based polymer having long-chain branches is improved.

Moreover, as the component (B), it is also possible to use a mixture of the above organoaluminum oxy compound and the above borane compound or borate compound. Furthermore, the borane compound and borate compound may be also used in combinations of two or more thereof.

The following will describe these individual compounds in further detail.

(i) Organoaluminum Oxy Compound

The organoaluminum oxy compound has an Al—O—Al bond in the molecule, and the number of the bonds is in the range of usually 1 to 100, preferably 1 to 50. Such an organoaluminum oxy compound is usually a product obtained by reacting an organoaluminum compound with water.

Of the organoaluminum oxy compounds, one obtained by reacting an alkylaluminum with water is usually referred to as an aluminoxane and can be suitably used as the component (B). Also, of the aluminoxanes, methylaluminoxane (including those essentially composed of methylaluminoxane (MAO)) is particularly suitable as the organoaluminum oxy compound.

Incidentally, as the organoaluminum oxy compound, two or more of the organoaluminum oxy compounds can also be used in combination, and a solution of the organoaluminum oxy compound dissolved or dispersed in an inert hydrocarbon solvent to be mentioned below may be used.

The reaction of the organoaluminum with water is usually carried out in an inert hydrocarbon (solvent). As the inert hydrocarbon, there can be used aliphatic hydrocarbons, alicyclic hydrocarbons, and aromatic hydrocarbons such as pentane, hexane, heptane, cyclohexane, methylcyclohexane, benzene, toluene, and xylene, but it is preferable to use an aliphatic hydrocarbon or an aromatic hydrocarbon.

As the organoaluminum compound to be used for preparing the organoaluminum oxy compound, any of compounds represented by the following general formula (I) can be used but preferably, a trialkylaluminum is used.

$$R^a_t AlX^a_{3-t} \qquad (I)$$

wherein $R^a$ represents a hydrocarbon group having a carbon number of 1 to 18, preferably a carbon number of 1 to 12, such as an alkyl group, an alkenyl group, an aryl group, or an aralkyl group, $X^a$ represents a hydrogen atom or a halogen atom, and t represents an integer of $1 \leq t \leq 3$.

Examples of the alkyl group in the trialkylaluminum include a methyl group, an ethyl group, a propyl group, an isopropyl group, a butyl group, an isobutyl group, a pentyl group, a hexyl group, an octyl group, a decyl group, a dodecyl group, and the like but, of these, a methyl group is particularly preferred.

The above organoaluminum compounds may be also used in combinations of two or more thereof.

The reaction ratio of water to the organoaluminum compound (molar ratio of water/Al) is preferably 0.25/1 to 1.2/1, particularly preferably 0.5/1 to 1/1, and the reaction temperature is usually in the range of usually −70 to 100° C., preferably −20 to 20° C. The reaction time is selected from the range of usually 5 minutes to 24 hours, preferably 10 minutes to 5 hours. As the water required for the reaction, there may be utilized not only simple water but also crystal water contained in copper sulfate hydrate, aluminum sulfate hydrate, or the like and a component from which water may be formed in the reaction system.

(ii) Borane Compound

Moreover, examples of the borane compounds to be used as the component (B) include triphenylborane, tri(o-tolyl)borane, tri(p-tolyl)borane, tri(m-tolyl)borane, tri(o-fluorophenyl)borane, tris(p-fluorophenyl)borane, tris(m-fluorophenyl)borane, tris(2,5-difluorophenyl)borane, tris(3,5-difluorophenyl)borane, tris(4-trifluoromethylphenyl)borane, tris(3,5-ditrifluoromethylphenyl)borane, tris(2,6-ditrifluoromethylphenyl)borane, tris(pentafluorophenyl)borane, tris(perfluoronaphthyl)borane, tris(perfluorobiphenyl)borane, tris(perfluoroanthryl)borane, tris(perfluorobinaphthyl)borane, and the like.

Of these, tris(3,5-ditrifluoromethylphenyl)borane, tris(2,6-ditrifluoromethylphenyl)borane, tris(pentafluorophenyl)borane, tris(perfluoronaphthyl)borane, tris(perfluorobiphenyl)borane, tris(perfluoroanthryl)borane, and tris(perfluorobinaphthyl)borane are more preferred, and further preferably, tris(2,6-ditrifluoromethylphenyl)borane, tris(pentafluorophenyl)borane, tris(perfluoronaphthyl)borane, and tris(perfluorobiphenyl)borane are exemplified as preferred borane compounds.

(iii) Borate Compounds

Further, when the borate compounds to be used as the component (B) are specifically expressed, a first example is a compound represented by the following general formula (II).

$$[L^1-H]^+[BR^bR^cX^bX^c]^-  \quad (II)$$

In the formula (II), $L^1$ is a neutral Lewis base, H is a hydrogen atom, $[L^1-H]$ is a Brønsted acid such as an ammonium, an anilinium, or a phosphonium. As the ammonium, there can be exemplified trialkyl-substituted ammoniums such as trimethylammonium, triethylammonium, tripropylammonium, tributylammonium, and tri(n-butyl) ammonium, and dialkylammoniums such as di(n-propyl) ammonium and dicyclohexylammonium.

In addition, as the anilinium, there can be exemplified N,N-dialkylaniliniums such as N,N-dimethylanilinium, N,N-diethylanilinium, and N,N-2,4,6-pentamethylanilinium. Furthermore, as the phosphonium, there may be mentioned triarylphosphoniums such as triphenylphosphonium, tributylphosphonium, tri(methylphenyl)phosphonium, and tri(dimethylphenyl)phosphonium, and trialkylphosphoniums.

Moreover, in the formula (II), $R^b$ and $R^c$ are each an aromatic or substituted aromatic hydrocarbon group containing 6 to 20, preferably 6 to 16 carbon atoms, which are the same or different from each other, and may be linked to each other with a bridging group. As the substituent of the substituted aromatic hydrocarbon group, preferred is an alkyl group represented by a methyl group, an ethyl group, a propyl group, or an isopropyl group, or a halogen atom such as fluorine, chlorine, bromine, or iodine. Furthermore, $X^b$ and $X^c$ are each independently a hydride group, a halide group, a hydrocarbon group containing 1 to 20 carbon atoms, or a substituted hydrocarbon group containing 1 to 20 carbon atoms, one or more hydrogen atoms of which are replaced with a halogen atom.

As specific examples of the compound represented by the above general formula (II), there can be exemplified tributylammonium tetra(pentafluorophenyl)borate, tributylammonium tetra(2,6-ditrifluoromethylphenyl)borate, tributylammonium tetra(3,5-ditrifluoromethylphenyl)borate, tributylammonium tetra(2,6-difluorophenyl)borate, tributylammonium tetra(perfluoronaphthyl)borate, dimethylanilinium tetra(pentafluorophenyl)borate, dimethylanilinium tetra(2,6-ditrifluoromethylphenyl)borate, dimethylanilinium tetra(3,5-ditrifluoromethylphenyl)borate, dimethylanilinium tetra(2,6-difluorophenyl)borate, dimethylanilinium tetra(perfluoronaphthyl)borate, triphenylphosphonium tetra(pentafluorophenyl)borate, triphenylphosphonium tetra(2,6-ditrifluoromethylphenyl)borate, triphenylphosphonium tetra(3,5-ditrifluoromethylphenyl)borate, triphenylphosphonium tetra(2,6-difluorophenyl)borate, triphenylphosphonium tetra(perfluoronaphthyl)borate, trimethylammonium tetra(2,6-ditrifluoromethylphenyl)borate, triethylammonium tetra(pentafluorophenyl)borate, triethylammonium tetra(2,6-ditrifluoromethylphenyl)borate, triethylammonium tetra(perfluoronaphthyl)borate, tripropylammonium tetra(pentafluorophenyl)borate, tripropylammonium tetra(2,6-ditrifluoromethylphenyl)borate, tripropylammonium tetra(perfluoronaphthyl)borate, di(1-propyl)ammonium tetra(pentafluorophenyl)borate, dicyclohexylammonium tetraphenylborate, and the like.

Of these, preferred are tributylammonium tetra(pentafluorophenyl)borate, tributylammonium tetra(2,6-ditrifluoromethylphenyl)borate, tributylammonium tetra(3,5-ditrifluoromethylphenyl)borate, tributylammonium tetra(perfluoronaphthyl)borate, dimethylanilinium tetra(pentafluorophenyl)borate, dimethylanilinium tetra(2,6-ditrifluoromethylphenyl)borate, dimethylanilinium tetra(3,5-ditrifluoromethylphenyl)borate, and dimethylanilinium tetra(perfluoronaphthyl)borate.

Further, a second example of the borate compound is represented by the following general formula (III).

$$[L^2]^+[BR^bR^cX^bX^c]^-  \quad (III)$$

In the formula (III), as $L^2$, there may be mentioned a carbocation, a methyl cation, an ethyl cation, a propyl cation, an isopropyl cation, a butyl cation, an isobutyl cation, a tert-butyl cation, a pentyl cation, a tropinium cation, a benzyl cation, a trityl cation, a sodium cation, a proton, and the like. Further, $R^b$, $R^c$, $X^b$, and $X^c$ are the same as the definitions in the above general formula (II).

As specific examples of the above compound, there can be exemplified trityl tetraphenylborate, trityl tetra(o-tolyl)borate, trityl tetra(p-tolyl)borate, trityl tetra(m-tolyl)borate, trityl tetra(o-fluorophenyl)borate, trityl tetra(p-fluorophenyl)borate, trityl tetra(m-fluorophenyl)borate, trityl tetra(3,5-difluorophenyl)borate, trityl tetra(pentafluorophenyl)borate, trityl tetra(2,6 ditrifluoromethylphenyl)borate, trityl tetra(3,5-ditrifluoromethylphenyl)borate, trityl tetra(perfluoronaphthyl)borate, tropinium tetraphenylborate, tropinium tetra(o-tolyl)borate, tropinium tetra(p-tolyl)borate, tropinium tetra(m-tolyl)borate, tropinium tetra(o-fluorophenyl)borate, tropinium tetra(p-fluorophenyl)borate, tropinium tetra(m-fluorophenyl)borate, tropinium tetra(3,5-difluorophenyl)borate, tropinium tetra(pentafluorophenyl)borate, tropinium tetra(2,6-ditrifluoromethylphenyl)borate, tropinium tetra(3,5-ditrifluoromethylphenyl)borate, tropinium tetra(perfluoronaphthyl)borate, $NaBPh_4$, $NaB(o-CH_3-Ph)_4$, $NaB(p-CH_3-Ph)_4$, $NaB(m-CH_3-Ph)_4$, $NaB(o-F-Ph)_4$, $NaB(p-F-Ph)_4$, $NaB(m-F-Ph)_4$, $NaB(3,5-F_2-Ph)_4$, $NaB(C_6F_5)_4$, $NaB(2,6-(CF_3)_2-Ph)_4$, $NaB(3,5-(CF_3)_2-Ph)_4$, $NaB(C_{10}F_7)_4$, $HBPh_4$.2 diethyl ether, $HB(3,5-F_2-Ph)_4$.2 diethyl ether, $HB(C_6F_5)_4$.2 diethyl ether, $HB(2,6-(CF_3)_2-Ph)_4$.2 diethyl ether, $HB(3,5-(CF_3)_2-Ph)_4$.2 diethyl ether, and $HB(C_{10}H_7)_4$.2 diethyl ether.

Of these, preferred are trityl tetra(pentafluorophenyl)borate, trityl tetra(2,6-ditrifluoromethylphenyl)borate, trityl tetra(3,5-ditrifluoromethylphenyl)borate, trityl tetra(perfluoronaphthyl)borate, tropinium tetra(pentafluorophenyl)borate, tropinium tetra(2,6-ditrifluoromethylphenyl)borate, tropinium tetra(3,5-ditrifluoromethylphenyl)borate, tropinium tetra(perfluoronaphthyl)borate, $NaB(C_6F_5)_4$, $NaB(2,6-(CF_3)_2-Ph)_4$, $NaB(3,5-(CF_3)_2-Ph)_4$, $NaB(C_{10}F_7)_4$, $HB(C_6F_5)_4$.2 diethyl ether, $HB(2,6-(CF_3)_2-Ph)_4$.2 diethyl ether, $HB(3,5-(CF_3)_2-Ph)_4$.2 diethyl ether, and $HB(C_{10}H_7)_4$.2 diethyl ether.

More preferably, of these, there may be mentioned trityl tetra(pentafluorophenyl)borate, trityl tetra(2,6-ditrifluoromethylphenyl)borate, tropinium tetra(pentafluorophenyl)borate, tropinium tetra(2,6-difluoromethylphenyl)borate, NaB$(C_6F_5)_4$, NaB$(2,6-(CF_3)_2$-Ph$)_4$, HB$(C_6F_5)_4$.2 diethyl ether, HB$(2,6-(CF_3)_2$-Ph$)_4$.2 diethyl ether, HB$(3,5-(CF_3)_2$-Ph$)_4$.2 diethyl ether, and HB$(C_{10}H_7)_4$.2 diethyl ether.

(4) Component (C)

As the fine particle carrier that is the component (C), the catalyst for olefin polymerization of the present invention preferably uses an inorganic carrier, a particulate polymer carrier, or a mixture thereof. As the inorganic carrier, a metal, a metal oxide, a metal chloride, a metal carbonate, a carbonaceous material, or a mixture thereof can be used.

As suitable metals that can be used as the inorganic carriers, for example, iron, aluminum, nickel, and the like may be mentioned.

Further, as the metal oxide, either single oxides or composite oxides of Groups 1 to 14 elements of the Periodic Table can be mentioned and, for example, there can be exemplified natural or synthetic various single oxides or composite oxides such as $SiO_2$, $Al_2O_3$, MgO, CaO, $B_2O_3$, $TiO_2$, $ZrO_2$, $Fe_2O_3$, $Al_2O_3$.MgO, $Al_2O_3$.CaO, $Al_2O_3$.$SiO_2$, $Al_2O_3$.MgO, CaO, $Al_2O_3$.MgO.$SiO_2$, $Al_2O_3$.CuO, $Al_2O_3$.$Fe_2O_3$, $Al_2O_3$.NiO, $SiO_2$.MgO, and the like. Here, the above formula is not a molecular formula and only represents the composition, and the structure and catalyst component ratio of the composite oxide to be used in the present invention are not particularly limited. The metal oxide to be used in the invention may be one that has absorbed a small amount of moisture and also may be one that contains a small amount of impurities.

As the metal chloride, for example, a chloride of an alkali metal or an alkaline earth metal is preferred, and specifically, $MgCl_2$, $CaCl_2$, and the like are especially preferred. As the metal carbonate, a carbonate of an alkali metal or an alkaline earth metal is preferred, and specifically, magnesium carbonate, calcium carbonate, barium carbonate, and the like may be mentioned.

As the carbonaceous material, for example, carbon black, active carbon, and the like may be mentioned.

The above inorganic carriers can be all suitably used in the invention but particularly, the use of a metal oxide, silica, alumina, or the like is preferred.

These inorganic carriers are preferably used after calcined at usually 200° C. to 800° C., preferably 400° C. to 600° C. in the air or an inert gas such as nitrogen or argon to regulate the amount of surface hydroxyl groups to 0.8 mmol/g to 1.5 mmol/g. The properties of the inorganic carriers are not particularly limited but, usually, it is preferable to use an inorganic carrier having an average particle size of 5 μm to 200 μm, preferably 10 μm to 150 μm, an average pore size of 20 Å to 1000 Å, preferably 50 Å to 500 Å, a specific surface area of 150 m$^2$/g to 1000 m$^2$/g, preferably 200 m$^2$/g to 700 m$^2$/g, a pore volume of 0.3 cm$^3$/g to 2.5 cm$^3$/g, preferably 0.5 cm$^3$/g to 2.0 cm$^3$/g, and an apparent specific gravity of 0.20 g/cm$^3$ to 0.50 g/cm$^3$, preferably 0.25 g/cm$^3$ to 0.45 g/cm$^3$.

The above-described inorganic carrier can be, as a matter of course, used as it is but can be used after the carrier is brought into contact with an organoaluminum compound such as trimethylaluminum, triethylaluminum, triisobutylaluminum, trihexylaluminum, tripropylaluminum, tributylaluminum, trioctylaluminum, tridecylaluminum, or diisobutylaluminum hydride, or an organoaluminum oxy compound containing an Al—O—Al bond, as a pretreatment.

4. Preparation Method of Catalyst for Olefin Polymerization

The contact method of individual components at the time of obtaining the catalyst for olefin polymerization composed of the component (A) which is a metallocene compound that is an essential component of the method for producing the olefin-based polymer of the invention, the component (B) reacting with the component (A) to form a cationic metallocene compound, and the component (C) that is a fine particle carrier is not particularly limited and, for example, the following methods can be arbitrarily employed.

(I) After the component (A) and the component (B) are brought into contact with each other, the component (C) is brought into contact therewith.

(II) After the component (A) and the component (C) are brought into contact with each other, the component (B) is brought into contact therewith.

(III) After the component (B) and the component (C) are brought into contact with each other, the component (A) is brought into contact therewith.

Of these contact methods, the contact methods (I) and (III) are preferred, and the contact method (I) is most preferred. In any contact methods, there is usually employed a method of bringing the components into contact with one another in an inert atmosphere such as nitrogen or argon, generally in the presence of a liquid inert hydrocarbon, e.g., an aromatic hydrocarbon such as benzene, toluene, xylene, or ethylbenzene (usually a carbon number of 6 to 12) or an aliphatic or alicyclic hydrocarbon such as heptane, hexane, decane, dodecane, or cyclohexane (usually a carbon number of 5 to 12), under stirring or without stirring. This contact is preferably performed at a temperature of usually −100° C. to 200° C., preferably −50° C. to 100° C., further preferably 0° C. to 50° C., for 5 minutes to 50 hours, preferably 30 minutes to 24 hours, more preferably 30 minutes to 12 hours.

Further, as the solvent to be used at the time of the contact of the component (A), the component (B), and the component (C), as described above, there can be used both of an aromatic hydrocarbon solvent in which certain component(s) are soluble or sparingly soluble and an aliphatic or alicyclic hydrocarbon solvent in which certain component(s) are insoluble or sparingly soluble.

In the case of carrying out the contact reaction of the components stepwise, the solvent or the like used in the preceding step may be directly used as a solvent in the subsequent contact reaction without removing it. Alternatively, after the preceding contact reaction using a soluble solvent, a liquid inert hydrocarbon (e.g., an aliphatic hydrocarbon, an alicyclic hydrocarbon, or an aromatic hydrocarbon, such as pentane, hexane, decane, dodecane, cyclohexane, benzene, toluene, or xylene) in which certain component(s) are insoluble or sparingly soluble may be added thereto to recover a desired product as a solid matter or a part or all of the soluble solvent is once removed by a means such as drying to take out the desired product as a solid matter, and thereafter, the subsequent contact reaction of the desired product may be carried out using any of the above-described inert hydrocarbon solvents. In the present invention, the contact reaction of the components may be conducted plural times.

In the present invention, the use ratio of the component (A), the component (B), and the component (C) is not particularly limited, but is preferably in the following range.

In the case where an organoaluminum oxy compound is used as the component (B), the atomic ratio of aluminum in the organoaluminum oxy compound to the transition metal (M) in the component (A) that is the metallocene compound of the present invention (Al/M) is desirably in the range of usually 1 to 100,000, preferably 5 to 1,000, more preferably 50 to 200.

Moreover, in the case where a borane compound or a borate compound is used as the component (B), the atomic ratio of boron to the transition metal (M) in the component (A) that is the metallocene compound of the invention (B/M) is desirably in the range of usually 0.01 to 100, preferably 0.1 to 50, more preferably 0.2 to 10.

Furthermore, in the case where a mixture of an organoaluminum oxy compound and a borane compound or a borate compound is used as the component (B), for each compound in the mixture, it is desirable to select a use ratio the same as described above relative to the transition metal (M) in the component (A) that is the metallocene compound of the invention.

The amount of the component (C) to be used, which is a fine particle carrier, is 1 g, per 0.0001 to 5 mmol, preferably per 0.001 to 0.5 mmol, more preferably per 0.01 to 0.1 mmol of the transition metal (M) in the component (A).

The component (A), the component (B), and the component (C) are brought into contact with one another by any of the contact methods (1) to (3), and thereafter, by removing the solvent, the catalyst for olefin polymerization can be obtained as a solid catalyst. The removal of the solvent is desirably performed under normal pressure or under reduced pressure, at 0 to 200° C., preferably at 20 to 150° C., for 1 minute to 50 hours, preferably for 10 minutes to 10 hours.

Incidentally, the catalyst for olefin polymerization of the present invention can be also obtained by the following method.

(IV) The component (A) and the component (C) are brought into contact with each other and the solvent is removed to form a solid catalyst component, which is brought into contact with the component (B) that is an organoaluminum oxy compound, a borane compound, a borate compound, or a mixture thereof under polymerization conditions.

(V) The component (B) that is an organoaluminum oxy compound, a borane compound, a borate compound, or a mixture thereof is brought into contact with the component (C) and the solvent is removed to form a solid catalyst component, which is brought into contact with the component (A) under polymerization conditions.

Also in the case of the above contact methods (IV) and (V), as the component ratio, the contact conditions, and the solvent removal conditions, the same conditions as described above can be used.

Further, as a component serving as both of the component (B) and the component (C), it is also possible to use a layered silicate. The layered silicate is a silicate compound having a crystal structure in which planes configured by an ionic bond and the like are stacked in parallel with a weak bonding force. Most layered silicates are naturally mainly produced as a main component of clay minerals, but these layered silicates are not particularly limited to naturally occurring ones and may be artificially synthesized ones.

Of these, smectite group, vermiculite group, and mica group such as montmorillonite, sauconite, beidellite, nontronite, saponite, hectorite, stevensite, bentonite, and taeniolite are preferable.

In general, natural products are often non-ion-exchangeable (non-swellable) and, in that case, in order to have a preferred ion exchangeability (or swellability), it is preferable to perform a treatment for imparting the ion exchangeability (or swellability). Among such treatments, particularly preferred include the following chemical treatments. Here, as the chemical treatments, there can be used both of a surface treatment in which impurities attached to the surface are removed and a treatment which influences the crystal structure and/or chemical composition of the layered silicate. Specifically, there may be mentioned (i) an acid treatment to be carried out using hydrochloric acid, sulfuric acid, or the like, (ii) an alkali treatment to be carried out using NaOH, KOH, $NH_3$, or the like, (iii) a salt treatment using a salt composed of a cation containing at least one atom selected from Groups 2 to 14 of the Periodic Table and at least one anion selected from the group consisting of halogen atoms and inorganic acid-derived anions, (iv) a treatment with an organic substance such as an alcohol, a hydrocarbon compound, formamide, or aniline, and the like. These treatments may be carried out singly or in combination of two or more thereof.

As for the layered silicate, at any time before, during, or after any steps, the particle properties can be regulated by grinding, granulating, sizing, fractionating, or the like. The method may be any purposive one. In particular, as for the granulation method, for example, there may be mentioned a spray granulation method, a rolling granulation method, a compression granulation method, a stirring granulation method, a briquetting method, a compacting method, an extrusion granulation method, a fluidized bed granulation method, an emulsifying granulation method, an in-liquid granulation method, and the like. Among the above, particularly preferred granulation methods are a spray granulation method, a rolling granulation method, and a compression granulation method.

The layered silicate described above can be, as a matter of course, used as it is, but the layered silicate can be used in combination with an organoaluminum compound such as trimethylaluminum, triethylaluminum, triisobutylaluminum, tripropylaluminum, tributylaluminum, trihexylaluminum, trioctylaluminum, tridecylaluminum, or diisobutylaluminum hydride or an organoaluminum oxy compound containing an Al—O—Al bond.

For supporting the component (A), which is an essential component of the method for producing the olefin-based polymer of the present invention, on the layered silicate, the component (A) and the layered silicate may be brought into contact with each other, or the component (A), the organoaluminum compound, and the layered silicate may be brought into contact with one another.

The contact method of the components is not particularly limited and, for example, the following method can be arbitrarily employed.

(VI) After the component (A) and the organoaluminum compound are brought into contact with each other, the resultant is brought into contact with the layered silicate carrier.

(VII) After the component (A) and the layered silicate carrier are brought into contact with each other, the resultant is brought into contact with the organoaluminum compound.

(VIII) After the organoaluminum compound and the layered silicate carrier are brought into contact with each other, the resultant is brought into contact with the component (A).

Of these contact methods, the contact methods (IV) and (VIII) are preferred. Even in any contact methods, there is usually employed a method of bringing the components into contact with one another in an inert atmosphere such as nitrogen or argon, generally in the presence of a liquid inert hydrocarbon, e.g., an aromatic hydrocarbon such as benzene, toluene, xylene, or ethylbenzene (usually a carbon number of 6 to 12) or an aliphatic or alicyclic hydrocarbon such as heptane, hexane, decane, dodecane, or cyclohexane (usually a carbon number of 5 to 12), under stirring or without stirring.

The use ratio of the component (A), the organoaluminum compound, and the layered silicate carrier is not particularly limited, but is preferably in the following range. The amount of the component (A) to be supported is 0.0001 mmol to 5 mmol, preferably 0.001 mmol to 0.5 mmol, and more preferably 0.01 to 0.1 mmol per 1 g of the layered silicate carrier. Further, the amount of Al to be supported in the case of using the organoaluminum compound is desirably in the range of 0.01 mol to 100 mol, preferably 0.1 to 50 mol, more preferably 0.2 mol to 10 mol.

For the method of supporting and solvent removal, the same conditions as in the case of the above inorganic carrier may be used. When the layered silicate is used as a component serving as both of the component (B) and the component (C), the resulting ethylene-based polymer has narrow molecular weight distribution. Furthermore, the polymerization activity is high and the productivity of the ethylene-based polymer having long-chain branches is improved. The thus obtained catalyst for olefin polymerization may be used after a preliminary polymerization of monomers is performed as needed.

5. Method for Producing Olefin-based Polymer

The above-described catalyst for olefin polymerization can be used for olefin polymerization, particularly homopolymerization of ethylene or copolymerization of ethylene with an α-olefin.

In the method for producing the olefin-based polymer of the present invention, at least ethylene is preferably contained and it is preferred that the polymer is substantially an ethylene-based polymer including an ethylene homopolymer and a copolymer of ethylene and an α-olefin.

The α-olefins that are comonomers include those having a carbon number of 3 to 30, preferably 3 to 8, and specifically, there may be exemplified propylene, 1-butene, 1-hexene, 1-octene, 4-methyl-1-pentene, and the like. As for the α-olefins, two or more α-olefins can be also copolymerized with ethylene. The copolymerization may be any of alternating polymerization, random copolymerization, and block polymerization. In the case where ethylene is copolymerized with the other α-olefin, the amount of the other α-olefin can be arbitrarily selected from the range of 90% by mol or less of the total monomers but is generally selected from the range of 40% by mol or less, preferably 30% by mol or less, further preferably 10% by mol or less. As a matter of course, it is also possible to use a small amount of a comonomer other than ethylene and the α-olefins. In this case, there may be mentioned compounds having a polymerizable double bond, for example, styrenes such as styrene, 4-methylstyrene, and 4-dimethylaminostyrene, dienes such as 1,4-butadiene, 1,5-hexadiene, 1,4-hexadiene, and 1,7-octadiene, cyclic compounds such as norbornene and cyclopentene, oxygen-containing compounds such as hexenol, hexenoic acid, and methyl octenate, and the like.

In the present invention, the polymerization reaction can be carried out in the presence of the supported catalyst mentioned above, preferably by slurry polymerization or gas-phase polymerization. In the case of the slurry polymerization, ethylene and the like are polymerized in the presence or absence of an inert hydrocarbon solvent selected from aliphatic hydrocarbons such as isobutene, hexane, and heptane, aromatic hydrocarbons such as benzene, toluene, and xylene, alicyclic hydrocarbons such as cyclohexane and methylcyclohexane, in a state that oxygen, water, and the like are substantially absent. It is needless to say that a liquid monomer such as liquid ethylene or liquid propylene can be also used as a solvent. Moreover, in the case of the gas-phase polymerization, ethylene and the like are polymerized in a reactor into which gas flows of ethylene and a comonomer are introduced, allowed to pass, or recycled. In the present invention, further preferable polymerization is the gas-phase polymerization. As for polymerization conditions, the temperature is 0° C. to 250° C., preferably 20° C. to 110° C., and more preferably 60° C. to 100° C. and, when the temperature is 60° C. to 90° C., there is a tendency that a larger amount of the long-chain branches are introduced. Moreover, the pressure is in the range of normal pressure to 10 MPa, preferably normal pressure to 4 MPa, more preferably 0.5 MPa to 2 MPa. As the polymerization time, there is commonly employed 5 minutes to 10 hours, preferably 5 minutes to 5 hours.

The molecular weight of the produced polymer can be controlled to some extent by varying the polymerization conditions such as the polymerization temperature and the molar ratio of the catalyst, but the control of the molecular weight can be more effectively performed by the addition of hydrogen to the polymerization reaction system.

Further, even when a component for the purpose of water removal, a so-called scavenger, is added into the polymerization system, the polymerization can be carried out without any trouble. As such a scavenger, there are used organoaluminum compounds such as trimethylaluminum, triethylaluminum, and triisobutylaluminum, the above-described organoaluminum oxy compounds, modified organoaluminum compounds containing a branched alkyl, organozinc compounds such as diethylzinc and dibutylzinc, organomagnesium compounds such as diethylmagnesium, dibutylmagnesium, and ethylbutylmagnesium, Grignard compounds such as ethylmagnesium chloride and butylmagnesium chloride. Of these, preferred are triethylaluminum, triisobutylaluminum, and ethylbutylmagnesium, and particularly preferred is triethylaluminum. It can be also applied to a multistage polymerization method having two or more stages in which polymerization conditions such as hydrogen concentration, the amount of the monomer(s), polymerization pressure, and polymerization temperature are different from each other, without any trouble.

6. Physical Properties of Ethylene-based Polymer

The olefin-based polymer, particularly ethylene-based polymer produced using the catalyst for olefin polymerization of the present invention is characterized in that sufficient number and length of long-chain branches are introduced and molding processability is more improved.

In general, a polyethylene is processed into industrial products by a shaping method via a melted state, such as film molding, blow molding, or foam molding. On this occasion, it is well known that elongation flowing properties greatly influence the easiness of molding. That is, a polyethylene having narrow molecular weight distribution and having no long-chain branches has low melt strength and hence exhibits poor moldability. On the other hand, a polyethylene having an ultrahigh molecular weight component or a long-chain branch component is excellent in molding processability.

It is realized that the ethylene-based polymer produced by the polymerization catalyst for olefin of the present invention has sufficient number and length of long-chin branches introduced therein and is excellent in molding processability, from values of the branching index (g') at molecular weights of 100,000 and 1,000,000 measured by combining a GPC apparatus equipped with a differential refractometer (RI) and a viscosity detector (Viscometer) and a light scattering detector.

Incidentally, in the present Description, the values of the branching index (g') at molecular weights of 100,000 and 1,000,000 are referred to as "$g_a$'" and "$g_b$'", respectively.

Moreover, from the viewpoint of excellent molding processability and mechanical properties, the ethylene-based polymer of the present invention preferably has further the following characteristics.

(1) MFR

MFR (melt flow rate, 190° C., a load of 2.16 kg) of the ethylene-based polymer in the present invention is preferably 0.001 g/10 minutes to 1,000 g/10 minutes, more preferably 0.01 g/10 minutes to 100 g/10 minutes, further preferably 0.05 g/10 minutes to 50 g/10 minutes, and particularly preferably 0.1 g/10 minutes to 50 g/10 minutes.

Incidentally, MFR of the ethylene-based polymer is a value as measured in accordance with JIS K6760 (190° C., a load of 2.16 kg).

(2) Density

The density of the ethylene-based polymer in the present invention is preferably 0.85 g/cm$^3$ to 0.97 g/cm$^3$, more preferably 0.88 g/cm$^3$ to 0.95 g/cm$^3$, and further preferably 0.90 g/cm$^3$ to 0.94 g/cm$^3$.

Incidentally, the density of the ethylene-based polymer is a value as measured in accordance with JIS K7112.

(3) Mw/Mn

The molecular weight distribution (Mw/Mn) of the ethylene-based polymer in the present invention is preferably 2.0 to 10.0, more preferably 2.0 to 9.0, further preferably 2.5 to 8.0, and particularly preferably 2.5 to 7.5.

Incidentally, the molecular weight distribution (Mw/Mn) of the ethylene-based polymer is defined by the ratio (Mw/Mn) of weight-average molecular weight (Mw) to number-average molecular weight (Mn) and is a value as measured under the following conditions by a gel permeation chromatographic (GPC) method.

The conversion from the retention volume to the molecular weight is performed using a calibration curve prepared in advance with standard polystyrene. The standard polystyrenes used are all produced by Tosoh Corporation under the following brand names:

F380, F288, F128, F80, F40, F20, F10, F4, F1, A5000, A2500, A1000. A calibration curve is created by injecting 0.2 mL of a solution prepared by dissolving each standard polystyrene in ODCB (containing 0.5 mg/mL of BHT) to provide a concentration of 0.5 mg/mL. As the calibration curve, a cubic expression obtained by approximation according to the least square method is used. In the viscosity formula $[\eta]=K\times M^\alpha$ used for the conversion into the molecular weight, the following numerical values are used.

PS: $K=1.38\times10^{-4}$, $\alpha=0.7$
PE: $K=3.92\times10^{-4}$, $\alpha=0.733$
PP: $K=1.03\times10^{-4}$, $\alpha=0.78$ Incidentally, the measurement conditions of GPC are as follows.

Apparatus: GPC (ALC/GPC 150C) manufactured by WATERS Co.

Detector: MIRAN 1A IR detector manufactured by FOXBORO Co. (measurement wavelength: 3.42 μm)

Columns: AD806M/S (3 columns) manufactured by Showa Denko K.K.

Mobile phase solvent: o-dichlorobenzene Measurement temperature: 140° C.

Flow rate: 1.0 ml/minute

Injection amount: 0.2 ml

Sample preparation: as for a sample, a 1 mg/mL solution is prepared using ODCB (containing 0.5 mg/mL of BHT) and dissolution is achieved at 140° C. with taking a time of about 1 hour. Incidentally, the baseline and section of the resulting chromatogram is taken as exemplified in FIG. 1.

(4) Branching Indices ($g_a$' and $g_b$')

In the ethylene-based polymer of the present invention, the branching index ($g_a$') at a molecular weight of 100,000 is preferably 0.50 to 0.99, more preferably 0.50 to 0.94, further preferably 0.50 to 0.87, and still further preferably 0.55 to 0.80. In the case where the branching index ($g_a$') falls within the above range, an ethylene-based polymer having an excellent balance between elongation viscosity behavior and melt fluidity is obtained.

In the ethylene-based polymer of the present invention, $g_b$' is 0.30 to 0.75, preferably 0.30 to 0.68, more preferably 0.35 to 0.55, and further preferably 0.35 to 0.50. When the $g_b$' value is larger than 0.75, there are cases not preferable due to insufficient molding processability of the ethylene-based polymer and deficient transparency thereof. When the $g_b$' value is smaller than 0.30, the molding processability of the ethylene-based polymer is enhanced but impact strength of a molded body decreases or transparency deteriorates, so that there are cases not preferable.

Incidentally, the branching indices ($g_a$' and $g_b$') are values as measured by the following method.

(i) Branch structure analysis by GPC-VIS

As the GPC apparatus which is equipped with a differential refractometer (RI) and a viscosity detector (Viscometer), Alliance GPCV2000 of WATERS Co. was used. Moreover, as the light scattering detector, a multi-angle laser light scattering detector (MALLS) DAWN-E of Wyatt Technology Co. is used. The detectors are connected in the order of MALLS, RI, and Viscometer. The mobile phase solvent is 1,2,4-trichlorobenzene (an antioxidant Irganox1076 is added at a concentration of 0.5 mg/mL). The flow rate is 1 mL/minute. As the columns, two columns of GMHHR-H(S) HT of Tosoh Corporation are connected and used. The temperature at the sample injection port and at each detector is 140° C. The sample concentration is 1 mg/mL. The injection amount (sample loop volume) is 0.2175 mL. At the time of determining absolute molecular weight (M) and inertial square radius (Rg) obtained from MALLS and intrinsic viscosity ([η]) obtained from Viscometer, calculation is performed utilizing a data processing software ASTRA (version 4.73.04) attached to MALLS with reference to the following literatures.

REFERENCE LITERATURES

1. Developments in polymer characterization, vol. 4. Essex: Applied Science; 1984. Chapter 1.
2. Polymer, 45, 6495-6505 (2004)
3. Macromolecules, 33, 2424-2436 (2000)
4. Macromolecules, 33, 6945-6952 (2000)

(ii) Calculation of branching indices ($g_a'$ and $g_b'$)

The branching index ($g_a'$) is calculated as a ratio (ηbranch/ηlin) of the intrinsic viscosity (ηbranch) obtained by measuring a sample by the above Viscometer to the intrinsic viscosity (ηlin) obtained by separately measuring a linear polymer.

When a long-chain branch is introduced into a polymer molecule, an inertial radius decreases as compared with a linear polymer molecule having the same molecular weight. Since the intrinsic viscosity decreases when the inertial radius decreases, the ratio (ηbranch/ηlin) of the intrinsic viscosity (ηbranch) of a branched polymer to the intrinsic viscosity (ηlin) of a linear polymer having the same molecular weight decreases as the long-chain branches are introduced. Therefore, the case where the branching index ($g_a'$=ηbranchηlin) becomes a value smaller than 1 means that branches are introduced, and it is meant that the introduced long-chain branches increase as the value decreases.

Figure 2:
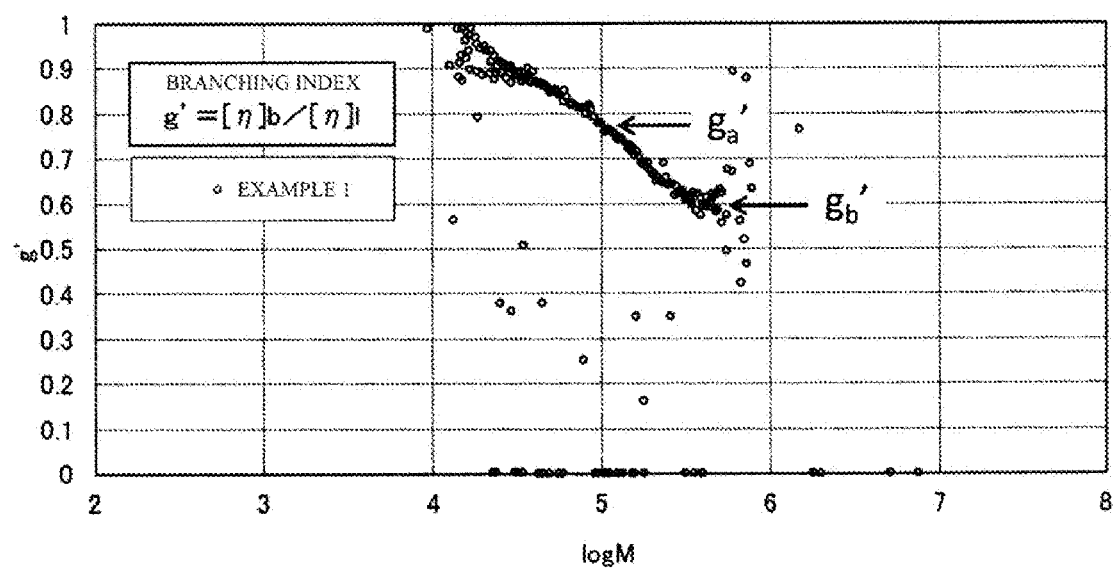
FIG. 2 is a graph showing a relation between a branching index (g') calculated from GPC-VIS measurement and molecular weight (M).

FIG. 2 shows an example of analysis results by the above GPC-VIS. FIG. 2 represents a branching index ($g_a'$) at a molecular weight (M). The g' value at log M=5 was taken as $g_a'$ and the g' value at log M=6 was taken as $g_b'$. Here, as the linear polymer, a linear polyethylene Standard Reference Material 1475a (National Institute of Standards & Technology) is used.

EXAMPLES

The present invention is specifically described below with reference to Examples but the invention should not be construed as being limited to these Examples. Incidentally, the evaluation methods used in Examples are as follows. All of the following catalyst synthesis steps and polymerization step were performed in a purified nitrogen atmosphere, and the solvents used were dehydrated and purified with molecular sieves 4A.

1. Various Evaluation (Measurement) Methods
(1) MFR:

It was measured at 190° C. at a load of 2.16 kg in accordance with JIS K6760. FR (flow rate ratio) was calculated from a ratio (=MFR10 kg/MFR) of MFR10 kg that is MFR similarly measured under the conditions of 190° C. and a load of 10 kg to MFR.

(2) Measurement of molecular weight distribution (Mw/Mn):

It was measured by the method described in the article of "(3) Mw/Mn" of "6. Physical Properties of Ethylene-based Polymer" mentioned before.

(3) Measurement of branching index (g'):

It was measured by the method described in the article of "(4) Branching Indices ($g_a'$ and $g_b'$)" of "6. Physical Properties of Ethylene-based Polymer" mentioned before.

2. Using Materials

Synthesis of Metallocene Compound (1) Synthesis of metallocene compound A: dimethylsilylene(3-methyl-4-(2-(5-methyl)-furyl)-indenyl)(2,3,4,5-tetramethylcyclopentadienyl)zirconium dichloride

[Chem 11]

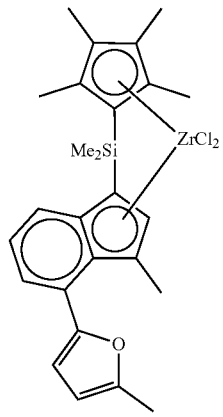

Metallocene compound A (1-1) Synthesis of 1-methyl-7-(2-(5-methyl)-furyl)-indene (1-1-a) Synthesis of 2-bromophenyl-2-chloroethyl ketone To a 100 ml flask were added 2-bromobenzoic acid (5.30 g, 26.4 mmol) and 25 ml of thionyl chloride, followed by refluxing for 2 hours. After the reaction, excess thionyl chloride was removed by distillation under reduced pressure and 5.50 g of the resulting acid chloride was used in the subsequent reaction without purification.

After the acid chloride (5.00 g, 22.7 mmol) and 50 ml of dichloromethane were added to a 100 ml flask to form a solution, aluminum chloride (3.02 g, 22.7 mmol) was further added thereto and ethylene was blown therein at 20° C. for 4 hours. The reaction was quenched with 4N hydrochloric acid and, after the organic phase and the aqueous phase were separated from each other, the aqueous phase was washed with 50 ml of methyl-t-butyl ether three times, the organic phases were combined, and the combined one was washed with 50 ml of water three times, 100 ml of a saturated aqueous sodium hydrogen carbonate solution, and subsequently 100 ml of a saturated aqueous sodium chloride solution. After drying over sodium sulfate, the solvent was removed by distillation under reduced pressure to obtain 4.80 g (yield 85%) of 2-bromophenyl-2-chloroethyl ketone. It was used in the subsequent reaction without further purification.

(1-1-b) Synthesis of 7-bromo-1-indanone

After aluminum chloride (7.40 g, 55.6 mmol) and sodium chloride (2.15 g, 37.1 mmol) were added to a 100 ml flask and the whole was heated to 130° C., 2-bromophenyl-2-chloroethyl ketone (4.60 g, 18.5 mmol) was slowly added thereto and the mixture was stirred at 160° C. for 1 hour. After the reaction, the mixture was cooled to 30° C. and quenched with ice water. After pH was adjusted to 5 with conc. hydrochloric acid, the organic phase and the aqueous phase were separated from each other, the aqueous phase was washed with 100 ml of dichloromethane three times, the organic phases were combined, and the combined one was washed with 100 ml of water and 100 ml of a saturated aqueous sodium chloride solution. After drying over sodium sulfate, the solvent was removed by distillation under reduced pressure to obtain a crude product. Further, it was purified through a silica gel column (petroleum ether/ethyl acetate=30/1) to obtain 1.60 g (yield 33%) of 7-bromo-1-indanone.

(1-1-c) Synthesis of 7-(2-(5-methyl)-furyl)-1-indanone

After 2-methylfuran (0.933 g, 11.4 mmol) and 10 ml of THF were added to a 100 ml flask to form a solution, an n-butyllithium/hexane solution (2.5M, 4.70 ml, 11.4 mmol) was added thereto at −30° C., followed by stirring at room temperature for 2 hours. Zinc chloride (1.55 g, 11.4 mmol) and 10 ml of THF were added to a 100 ml flask prepared separately and subsequently the above reaction solution was added thereto at 0° C., followed by stirring at room temperature for 1 hour. Further, the above reaction product was added to a suspension obtained by adding copper(I) iodide (90 mg, 0.473 mmol), Pd(dppf)Cl$_2$ (177 mg, 0.236 mmol), 7-bromo-1-indanone (2.00 g, 9.45 mmol), and 10 ml of DMA to a 100 ml flask prepared separately, and the whole was refluxed for 15 hours. After cooling to room temperature, 50 ml of water was added thereto and extraction was performed with 50 ml of ethyl acetate twice. The organic phases were combined and the combined one was washed with 50 ml of water twice and 50 ml of a saturated aqueous sodium chloride solution. After drying over sodium sulfate, the solvent was removed by distillation under reduced pressure to obtain a crude product. Further, it was purified through a silica gel column (petroleum ether/ethyl acetate=20/1) to obtain 0.70 g (yield 35%) of 7-(2-(5-methyl)-furyl)-1-indanone.

(1-1-d) Synthesis of 1-methyl-7-(2-(5-methyl)-furyl)-indene

After 7-(2-(5-methyl)-furyl)-1-indanone (1.40 g, 6.59 mmol) and 20 ml of THF were added to a 100 ml flask to form a solution, a methyllithium/diethyl ether solution (1.6M, 7.5 ml, 11.9 mmol) was added thereto at −78° C., followed by stirring at room temperature for 10 hours. The reaction was quenched with 20 ml of a saturated aqueous ammonium chloride solution and volatile components were removed by distillation under reduced pressure. The remaining solution was extracted with 50 ml of ethyl acetate twice and the organic phases were combined and the combined one was washed with 50 ml of a saturated aqueous sodium chloride solution. After drying over sodium sulfate, the solvent was removed by distillation under reduced pressure to obtain a crude product. It was used in the subsequent reaction without further purification.

After the crude product and 30 ml of toluene were added to a 100 ml flask to form a solution, p-toluenesulfonic acid (62.0 mg, 0.330 mmol) was added thereto, followed by stirring at 130° C. for 2 hours. During stirring, water to be formed was removed by means of a Dean-Stark trap. After cooling to room temperature, 30 ml of a saturated aqueous sodium hydrogen carbonate solution was added thereto and the organic phase was separated. After the aqueous phase was extracted with 50 ml of ethyl acetate three times, the organic phases were combined and the combined one was washed with 50 ml of a saturated aqueous sodium chloride solution. After drying over sodium sulfate, the solvent was removed by distillation under reduced pressure to obtain a crude product. It was further purified through a silica gel column (petroleum ether) to obtain 0.850 g (yield 61%) of 1-methyl-7-(2-(5-methyl)-furyl)-indene.

(1-2) Synthesis of (2,3,4,5-tetramethylcyclopentadienyl)dimethylchlorosilane After 2.40 g (19.6 mmol) of tetramethylcyclopentadiene and 40 ml of THF were added to a 200 ml flask to form a solution, it was cooled to −78° C. and 12.0 ml (30.0 mmol) of an n-butyllithium/hexane solution (2.5M) was added thereto, and the temperature was returned to room temperature, followed by stirring for 3 hours. To a 200 ml flask prepared separately were added 5.00 g (38.7 mmol) of dimethyldichlorosilane and 20 ml of THF, and the whole was cooled to −78° C. and the previous reaction solution was added thereto. The temperature was returned to room temperature and the whole was stirred for 12 hours. Volatile matter was removed by distillation under reduced pressure to obtain 4.00 g of a yellow liquid. The obtained yellow liquid was used in the subsequent reaction without further purification.

(1-3) Synthesis of (3-methyl-4-(2-(5-methyl)-furyl)-indenyl)(2,3,4,5-tetramethylcyclopentadienyl)dimethylsilane After 2.60 g (12.4 mmol) of 1-methyl-7-(2-(5-methyl)-furyl)-indene and 40 ml of THF were added to a 100 ml flask to form a solution, it was cooled to −78° C. and 5.2 ml (13.0 mmol) of an n-butyllithium/hexane solution (2.5M) was added thereto, and the temperature was returned to room temperature, followed by stirring for 3 hours. To a 200 ml flask prepared separately were added 3.40 g (15.8 mmol) of the unpurified yellow liquid obtained in (1-2) and 10 ml of THF, and, after cooling to −78° C., the previous reaction solution was added thereto. The temperature was returned to room temperature and the whole was stirred for 12 hours. The reaction product was slowly added to 40 ml of ice water and extracted with 200 ml of ethyl acetate twice. The resulting organic phase was washed with 50 ml of a saturated aqueous sodium chloride solution and dried over anhydrous sodium sulfate. Sodium sulfate was filtered, the solution was subjected to removal by distillation under reduced pressure, and purification was performed through a silica gel column (petroleum ether) to obtain 1.40 g (yield 25%) of a yellow oil of (3-methyl-4-(2-(5-methyl)uryl)-indenyl)(2,3,4,5-tetramethylcyclopentadienyl)dimethylsilane.

(1-4) Synthesis of dimethylsilylene(3-methyl-4-(2-(5-methyl)-furyl)-indenyl)(2,3,4,5-tetramethylcyclopentadienyl)zirconium chloride To a 200 ml flask were added 2.20 g (5.70 mmol) of (3-methyl-4-(2-(5-methyl)-furyl)-indenyl)(2,3,4,5-tetramethylcyclopentadienyl)dimethylsilane and 30 ml of diethyl ether, followed by cooling to −78° C. Thereto was added dropwise 4.8 ml (11.9 mmol) of an n-butyllithium/n-hexane solution (2.5M), and the temperature was returned to room temperature, followed by stirring for 3 hours. The solvent of the reaction solution was removed by distillation under reduced pressure, 60 ml of dichloromethane was added thereto, and the whole was cooled to −78° C. Thereto was added 1.40 g (6.01 mmol) of zirconium tetrachloride, and the whole was stirred overnight while the temperature was gradually returned to room temperature. The reaction solution was filtered and the solvent was removed by distillation under reduced pressure from the resulting filtrate, thereby obtaining 3.0 g of a yellow powder. The powder was washed with 25 ml of toluene to obtain 0.75 g (yield 26%) of a yellow powder of dimethylsilylene(3-methyl-4-(2-(5-methyl)-furyl)-indenyl)(2,3,4,5-tetramethylcyclopentadienyl)zirconium chloride.

$^1$H-NMR values (CDCl$_3$): δ 0.94 (s, 3H), δ 1.19 (s, 3H), δ 1.90 (s, 3H), δ 1.95 (s, 3H), δ 1.98 (s, 3H), δ 2.04 (s, 3H), δ 2.28 (s, 3H), δ 2.38 (s, 3H), δ 5.52 (s, 1H), δ 6.07 (d, 1H), δ 6.38 (d, 1H), δ 7.04 (dd, 1H), δ 7.37 (d, 1H), δ 7.45 (d, 1H).

(2) Synthesis of metallocene compound B: dimethylsilylene(4-(2-(5-methyl)-furyl)-indenyl)(2,3,4,5-tetramethylcyclopentadienyl)zirconium chloride

[Chem 12]

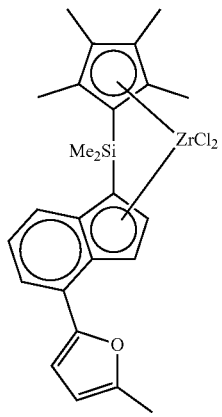

Metallocene compound B (2-1) Synthesis of 4-(2-(5-methyl)-furyl)-indene

After 2.52 g (30.7 mmol) of 2-methylfuran and 30 ml of THF were added to a 100 ml flask to form a solution, it was cooled to −78° C. and 14.7 ml (36.9 mmol) of an n-butyllithium/hexane solution (2.5M) was added thereto, and the temperature was returned to room temperature, followed by stirring for 4 hours. To a 100 ml flask prepared separately were added 4.18 g (30.7 mmol) of zinc chloride and 10 ml of THF, thus forming a suspension. The whole was cooled to 0° C. and the previous reaction solution was added thereto. The temperature was returned to room temperature and the whole was stirred for 1 hour. Further, 0.35 g (1.84 mmol) of copper(I) iodide, 0.690 g (0.932 mmol) of Pd(dppf)Cl$_2$, 3.00 g (15.3 mmol) of 4-bromoindanone, and 5 ml of DMA were added to a 300 ml flask prepared separately to form a suspension, and the previous reaction solution was added thereto, followed by stirring and refluxing for 15 hours. The whole was cooled to room temperature and 50 ml of water was added thereto. After the organic phase was separated, the aqueous phase was extracted with 50 ml of ethyl acetate twice. The resulting organic phases were mixed and the mixed one was washed with 50 ml of water twice and with 50 ml of a saturated aqueous sodium chloride solution once. Sodium sulfate was added thereto to dry the organic phase. Sodium sulfate was filtered, the solvent was removed by distillation under reduced pressure, and purification was performed through a silica gel column to obtain 2.10 g (yield 70%) of a yellow liquid of 4-(2-(5-methyl)-furyl)-indene.

(2-2) Synthesis of (4-(2-(5-methyl)-furyl)-indenyl)(2,3,4,5-tetramethylcyclopentadienyl)dimethylsilane After 1.96 g (10.0 mmol) of 4-(2-(5-methyl)-furyl)-indene and 20 ml of THF were added to a 100 ml flask to form a solution, it was cooled to −78° C. and 4.0 ml (10.0 mmol) of an n-butyllithium/hexane solution (2.5M) was added thereto, and the temperature was returned to room temperature, followed by stirring for 3 hours.

To a 100 ml flask prepared separately were added 2.0 g (9.31 mmol) of the unpurified yellow liquid obtained in the procedure of (1-2) of Synthesis of metallocene compound A and 10 ml of THF, and the whole was cooled to −78° C. and the previous reaction solution was added thereto. The temperature was returned to room temperature and the whole was stirred for 12 hours. The reaction product was slowly added to 40 ml of ice water, extracted with 200 ml of ethyl acetate twice. The resulting organic phase was washed with 50 ml of a saturated aqueous sodium chloride solution and dried over anhydrous sodium sulfate. Sodium sulfate was filtered, the solution was subjected to removal by distillation under reduced pressure, and purification was performed through a silica gel column (petroleum ether) to obtain 0.70 g (yield 19%) of a yellow oil of (4-(2-(5-methyl)-furyl)-indenyl)(2,3,4,5-tetramethylcyclopentadienyl)dimethylsilane.

(2-3) Synthesis of dimethylsilylene(4-(2-(5-methyl)-furyl)-indenyl)(2,3,4,5-tetramethylcyclopentadienyl)zirconium chloride Synthesis was performed in the same manner as in (1-4) of the metallocene compound A using 1.70 g (4.54 mmol) of (4-(2-(5-methyl)uryl)-indenyl)(2,3,4,5-tetramethylcyclopentadienyl)dimethylsilane, instead of 2.20 g (5.70 mmol) of (3-methyl-4-(2-(5-methyl)-furyl)-indenyl)(2,3,4,5-tetramethylcyclopentadienyl)dimethylsilane, to obtain 1.0 g (yield 41%) of a yellow powder of dimethylsilylene (4-(2-(5-methyl)uryl)-indenyl)(2,3,4,5-tetramethylcyclopentadienyl)zirconium chloride.

$^1$H-NMR values (CDCl$_3$): δ 0.99 (s, 3H), δ 1.18 (s, 3H), δ 1.92 (s, 3H), δ 1.94 (s, 3H), δ 1.99 (s, 3H), δ 2.00 (s, 3H), δ 2.41 (s, 3H), δ 6.04 (d, 1H), δ 6.14 (m, 1H), δ 6.87 (d, 1H), δ 7.12 (dd, 1H), δ 7.40 (d, 1H), δ 7.60 (m, 1H), δ 7.64 (d, 1H).

(3) Synthesis of metallocene compound C: silacyclobutylene(3-methyl-4-(2-(5-methyl)-furyl)-indenyl)(2,3,4,5-tetramethylcyclopentadienyl)zirconium chloride

[Chem 13]

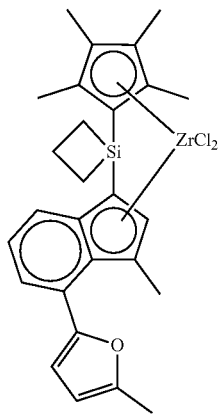

Metallocene compound C

(3-1) Synthesis of 1-methyl-7-(2-(5-methyl)uryl)-indene

Similarly to (1-1) of the metallocene compound A, 1-methyl-7-(2-(5-methyl)-furyl)-indene was synthesized.

(3-2) Synthesis of (2,3,4,5-tetramethylcyclopentadienyl)chlorosilacyclobutane After 3.00 g (24.6 mmol) of tetramethylcyclopentadiene and 40 ml of THF were added to a 200 ml flask to form a solution, it was cooled to −78° C. and 14.8 ml (36.9 mmol) of an n-butyllithium/hexane solution (2.5M) was added thereto, and the temperature was returned to room temperature, followed by stirring for 4 hours. To a 200 ml flask prepared separately were added 5.8 ml (49.2 mmol) of di-1,1-dichlorosilacyclobutane and 20 ml of THF, and the whole was cooled to −78° C. and the previous reaction solution was added thereto. The temperature was returned to room temperature and the whole was stirred for 3 hours and further refluxed for 12 hours. Volatile matter was removed by distillation under reduced pressure to obtain 5.58 g of a yellow liquid. The resulting yellow liquid was used in the subsequent reaction without further purification.

(3-3) Synthesis of (3-methyl-4-(2-(5-methyl)-furyl)-indenyl)(2,3,4,5-tetramethylcyclopentadienyl)silacyclobutane After 4.12 g (19.6 mmol) of 1-methyl-7-(2-(5-methyl)-furyl)-indene and 25 ml of THF were added to a 100 ml flask to form a solution, it was cooled to −78° C. and 7.9 ml (19.8 mmol) of an n-butyllithium/hexane solution (2.5M) was added thereto, and the temperature was returned to room temperature, followed by stirring for 2 hours.

To a 200 ml flask prepared separately were added 5.58 g (24.6 mmol) of the unpurified yellow liquid obtained in (3-2) and 10 ml of THF, and the whole was cooled to −30° C. and the previous reaction solution was added thereto. The temperature was returned to room temperature and the whole was stirred for 12 hours. The reaction product was slowly added to 50 ml of ice water and extracted with 80 ml of ethyl acetate twice. The resulting organic phase was washed with 80 ml of a saturated aqueous sodium chloride solution and dried over anhydrous sodium sulfate. Sodium sulfate was filtered, the solution was subjected to removal by distillation under reduced pressure, and purification was performed through a silica gel column (n-heptane) to obtain 2.30 g (yield 29%) of a yellow oil of (3-methyl-4-(2-(5-methyl)-furyl)-indenyl)(2,3,4,5-tetramethylcyclopentadienyl)silacyclobutane.

(3-4) Synthesis of silacyclobutylene(3-methyl-4-(2-(5-methyl)-furyl)-indenyl)(2,3,4,5-tetramethylcyclopentadienyl)zirconium chloride Synthesis was performed in the same manner as in (1-4) of the metallocene compound A using 3.30 g (8.23 mmol) of (3-methyl-4-(2-(5-methyl)-furyl)-indenyl)(2,3,4,5-tetramethylcyclopentadienyl)silacyclobutane, instead of 2.20 g (5.70 mmol) of (3-methyl-4-(2-(5-methyl)-furyl)-indenyl)(2,3,4,5-tetramethylcyclopentadienyl)dimethylsilane, to obtain 1.0 g (yield 21%) of a yellow powder of silacyclobutylene(3-methyl-4-(2-(5-methyl)-furyl)-indenyl)(2,3,4,5-tetramethylcyclopentadienyl)zirconium chloride.

$^1$H-NMR values (CDCl$_3$): δ 1.83-1.89 (m, 2H), δ 1.85 (s, 3H), δ 1.88 (s, 3H), δ 1.95 (s, 3H), δ 2.02 (s, 3H), δ 2.07 (m, 2H), δ 2.29 (s, 3H), δ 2.37 (s, 3H), δ 2.65-2.71 (m, 2H), δ 5.53 (s, 1H), δ 6.07 (m, 1H), δ 6.36 (d, 1H), δ 7.02 (dd, 1H), δ 7.36 (m, 1H).

(4) Synthesis of metallocene compound D: dimethylsilylene(3-methyl-4-(2-(5-methyl)-furyl)-indenyl)(cyclopentadienyl)zirconium chloride

[Chem 14]

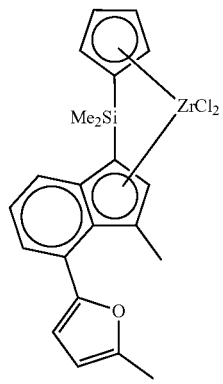

Metallocene compound D

(4-1) Synthesis of 1-methyl-7-(2-(5-methyl)-furyl)-indene

Similarly to (1-1) of the metallocene compound A, 1-methyl-7-(2-(5-methyl)-furyl)-indene was synthesized.

(4-2) Synthesis of dimethyl(cyclopentadienyl)(3-methyl-4-(2-(5-methyl)-furyl)-indenyl)silane After 1-methyl-7-(2-(5-methyl)-furyl)-indene (4.80 g, 22.8 mmol) and 60 ml of THF were added to a 100 ml flask to form a solution, an n-butyllithium/hexane solution (2.5M, 11.0 ml, 27.4 mmol) was added thereto at −78° C., followed by stirring at room temperature for 3 hours. After dimethyldichlorosilane (5.89 g, 45.8 mmol) and 10 ml of THF were added to a 200 ml flask prepared separately to form a solution, the above reaction product was added dropwise thereto at −78° C., followed by stirring at room temperature for 12 hours. Volatile components were removed by distillation under reduced pressure and, after 20 ml of THF was again added thereto to form a solution, a sodium cyclopentadienylide/THF solution (2M, 12.0 ml, 24.0 mmol) was slowly added dropwise thereto at −20° C., followed by stirring at room temperature for 1 hour. Volatile components were removed by distillation under reduced pressure to obtain a crude product. Further, it was purified through a silica gel column (petroleum ether) to obtain 4.20 g (yield 55%) of dimethyl(cyclopentadienyl)(3-methyl-4-(2-(5-methyl)-furyl)-indenyl)silane.

(4-3) Synthesis of dimethylsilylene(cyclopentadienyl)(3-methyl-4-(2-(5-methyl)-furyl)-indenyl)zirconium dichloride After dimethyl(cyclopentadienyl)(3-methyl-4-(2-(5-methyl)-furyl)-indenyl)silane (2.00 g, 6.00 mmol) and 40 ml of diethyl ether were added to a 200 ml flask to form a solution, an n-butyllithium/hexane solution (2.5M, 5.1 ml, 12.6 mmol) was added thereto at −78° C., followed by stirring at room temperature for 2 hours and further at 50° C. for 1 hour. Volatile components were removed by distillation under reduced pressure, subsequently 160 ml of dichloromethane was added, and zirconium tetrachloride (1.53 g, 6.60 mmol) was added thereto, followed by stirring at room temperature for 12 hours. The reaction mixture was filtered and the resulting filtrate was concentrated, thereby obtaining 2.1 g (yield 70%) of dimethylsilylene(cyclopentadienyl)(3-methyl-4-(2-(5-methyl)-furyl)-indenyl)zirconium dichloride.
$^1$H-NMR values (CDCl$_3$): δ 0.80 (s, 3H), δ 1.04 (s, δ 2.25 (s, 3H), δ 2.36 (s, 3H), δ 5.75 (m, 1H), δ 5.77 (s, 1H), δ 5.87 (m, 1H), δ 6.07 (m, 1H), δ 6.40 (d, 1H), δ 6.81 (m, 1H), δ 6.85 (m, 1H), δ 7.06 (dd, 1H), δ 7.40 (m, 2H).

(5) Synthesis of metallocene compound E: dimethylsilylene(4-(4-trimethylsilyl-phenyl)-indenyl)(cyclopentadienyl)zirconium chloride

[Chem 15]

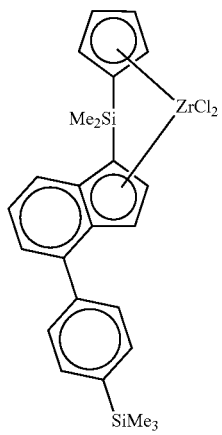

Metallocene compound E (5-1) Synthesis of 4-(4-trimethylsilyl-phenyl)-indene

After 10.0 g (51.5 mmol) of 4-trimethylsilylphenylboronic acid and 200 ml of dimethoxyethane were added to a 500 ml flask to form a solution, 27.3 g (128 mmol) of potassium phosphate, 100 ml of water, 8.37 g (43.0 mmol) of 4-bromoindene, 0.22 g (0.86 mmol) of triphenylphosphine, and 0.300 g (0.430 mmol) of PdCl$_2$(PPh$_3$)$_2$ were added thereto in the order, followed by stirring and refluxing for 12 hours. The whole was cooled to room temperature and 100 ml of water was added thereto. After the organic phase was separated, the aqueous phase was extracted with 100 ml of ethyl acetate twice, and the resulting organic phases were mixed and the mixed one was washed with a saturated aqueous sodium chloride solution. Sodium sulfate was added thereto to dry the organic phase. Sodium sulfate was filtered, the solvent was removed by distillation under reduced pressure, and purification was performed through a silica gel column to obtain 9.0 g (yield 79%) of a yellow liquid of 4-(4-trimethylsilyl-phenyl)-indene.

(5-2) Synthesis of (4-(4-trimethylsilyl-phenyl)-indenyl)(cyclopentadienyl)dimethylsilane After 16.2 g (61.2 mmol) of 4-(4-trimethylsilyl-phenyl)-indene and 100 ml of THF were added to a 200 ml flask to form a solution, it was cooled to −78° C. and 29.4 ml (173.5 mmol) of an n-butyllithium/hexane solution (2.5M) was added thereto, and the temperature was returned to room temperature, followed by stirring for 4 hours. To a 300 ml flask prepared separately were added 14.8 ml (122 mmol) of dimethyldichlorosilane and 20 ml of THF, and the whole was cooled to −78° C. and the previous reaction solution was added thereto. The temperature was returned to room temperature and the whole was stirred for 12 hours. Volatile matter was removed by distillation under reduced pressure to obtain 21.8 g of a yellow solution. Then, 80 ml of THF was added to the yellow solution to form a solution and 36.7 ml (73.5 mmol) of a CpNa/THF solution (2M) was added thereto at −30° C. The temperature was returned to room temperature and 100 ml of ice water was added. Extraction was performed with 100 ml of ethyl acetate twice, the resulting organic phases were mixed, and the mixed one was washed with a saturated aqueous sodium chloride solution. Sodium sulfate was added thereto to dry the organic phase. Sodium sulfate was filtered, the solvent was removed by distillation under reduced pressure, and purification was performed through a silica gel column to obtain 12.0 g (yield 51%) of a yellow liquid of (4-(4-trimethylsilyl-phenyl)-indenyl)(cyclopentadienyl)dimethylsilane.

(5-3) Synthesis of dimethylsilylene(4-(4-trimethylsilyl-phenyl)-indenyl)(cyclopentadienyl)zirconium chloride To a 100 ml flask were added 1.20 g (3.00 mmol) of (4-(4-trimethylsilyl-phenyl)-indenyl)(cyclopentadienyl)dimethylsilane and 20 ml of diethyl ether, followed by cooling to −70° C. Thereto was added dropwise 2.60 ml (6.60 mmol) of a 2.5 mol/L n-butyllithium-n-hexane solution. After dropwise addition, the temperature was returned to room temperature and the whole was stirred for 2 hours. The solvent of the reaction solution was removed by distillation under reduced pressure, 30 ml of dichloromethane was added thereto, and the whole was cooled to −70° C. on a dry ice-methanol bath. Thereto was added 0.770 g (3.30 mmol)

of zirconium tetrachloride. Thereafter, the whole was stirred overnight while the temperature was gradually returned to room temperature. The reaction solution was filtered and the solvent was removed by distillation from the resulting filtrate under reduced pressure, thereby obtaining a yellow powder. The powder was recrystallized from 10 ml of toluene to obtain 0.500 g (yield 31%) of dimethylsilylene (4-(4-trimethylsilylphenyl)-indenyl)(cyclopentadienyl)zirconium chloride as yellow crystals.

$^1$H-NMR values (CDCl$_3$): δ 0.21 (s, 3H), δ 0.23 (s, 9H), δ 0.43 (s, 3H), δ 5.48 (m, 1H), δ 5.51 (m, 1H), δ 5.81 (d, 1H), δ 6.60 (m, 1H), δ 6.66 (m, 1H), δ 6.95 (dd, 1H), δ 7.13 (s, 1H), δ 7.39 (dd, 2H), δ 7.57 (d, 2H), δ 7.95 (d, 2H).

(6) Synthesis of metallocene compound F: dimethylsilylene(4-(2-(5-methyl)-furyl)-indenyl)(cyclopentadienyl)zirconium chloride

[Chem 16]

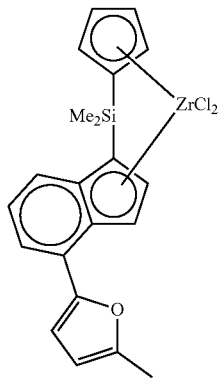

Metallocene compound F (6-1) Synthesis of 4-(2-(5-methyl)-furyl)-indene

Similarly to (2-1) of the metallocene compound B, 4-(2-(5-methyl)-furyl)-indene was synthesized.

(6-2) Synthesis of (4-(2-(5-methyl)-furyl)-indenyl) (cyclopentadienyl)dimethylsilane Synthesis was performed in the same manner as in (5-2) of the metallocene compound E using 4-(2-(5-methyl)-furyl)-indene, instead of 4-(4-trimethylsilyl-phenyl)-indene of the metallocene compound E, to obtain a pale yellow solid of (4-(2-(5-methyl)-furyl)-indenyl)(cyclopentadienyl) dimethylsilane in 38% yield.

(6-3) Synthesis of dimethylsilylene(4-(2-(5-methyl)-furyl)-indenyl)(cyclopentadienyl)zirconium chloride Synthesis was performed in the same manner as in (5-3) of the metallocene compound E using (4-(2-(5-methyl)-furyl)-indenyl)(cyclopentadienyl)dimethylsilane, instead of (4-(4-trimethylsilylphenyl)-indenyl)(cyclopentadienyl)dimethylsilane, to obtain dimethylsilylene(4-(2-(5-methyl)-furyl)-indenyl)(cyclopentadienyl)zirconium chloride as yellow crystals (yield 25%).

$^1$H-NMR values (CDCl$_3$): δ 0.00 (s, 3H), δ 0.18 (s, 3H), δ 1.79 (s, 3H), δ 5.22 (m, 1H), δ 5.32 (m, 1H), δ 5.64 (m, 1H), δ 5.72 (d, 1H), δ 6.33 (m, 1H), δ 6.35 (m, 1H), δ 6.70 (m, 2H), δ 6.82 (d, 1H), δ 7.43 (d, 1H), δ 7.60 (d, 1H).

(7) Synthesis of metallocene compound G: dimethylsilylene(4-(4-trimethylsilyl-phenyl)-indenyl)(2,3,4,5-tetramethylcyclopentadienyl) zirconium chloride

[Chem 17]

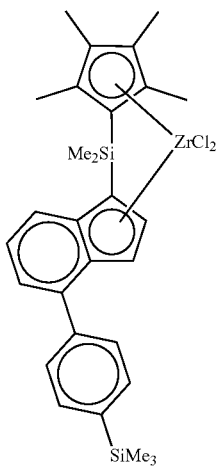

Metallocene compound G (7-1) Synthesis of 4-(4-trimethylsilyl-phenyl)-indene

Similarly to (5-1) of the metallocene compound E, 4-(4-trimethylsilyl-phenyl)-indene was synthesized.

(7-2) Synthesis of (4-(4-trimethylsilyl-phenyl)-indenyl)(2,3,4,5-tetramethylcyclopentadienyl)dimethylsilane After 5.00 g (18.92 mmol) of 4-(4-trimethylsilyl-phenyl)-indene and 40 ml of THF were added to a 100 ml flask to form a solution, it was cooled to −78° C. and 8.0 ml (19.8 mmol) of an n-butyllithium/hexane solution (2.5M) was added thereto, followed by stirring at 20° C. for 3 hours. To a 100 ml flask prepared separately were added 5.2 g (24.6 mmol) of (2,3,4,5-tetramethyl)cyclopentadienyldichlorosilane obtained in the same manner as in (1-2) of Synthesis of metallocene compound A and 20 ml of THF, thereby forming a solution, and the whole was cooled to −30° C. and the previous reaction solution was added thereto. The whole was stirred at 20° C. for 1 hour. Volatile matter was removed by distillation under reduced pressure to obtain a crude product. The crude product was purified through a silica gel column twice to obtain 2.0 g (yield 25%) of a yellow liquid of (4-(4-trimethylsilyl-phenyl)-indenyl)(2,3,4,5-tetramethylcyclopentadienyl)dimethylsilane.

(7-3) Synthesis of dimethylsilylene(4-(4-trimethylsilyl-phenyl)-indenyl)(2,3,4,5-tetramethylcyclopentadienyl) zirconium chloride Synthesis was performed in the same manner as in (1-4) of the metallocene compound A using 2.00 g (4.50 mmol) of (4-(4-trimethylsilyl-phenyl)-indenyl)(2,3,4,5-tetramethylcyclopentadienyl)dimethylsilane, instead of 2.20 g (5.70 mmol) of (3-methyl-4-(2-(5-methyl)-furyl)-indenyl)(2,3,4,5-tetramethylcyclopentadienyl)dimethylsilane, to obtain 1.1 g (yield 40%) of a yellow powder of dimethylsilylene(4-(4-trimethylsilyl-phenyl)-indenyl)(2,3,4,5-tetramethylcyclopentadienyl) zirconium chloride.

$^1$H-NMR values (CDCl$_3$): δ 0.31 (s, 9H), δ 0.98 (s, 3H), δ 1.21 (s, 3H), δ 1.957 (s, 3H), δ 1.964 (s, 3H), δ 1.98 (s, 3H), δ 2.02 (s, 3H), δ 6.00 (d, 1H), δ 7.16 (dd, 1H), δ 7.34 (d, 1H), δ 7.37 (d, 1H), δ 7.50 (d, 1H), δ 7.64 (d, 2H), δ 7.74 (d, 2H).

(8) Synthesis of metallocene compound H: dimethylsilylene(4-phenyl-indenyl)(2,3,4,5-tetramethylcyclopentadienyl)zirconium chloride

[Chem 18]

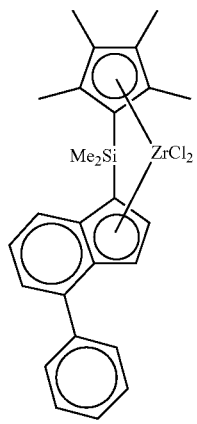

Metallocene compound H (8-1) Synthesis of (4-phenyl-indenyl)(2,3,4,5-tetramethylcyclopentadienyl)dimethylsilane After 3.54 g (18.40 mol) of 4-phenylindene and 40 ml of THF were added to a 100 ml flask to form a solution, it was cooled to −78° C. and 7.73 ml (19.3 mmol) of an n-butyllithium/hexane solution (2.5M) was added thereto, followed by stirring at 10° C. for 3 hours. To a 100 ml flask prepared separately were added 3.95 g (18.40 mmol) of (2,3,4,5-tetramethyl)cyclopentadienyldichlorosilane obtained in the same manner as in (1-2) of Synthesis of metallocene compound A and 20 ml of THF, thereby forming a solution, and the whole was cooled to −30° C. and the previous reaction solution was added thereto. The whole was stirred at 10° C. for 1 hour. The resulting reaction solution was poured into 50 ml of ice water and extracted with 100 ml of ethyl acetate twice. The organic phase was washed with 50 ml of a saturated aqueous sodium chloride solution and dried over anhydrous sodium sulfate. Sodium sulfate was filtered, the solvent was removed by distillation under reduced pressure, and purification was performed through a silica gel column twice to obtain 2.10 g (yield 26.5%) of a yellow liquid of (4-phenyl-indenyl)(2,3,4,5-tetramethylcyclopentadienyl)dimethylsilane.

(8-2) Synthesis of dimethylsilylene(4-phenyl-indenyl)(2,3,4,5-tetramethylcyclopentadienyl)zirconium chloride Synthesis was performed in the same manner as in (1-4) of the metallocene compound A using 2.10 g (5.67 mmol) of (4-phenyl-indenyl)(2,3,4,5-tetramethylcyclopentadienyl)dimethylsilane, instead of 2.20 g (5.70 mmol) of (3-methyl-4-(2-(5-methyl)-furyl)-indenyl)(2,3,4,5-tetramethylcyclopentadienyl)dimethylsilane, to obtain 1.00 g (yield 33.2%) of a yellow powder of dimethylsilylene(4-phenyl-indenyl)(2,3,4,5-tetramethylcyclopentadienyl)zirconium chloride.

$^1$H-NMR values (CDCl$_3$): δ 0.99 (s, 3H), δ 1.21 (s, 3H), δ 1.96 (s, 3H), δ 1.97 (s, 3H), δ 1.98 (s, 3H), δ 2.01 (s, 3H), δ 6.00 (d, 1H), δ 7.18 (dd, 1H), δ 7.30 (d, 1H), δ 7.36 (d, 1H), δ 7.39 (d, 2H), δ 7.49 (q, 3H), δ 7.73 (d, 2H).

(9) Synthesis of metallocene compound dimethylsilylene(3-methyl-4-(2-(5-methyl)-furyl)-indenyl)(2,4,5-trimethylcyclopentadienyl) zirconium chloride

[Chem 19]

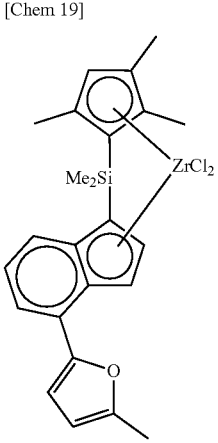

Metallocene compound I (9-1) Synthesis of 1-methyl-7-(2-(5-methyl)-furyl)-indene Similarly to (1-1) of the metallocene compound A, 1-methyl-7-(2-(5-methyl)-furyl)-indene was synthesized.

(9-2) Synthesis of (3-methyl-4-(2-(5-methyl)-furyl)-indenyl)(2,3,5-trimethylcyclopentadienyl)dimethylsilane After 1-methyl-7-(2-(5-methyl)-furyl)-indene (500.00 mg, 2.38 mmol) and 10 ml of THF were added to a 100 ml flask to form a solution, an n-butyllithium/hexane solution (2.5M, 1.43 ml, 3.58 mmol) was added thereto at −78° C., followed by stirring at 20° C. for 4 hours. Volatile matter was removed by distillation under reduced pressure and, after the residue was washed with 5 ml of dehydrated pentane three times, it was dissolved with adding 10 ml of THF. To a 100 ml flask prepared separately were added dimethyldichlorosilane (613.78 mg, 4.76 mmol) and 10 ml of THF, thus forming a solution, and then the above reaction product was added dropwise thereto at −78° C., followed by stirring at 20° C. for 12 hours. Volatile components were removed by distillation under reduced pressure and 10 ml of THF was again added thereto to form a solution. Thereafter, a THF (10 ml) solution of 488.85 mg (4.28 mmol) of lithium 1,2,4-trimethylcyclopentadienide was slowly added thereto at −20° C. Further, 1.95 mg (23.8 μmop of N-methylimidazole was added thereto and the whole was stirred at 15° C. for 15 hours. The reaction solution was poured into 100 ml of ice water and extracted with 100 ml of petroleum ether three times. The organic phase was washed with 150 ml of a saturated aqueous sodium chloride solution and dried over anhydrous sodium sulfate. Sodium sulfate was filtered, the solvent was removed by distillation under reduced pressure, and purification was performed through a silica gel column to obtain 131.00 mg (yield 14.7%) of a yellow liquid of (3-methyl-4-(2-(5-methyl)-furyl)-indenyl)(2,3,5-trimethyl-cyclopentadienyl)dimethylsilane.

(9-3) Synthesis of dimethylsilylene(3-methyl-4-(2-(5-methyl)-furyl)-indenyl)(2,4,5-trimethylcyclopentadienyl) zirconium chloride Synthesis was performed in the same manner as in (1-4) of the metallocene compound A using 1.80 g (4.81 mmol) of (3-methyl-4-(2-(5-methyl)-furyl)-indenyl)(2,3,5-trimethyl-cyclopentadienyl)dimethylsilane, instead of 2.20 g (5.70 mmol) of (3-methyl-4-(2-(5-methyl)-furyl)-indenyl)(2,3,4,5-tetramethylcyclopentadienyl)dimethylsilane, to obtain a 1:1 mixture of dimethylsilylene(3-methyl-4-(2-(5-methyl)-furyl)-indenyl)(2,4,5-trimethylcyclopentadienyl) zirconium chloride and dimethylsilylene(3-methyl-4-(2-(5-methyl)-furyl)-indenyl)(2,3,5-trimethylcyclopentadienyl) zirconium chloride as 360.00 mg (yield 13.9%) of a yellow powder.

$^1$H-NMR values (CDCl$_3$): δ 0.925 (s, 3H), δ 0.933 (s, 3H), δ 1.17 (s, 3H), δ 1.19 (s, 3H), δ 1.88 (s, 3H), δ 1.93 (s, 3H), δ 2.10-2.12 (m, 9H), δ 2.16 (s, 3H), δ 2.26 (s, 3H), δ 2.28 (s, 3H), δ 2.38 (m, 6H), δ 5.49 (s, 1H), δ 5.65 (s, 1H), δ 6.08 (s, 2H), δ 6.27 (d, 1H), δ 6.35-6.39 (m, 4H), δ 7.01-7.08 (m, 2H), δ 7.38-7.50 (m, 3H).

(10) Synthesis of metallocene compound J: dimethylsilylene(3-methyl-4-(2-(5-methyl)-thienyl)-indenyl)(2,3,4,5-tetramethylcyclopenta dienyl)zirconium chloride

[Chem 20]

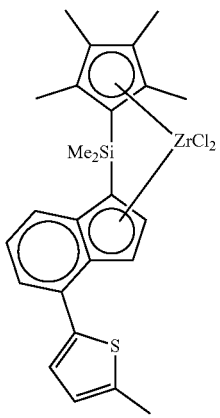

Metallocene compound J (10-1) Synthesis of 7-bromo-1-indanone

Similarly to (1-1-b) of the metallocene compound A, 7-bromo-1-indanone was synthesized.

(10-2) Synthesis of 3-methyl-4-bromoindene

After 7.50 g (35.5 mmol) of 7-bromo-1-indanone and 100 ml of toluene were added to a 200 ml flask to form a solution, 17.77 ml (3M, 53.31 mmol) of a methylmagnesium bromide/diethyl ether solution was added thereto at 0° C., followed by stirring at 15° C. for 12 hours. The reaction solution was poured into 200 ml of ice water and the precipitated solid was filtered and washed with 60 ml of ethyl acetate three times. After the organic phase was separated from the filtrate, the organic phase was washed with 100 ml of water twice and dried over anhydrous sodium sulfate. Sodium sulfate was filtered and the solvent was removed by distillation under reduced pressure to obtain 8.00 g of a crude product of 7-bromo-1-methylindanol.

After 8.00 g (35.23 mmol) of the crude product of 7-bromo-1-methylindanol and 150 ml of toluene were added to a 300 ml flask to form a solution, 134.03 mg (704.60 μmol) of p-toluenesulfonic acid was added thereto at 15° C., followed by stirring at 110° C. for 2 hours. During stirring, water to be formed was removed by means of a Dean-Stark trap. After cooling to room temperature, 50 ml of a saturated aqueous sodium hydrogen carbonate solution was added thereto and the organic phase was separated. After the aqueous phase was extracted with 60 ml of ethyl acetate three times, the organic phases were combined and the combined one was washed with 50 ml of a saturated aqueous sodium chloride solution three times and dried over sodium sulfate. Sodium sulfate was filtered and the solvent was removed by distillation under reduced pressure to obtain a crude product. It was further purified through a silica gel column (petroleum ether) to obtain 5.00 g (yield 67.8%) of 3-methyl-4-bromoindene.

(10-3) Synthesis of 3-methyl-4-(2-(5-methyl)-thienyl)-indene

After 5.00 g (50.93 mmol) of 2-thiophene and 80 ml of THF were added to a 200 ml flask to form a solution, 22.41 ml (2.5M, 56.03 mmol) of an n-butyllithium/hexane solution was added thereto at −78° C., followed by stirring at 15° C. for 1 hour. Subsequently, 18.24 g (56.02 mmol) of tributylchlorotin was added thereto at −78° C. and the whole was again stirred at 15° C. for 1 hour. The solvent was removed by distillation under reduced pressure to obtain 19.7 g of a crude product of tributyl(2-(5-methyl)-thienyl)tin.

After 5.00 g (23.91 mmol) of 3-methyl-4-bromoindene, 274.97 mg (478.20 μmop of Pd(dba)$_2$, 501.71 mg (1.91 mmol) of triphenylphosphine, and 80 ml of toluene were added to a 300 ml flask, 11.11 g (28.69 mmol) of the crude product of tributyl(2-(5-methyl)-thienyl)tin was added thereto at 15° C., followed by stirring at 110° C. for 12 hours. The whole was cooled to room temperature and poured into 60 ml of an aqueous hydrogen fluoride solution, followed by stirring at room temperature for 1 hour. The reaction solution was extracted with 80 ml of ethyl acetate three times and the organic phase was washed with 50 ml of water three times and dried over sodium sulfate. Sodium sulfate was filtered and the solvent was removed by distillation under reduced pressure to obtain a crude product. It was further purified through a silica gel column (petroleum ether) to obtain 5.30 g (yield 98.0%) of 3-methyl-4-(2-(5-methyl)-thienyl)-indene.

(10-4) Synthesis of (3-methyl-4-(2-(5-methyl)-thienyl)-indenyl)(2,3,4,5-tetramethylcyclopentadienyl) dimethylsilane After 3.00 g (13.3 mmol) of 3-methyl-4-(2-(5-methyl)-thienyl)-indene and 40 ml of THF were added to a 100 ml flask to form a solution, it was cooled to −78° C. and 5.83 ml (14.58 mmol) of an n-butyllithium/hexane solution (2.5M) was added thereto, followed by stirring at 15° C. for 3 hours. To a 200 ml flask prepared separately were added 3.70 g (17.23 mmol) of (2,3,4,5-tetramethylcyclopentadienyl)dimethylchlorosilane obtained in the same manner as in (1-2) of Synthesis of metallocene compound A and 40 ml of THF, and the whole was cooled to −78° C. and the previous reaction solution was added thereto. The whole was stirred at 15° C. for 1 hour. The reaction solution was poured into 100 ml of ice water and extracted with 100 ml of ethyl acetate three times and the organic phase was dried over sodium sulfate. Sodium sulfate was filtered and the solvent was removed by distillation under reduced pressure to obtain a crude product. Further, it was purified through a silica gel column (petroleum ether) to obtain 3.10 g (yield 57.8%) of (3-methyl-4-(2-(5-methyl)-thienyl)-indenyl)(2,3,4,5-tetramethylcyclopentadienyl)dimethyl silane.

(10-4) Synthesis of dimethylsilylene(3-methyl-4-(2-(5-methyl)-thienyl)-indenyl)(2,3,4,5-tetramethylcyclopenta dienyl)zirconium chloride Synthesis was performed in the same manner as in (1-4) of the metallocene compound A using 3.10 g (7.66 mmol) of (3-methyl-4-(2-(5-methyl)-thienyl)-indenyl)(2,3,4,5-tetramethylcyclopentadienyl)dimethylsilane, instead of 2.20 g (5.70 mmol) of (3-methyl-4-(2-(5-methyl)-furyl)-indenyl)(2,3,4,5-tetramethylcyclopentadienyl)dimethylsilane, to obtain 3.60 g (yield 33.2%) of a yellow powder of dimethylsilylene(3-methyl-4-(2-(5-methyl)-thienyl)-indenyl)(2,3,4,5-tetramethylcyclopenta dienyl)zirconium chloride.

$^1$H-NMR values (CDCl$_3$): δ 0.93 (s, 3H), δ 1.20 (s, 3H), δ 1.89 (s, 3H), δ 1.95 (s, 3H), δ 1.99 (s, 3H), δ 2.05 (s, 3H), δ 2.15 (s, 3H), δ 2.52 (s, 3H), δ 5.49 (s, 1H), δ 6.73 (d, 1H), δ 6.89 (d, 1H), δ 7.02 (dd, 1H), δ 7.26 (d, 1H), δ 7.46 (d, 1H).

(11) Synthesis of metallocene compound K: dimethylsilylene(4-phenyl-indenyl)(cyclopentadienyl)zirconium chloride

[Chem 21]

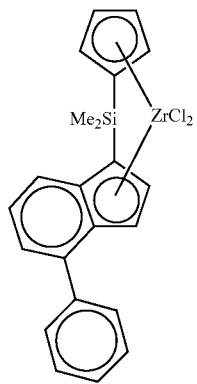

Metallocene compound K (11-1) Synthesis of (4-phenyl-indenyl)(cyclopentadienyl)dimethylsilane After 5.00 g (26.0 mmol) of 4-phenyl-indene and 40 ml of THF were added to a 100 ml flask to form a solution, 12.4 ml (2.5M, 31.2 mmol) of an n-butyllithium/hexane solution was added thereto at −78° C., followed by stirring at room temperature for 4 hours. To a 200 ml flask prepared separately were added 5.64 ml (46.8 mmol) of dimethyldichlorosilane and 20 ml of THF, thus forming a solution, and then the above reaction product was added dropwise thereto at −78° C., followed by stirring at room temperature for 12 hours. After volatile components were removed by distillation under reduced pressure and 60 ml of THF was again added thereto to form a solution, 15.6 ml (2M, 31.2 mmol) of a sodium cyclopentadienylide/THF solution was slowly added dropwise thereto at −20° C., followed by stirring at room temperature for 1 hour. The reaction solution was poured into 60 ml of ice water and extracted with 100 ml of ethyl acetate twice and the organic phase was dried over anhydrous sodium sulfate. Sodium sulfate was filtered and the solvent was removed by distillation under reduced pressure to obtain a crude product. Further, it was purified through a silica gel column (petroleum ether) to obtain 3.70 g (yield 45%) of (4-phenyl-indenyl)(cyclopentadienyl)dimethylsilane.

(11-2) Synthesis of dimethylsilylene(4-phenyl-indenyl)(cyclopentadienyl)zirconium chloride Synthesis was performed in the same manner as in (1-4) of the metallocene compound A using 6.10 g (19.7 mmol) of (4-phenyl-indenyl)(cyclopentadienyl)dimethylsilane, instead of 2.20 g (5.70 mmol) of (3-methyl-4-(2-(5-methyl)-furyl)-indenyl)(2,3,4,5-tetramethylcyclopentadienyl)dimethylsilane, to obtain 5.90 g (yield 60%) of a yellow powder of dimethylsilylene(4-phenyl-indenyl)(cyclopentadienyl) zirconium chloride.

$^1$H-NMR values (CDCl$_3$): δ 0.87 (s, 3H), δ 1.08 (s, 3H), δ 5.91 (m, 1H), δ 5.94 (m, 1H), δ 6.24 (d, 1H), δ 6.79 (m, 1H), δ 6.86 (m, 1H), δ 7.20 (m, 2H), δ 7.43-7.48 (m, 5H), δ 7.68 (m, 2H).

(12) Synthesis of metallocene compound L: dimethylsilylene(4-(2-(5-methyl)-furyl)-indenyl)(3,4-dimethylcyclopentadienyl)zirconium dichloride

[Chem 22]

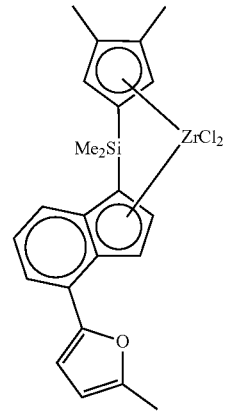

Metallocene compound L (12-1) Synthesis of 4-(2-(5-methyl)-furyl)-indene

Similarly to (2-1) of the metallocene compound B, 4-(2-(5-methyl)-furyl)-indene was synthesized.

(12-2) Synthesis of (4-(2-(5-methyl)-furyl)-indenyl)(3,4-dimethylcyclopentadienyl)dimethylsilane After 2.00 g (10.1 mmol) of 4-(2-(5-methyl)-furyl)-indene and 20 ml of THF were added to a 100 ml flask to form a solution, it was cooled to −78° C. and 4.90 ml (12.2 mmol) of an n-butyllithium/hexane solution (2.5M) was added thereto, and the temperature was returned to room temperature, followed by stirring for 3 hours. To a 100 ml flask prepared separately were added 2.63 g (20.3 mmol) of dimethyldichlorosilane and 10 ml of THF, thereby forming a solution, and the whole was cooled to −78° C. and the previous reaction solution was added thereto. The temperature was returned to room temperature and the whole was stirred for 12 hours. Volatile matter was removed by distillation under reduced pressure to obtain a yellow solution. Then, 10 ml of THF was added to the yellow solution to form a solution, a 1.00 g (10.1 mmol) of 1,2-dimethylcyclopentadienyllithium/THF solution (10 ml) synthesized separately was added thereto at −30° C. The temperature was returned to room temperature, the whole was stirred for 1 hour, and volatile matter was removed by distillation under reduced pressure to obtain a crude product. The crude product was purified through a silica gel column to obtain 0.80 g (yield 28%) of a yellow liquid of (4-(2-(5-methyl)-furyl)-indenyl)(3,4-dimethylcyclopentadienyl)dimethylsilane.

(12-3) Synthesis of dimethylsilylene(4-(2-(5-methyl)-furyl)-indenyl)(3,4-dimethylcyclopentadienyl)zirconium chloride Synthesis was performed in the same manner as in (1-4) of the metallocene compound A using 1.75 g (5.05 mmol) of (4-(2-(5-methyl)-furyl)-indenyl)(3,4-dimethylcyclopentadienyl)dimethylsilane, instead of 2.20 g (5.70 mmol) of (3-methyl-4-(2-(5-methyl)-furyl)-indenyl)(2,3,4,5-tetramethylcyclopentadienyl)dimethylsilane, to obtain 1.34 g (yield 47.5%) of a yellow powder of dimethylsilylene(4-(2-(5-methyl)-furyl)-indenyl)(3,4-dimethylcyclopentadienyl) zirconium chloride.

$^1$H-NMR values (CDCl$_3$): δ 0.80 (s, 3H), δ 1.00 (s, 3H), δ 1.95 (s, 3H), δ 2.06 (s, 3H), δ 2.42 (s, 3H), δ 5.47 (m, 1H), δ 5.50 (m, 1H), δ 6.15 (s, 1H), δ 6.16 (d, 1H), δ 6.84 (d, 1H), δ 7.12 (dd, 1H), δ 7.32 (d, 1H), δ 7.54 (d, 1H), δ 7.66 (d, 1H).

3. Examples and Comparative Examples

Example 1

(1) Preparation of Solid Catalyst

Under a nitrogen atmosphere, 5 g of silica calcined at 600° C. for 5 hours was placed in a 200 ml two-neck flask and was dried under reduced pressure for 1 hour by means of a vacuum pump while heating on an oil bath at 150° C. In a 100 ml two-neck flask prepared separately was placed 69 mg of the metallocene compound A under a nitrogen atmosphere, and the compound was dissolved in 13.4 ml of dehydrated toluene. At room temperature, 8.6 ml of a 20% methylaluminoxane/toluene solution manufactured by Albemarle Corporation was added to the toluene solution of the metallocene compound A, followed by stirring for 30 minutes. While the 200 ml two-neck flask containing vacuum-dried silica placed therein was heated and stirred on an oil bath at 40° C., all the amount of the toluene solution of the reaction product of the metallocene compound A and methylaluminoxane was added thereto. After the whole was stirred at 40° C. for 1 hour, the toluene solvent was removed by distillation under reduced pressure still under heating at 40° C., thereby obtaining a solid catalyst.

(2) Production of Ethylene-1-Butene Copolymer

An ethylene-1-butene copolymer was produced using the solid catalyst obtained in (1) Preparation of Solid Catalyst of the above Example 1.

That is, after 80 g of thoroughly dehydrated and deoxygenated polyethylene-made pellets, 33 mg of triethylaluminum (TEA), and 102 ml of hydrogen at normal pressure were introduced into a stainless steel-made autoclave having stirring and temperature-controlling devices and an internal volume of 1 liter, the temperature was raised to 70° C. while stirring. After ethylene containing 10% by weight of 1-butene was introduced until partial pressure thereof reached 2.0 MPa, 16 mg of the above solid catalyst was pressed therein with an argon gas and polymerization was continued for 30 minutes while maintaining an ethylene partial pressure of 2.0 MPa and a temperature of 70° C.

As a result, 32.7 g of an ethylene-1-butene copolymer was formed. MFR of the resulting copolymer was 4.15 g/10 minutes. Polymerization conditions are summarized in Table 14 and Polymerization results are summarized in Table 15.

Example 2

An ethylene-1-butene copolymer was produced in the same manner as in Example 1 except that 11 mg of the solid catalyst obtained in (1) Preparation of Solid Catalyst of Example 1 was used, 85 ml of hydrogen was introduced at normal pressure before ethylene containing 10% by weight of 1-butene was introduced, and the polymerization time was changed to 34 minutes.

As a result, 31.4 g of an ethylene-1-butene copolymer was formed. MFR of the resulting copolymer was 0.62 g/10 minutes. Polymerization conditions are summarized in Table 14 and Polymerization results are summarized in Table 15.

Example 3

(1) Preparation of Solid Catalyst

A solid catalyst was prepared in the same manner as in Example 1 except that 67 mg of the metallocene compound B was used instead of 69 mg of the metallocene compound A.

(2) Production of Ethylene-1-Butene Copolymer

An ethylene-1-butene copolymer was produced in the same manner as in Example 1 except that 15 mg of the solid catalyst obtained in (1) Preparation of Solid Catalyst of Example 1 was used, 17 ml of hydrogen was introduced at normal pressure before ethylene containing 10% by weight of 1-butene was introduced, and the polymerization time was changed to 60 minutes.

As a result, 18.1 g of an ethylene-1-butene copolymer was formed. MFR of the resulting copolymer did not flow.

Polymerization conditions are summarized in Table 14 and Polymerization results are summarized in Table 15.

Example 4

(1) Preparation of Solid Catalyst

A solid catalyst was prepared in the same manner as in Example 1 except that 70 mg of the metallocene compound C was used instead of 69 mg of the metallocene compound A.

(2) Production of Ethylene-1-Butene Copolymer

An ethylene-1-butene copolymer was produced in the same manner as in Example 1 except that 26 mg of the solid catalyst obtained in (1) Preparation of Solid Catalyst of the above Example 4 was used and 68 ml of hydrogen was introduced at normal pressure before ethylene containing 10% by weight of 1-butene was introduced.

As a result, 29.5 g of an ethylene-1-butene copolymer was formed. MFR of the resulting copolymer was 0.16 g/10 minutes. Polymerization conditions are summarized in Table 14 and Polymerization results are summarized in Table 15.

Example 5

An ethylene-1-butene copolymer was produced in the same manner as in Example 1 except that 15 mg of the solid catalyst obtained in (1) Preparation of Solid Catalyst of the above Example 4 was used.

As a result, 32.0 g of an ethylene-1-butene copolymer was formed. MFR of the resulting copolymer was 1.00 g/10 minutes. Polymerization conditions are summarized in Table 14 and Polymerization results are summarized in Table 15.

Comparative Example C1

(1) Preparation of Solid Catalyst

A solid catalyst was prepared in the same manner as in Example 1 except that 62 mg of the metallocene compound D was used instead of 69 mg of the metallocene compound A.

(2) Production of Ethylene-1-Butene Copolymer

An ethylene-1-butene copolymer was produced in the same manner as in Example 1 except that 49 mg of the solid catalyst obtained in (1) Preparation of Solid Catalyst of the above Comparative Example C1 was used, 51 ml of hydrogen was introduced at normal pressure before ethylene containing 10% by weight of 1-butene was introduced, and the polymerization time was changed to 60 minutes.

As a result, 10.8 g of an ethylene-1-butene copolymer was formed. MFR of the resulting copolymer was 4.60 g/10 minutes. Polymerization conditions are summarized in Table 14 and Polymerization results are summarized in Table 15.

Comparative Example C2

(1) Preparation of Solid Catalyst

A solid catalyst was prepared in the same manner as in Example 1 except that 68 mg of the metallocene compound E was used instead of 69 mg of the metallocene compound A.

(2) Production of Ethylene-1-Butene Copolymer

An ethylene-1-butene copolymer was produced using the solid catalyst obtained in (1) Preparation of Solid Catalyst of the above Comparative Example C2.

That is, after 500 ml of thoroughly dehydrated and deoxygenated heptane, 57 mg of triethylaluminum (TEA), and 68 ml of hydrogen at normal pressure were introduced into a stainless steel-made autoclave having stirring and temperature-controlling devices and an internal volume of 1 liter, the temperature was raised to 75° C. while stirring. Ethylene containing 10% by weight of 1-butene was introduced until partial pressure thereof reached 1.4 MPa, 10 ml of a heptane slurry of 100 mg of the above solid catalyst was pressed therein with an argon gas, and polymerization was continued for 60 minutes while maintaining an ethylene partial pressure of 1.4 MPa and a temperature of 75° C.

As a result, 11.6 g of an ethylene-1-butene copolymer was formed. MFR of the resulting copolymer was 0.53 g/10 minutes. Polymerization conditions are summarized in Table 14 and Polymerization results are summarized in Table 15.

Comparative Example C3

(1) Preparation of Solid Catalyst

A solid catalyst was prepared in the same manner as in Example 1 except that 60 mg of the metallocene compound F was used instead of 69 mg of the metallocene compound A.

(2) Production of Ethylene-1-Butene Copolymer

An ethylene-1-butene copolymer was produced in the same manner as in Example 1 except that 203 mg of the solid catalyst obtained in (1) Preparation of Solid Catalyst of the above Comparative Example C3 was used, hydrogen was not introduced, and the polymerization time was changed to 60 minutes.

As a result, 24.2 g of an ethylene-1-butene copolymer was formed. MFR of the resulting copolymer was 0.27 g/10 minutes. Polymerization conditions are summarized in Table 14 and Polymerization results are summarized in Table 15.

Example 6

(1) Preparation of Solid Catalyst

A solid catalyst was prepared in the same manner as in Example 1 except that 30 mg of the metallocene compound G was used instead of 69 mg of the metallocene compound A.

(2) Production of Ethylene-1-Butene Copolymer

An ethylene-1-butene copolymer was produced in the same manner as in Comparative Example C2 except that 25 mg of the solid catalyst obtained in (1) Preparation of Solid Catalyst of the above Example 6 was used and 72 mg of triethylaluminum (TEA) and 34 ml of hydrogen at normal pressure were introduced.

As a result, 11.5 g of an ethylene-1-butene copolymer was formed. MFR of the resulting copolymer was 1.62 g/10 minutes. Polymerization conditions are summarized in Table 14 and Polymerization results are summarized in Table 15.

Example 7

(1) Preparation of Solid Catalyst

A solid catalyst was prepared in the same manner as in Example 1 except that 27 mg of the metallocene compound H was used instead of 69 mg of the metallocene compound A.

(2) Production of Ethylene-1-Butene Copolymer

An ethylene-1-butene copolymer was produced in the same manner as in Example 6 except that 25 mg of the solid catalyst obtained in (1) Preparation of Solid Catalyst of Example 7 was used.

As a result, 15.9 g of an ethylene-1-butene copolymer was formed. MFR of the resulting copolymer was 0.78 g/10 minutes. Polymerization conditions are summarized in Table 14 and Polymerization results are summarized in Table 15.

Example 8

(1) Preparation of Solid Catalyst

A solid catalyst was prepared in the same manner as in Example 1 except that 67 mg of the metallocene compound I was used instead of 69 mg of the metallocene compound A.

(2) Production of Ethylene-1-Butene Copolymer

An ethylene-1-butene copolymer was produced using the solid catalyst obtained in (1) Preparation of Solid Catalyst of the above Example 8.

That is, after 800 ml of thoroughly dehydrated and deoxygenated isobutane, 34 mg of triethylaluminum, 4,060 ml of hydrogen diluted to a concentration of 5% with nitrogen at normal pressure, and 100 ml of 1-butene at 0.6 MPa were introduced into a stainless steel-made autoclave having stirring and temperature-controlling devices and an internal volume of 1.5 liter, the temperature was raised to 75° C. while stirring. Ethylene was introduced until partial pressure thereof reached 1.4 MPa, 43 mg of the above solid catalyst was pressed therein with a nitrogen gas, and polymerization was continued for 60 minutes while maintaining an ethylene partial pressure of 1.4 MPa and a temperature of 75° C.

As a result, 42.2 g of an ethylene-1-butene copolymer was formed. MFR of the resulting copolymer was 0.34 g/10 minutes. Polymerization conditions are summarized in Table 14 and Polymerization results are summarized in Table 15.

Example 9

(1) Preparation of Solid Catalyst

A solid catalyst was prepared in the same manner as in Example 1 except that 71 mg of the metallocene compound J was used instead of 69 mg of the metallocene compound A.

(2) Production of Ethylene-1-Butene Copolymer

An ethylene-1-butene copolymer was produced in the same manner as in Example 8 except that 38 mg of the solid catalyst obtained in (1) Preparation of Solid Catalyst of Example 9 was used and 2,975 ml of hydrogen diluted to a concentration of 5% with nitrogen at normal pressure was introduced.

As a result, 246.0 g of an ethylene-1-butene copolymer was formed. MFR of the resulting copolymer did not flow. Polymerization conditions are summarized in Table 14 and Polymerization results are summarized in Table 15.

Comparative Example C4

(1) Preparation of Solid Catalyst

A solid catalyst was prepared in the same manner as in Example 1 except that 59 mg of the metallocene compound K was used instead of 69 mg of the metallocene compound A.

(2) Production of Ethylene-1-Butene Copolymer

An ethylene-1-butene copolymer was produced in the same manner as in Example 6 except that 99 mg of the solid catalyst obtained in (1) Preparation of Solid Catalyst of the above Comparative Example C4 was used.

As a result, 5.9 g of an ethylene-1-butene copolymer was formed. MFR of the resulting copolymer was 0.27 g/10 minutes. Polymerization conditions are summarized in Table 14 and Polymerization results are summarized in Table 15.

Comparative Example C5

(1) Preparation of Solid Catalyst

A solid catalyst was prepared in the same manner as in Example 1 except that 63 mg of the metallocene compound L was used instead of 69 mg of the metallocene compound A.

(2) Production of Ethylene-1-Butene Copolymer

An ethylene-1-butene copolymer was produced in the same manner as in Example 1 except that 23 mg of the solid catalyst obtained in (1) Preparation of Solid Catalyst of the above Comparative Example C5 was used, 34 ml of hydrogen was introduced at normal pressure, and the polymerization time was changed to 60 minutes.

As a result, 10.1 g of an ethylene-1-butene copolymer was formed. MFR of the resulting copolymer was 0.71 g/10 minutes. Polymerization conditions are summarized in Table 14 and Polymerization results are summarized in Table 15.

TABLE 14

| Example | Component (A) Metallocene compound | Component (A) Amount (μmol) | Component (B) Compound | Component (B) Amount (μmol) | Component (C) Compound | Component (C) Amount (mg) | Amount of solid catalyst (mg) | Polymerization conditions TEA (mmol) | Polymerization conditions Solvent |
|---|---|---|---|---|---|---|---|---|---|
| 1 | A | 0.31 | MAO | 62 | silica | 12 | 16 | 0.30 | HDPE pellets |
| 2 | A | 0.21 | MAO | 42 | silica | 9 | 11 | 0.30 | HDPE pellets |
| 3 | B | 0.29 | MAO | 58 | silica | 12 | 15 | 0.30 | HDPE pellets |
| 4 | C | 0.50 | MAO | 100 | silica | 20 | 26 | 0.30 | HDPE pellets |
| 5 | C | 0.29 | MAO | 58 | silica | 12 | 15 | 0.30 | HDPE pellets |
| C1 | D | 0.95 | MAO | 190 | silica | 38 | 49 | 0.30 | HDPE pellets |
| C2 | E | 1.94 | MAO | 388 | silica | 78 | 100 | 0.50 | heptane |
| C3 | F | 3.94 | MAO | 788 | silica | 158 | 203 | 0.30 | HDPE pellets |
| 6 | G | 0.20 | MAO | 100 | silica | 19 | 25 | 0.63 | heptane |
| 7 | H | 0.20 | MAO | 100 | silica | 19 | 25 | 0.63 | heptane |
| 8 | I | 0.83 | MAO | 166 | silica | 33 | 43 | 0.30 | isobutane |
| 9 | J | 0.74 | MAO | 148 | silica | 29 | 38 | 0.30 | isobutane |
| C4 | K | 1.93 | MAO | 386 | silica | 77 | 99 | 0.63 | heptane |
| C5 | L | 0.44 | MAO | 88 | silica | 18 | 23 | 0.50 | HDPE pellets |

| Example | Hydrogen $H_2/C_2$ (%) | Comonomer | Temperature (° C.) | $C_2$ partial pressure (MPa) | Polymerization Time (minute) |
|---|---|---|---|---|---|
| 1 | 0.257 | C4/C2 = 5.0 mol % | 70 | 2.0 | 30 |
| 2 | 0.228 | C4/C2 = 5.0 mol % | 70 | 2.0 | 34 |
| 3 | 0.051 | C4/C2 = 5.0 mol % | 70 | 2.0 | 60 |
| 4 | 0.179 | C4/C2 = 5.0 mol % | 70 | 2.0 | 30 |
| 5 | 0.283 | C4/C2 = 5.0 mol % | 70 | 2.0 | 30 |
| C1 | 0.186 | C4/C2 = 5.0 mol % | 70 | 2.0 | 60 |
| C2 | 0.279 | C4/C2 = 5.0 mol % | 75 | 1.4 | 60 |
| C3 | 0.041 | C4/C2 = 5.0 mol % | 70 | 2.0 | 60 |
| 6 | 0.151 | C4/C2 = 5.0 mol % | 75 | 1.4 | 60 |
| 7 | 0.152 | C4/C2 = 5.0 mol % | 75 | 1.4 | 60 |
| 8 | 0.364 | C4/100 ml initial charging | 75 | 1.4 | 60 |
| 9 | 0.124 | C4/100 ml initial charging | 75 | 1.4 | 60 |
| C4 | 0.158 | C4/C2 = 5.0 mol % | 75 | 1.4 | 60 |
| C5 | 0.085 | C4/C2 = 5.0 mol % | 70 | 2.0 | 60 |

TABLE 15

Results

| Example | Yield (g) | Activity per solid catalyst (g-PE/g-Cat/hr) | Activity per complex (g-PE/μmol-Zr/hr) | MFR (g/10 minutes) | FR | Mw × $10^4$ | Mw/Mn | $g_a'$ value | $g_b'$ value |
|---|---|---|---|---|---|---|---|---|---|
| 1 | 32.7 | 4088 | 211 | 4.15 | 12.5 | 5.6 | 3.4 | 0.78 | −(0.59) |
| 2 | 31.4 | 5037 | 264 | 0.62 | 18.6 | 6.9 | 3.5 | 0.79 | −(0.57) |
| 3 | 18.1 | 1207 | 62 | No flow | — | 12.0 | 3.6 | 0.84 | −(0.62) |
| 4 | 29.5 | 2269 | 118 | 0.16 | 20.8 | 8.2 | 3.5 | 0.78 | −(0.52) |
| 5 | 32.0 | 4267 | 221 | 1.00 | 15.2 | 6.5 | 3.5 | 0.78 | −(0.53) |
| C1 | 10.8 | 220 | 11 | 4.60 | 11.4 | 6.4 | 3.9 | 0.73 | −(0.50) |
| C2 | 11.6 | 116 | 6 | 0.53 | 19.3 | 7.4 | 4.4 | 0.86 | −(0.61) |
| C3 | 24.2 | 119 | 6 | 0.27 | 17.6 | 9.7 | 3.6 | 0.86 | −(0.58) |
| 6 | 11.5 | 460 | 58 | 1.62 | 9.5 | 8.7 | 3.3 | 0.91 | 0.57 |
| 7 | 15.9 | 636 | 80 | 0.78 | 12.8 | 10.5 | 3.4 | 0.91 | 0.58 |
| 8 | 42.2 | 993 | 51 | 0.34 | 22.2 | 11.6 | 5.9 | 0.82 | 0.44 |
| 9 | 246.0 | 6560 | 332 | No flow | — | 15.3 | 2.4 | 0.94 | 0.64 |

TABLE 15-continued

| | | Results | | | | | | | |
|---|---|---|---|---|---|---|---|---|---|
| | Yield | Activity per solid catalyst | Activity per complex | MFR | | Mw × | | g' | |
| Example | (g) | (g-PE/g-Cat/hr) | (g-PE/μmol-Zr/hr) | (g/10 minutes) | FR | $10^4$ | Mw/Mn | $g_a'$ value | $g_b'$ value |
| C4 | 5.9 | 60 | 3 | 0.27 | 18.6 | 10.9 | 5.4 | 0.88 | –(0.57) |
| C5 | 10.1 | 439 | 23 | 0.71 | 13.5 | 7.6 | 2.9 | 0.85 | –(0.63) |

With regard to the description of the g' values, "–" was described in the case where any reliable $g_b'$ value was not obtained. Moreover, in the case where the minimum value of g' was present between log M=5 and log M=6, the minimum value was described in parentheses in the column of $g_b'$.

4. Evaluation

From Table 15, in Examples 1 to 9, polymerization activity was higher than that in Comparative Examples C1 to C5 and a decrease of g' was observed equally or more remarkably as compared to Comparative Examples, so that it was revealed that ethylene-based polymers having long-chain branches introduced therein were obtained with high productivity. Particularly, in Examples 1, 2, 4, 5, and 9 where four substituents were present on the cyclopentadienyl ring and a substituent was present at the 3-position of the indenyl ring, polymerization activity is remarkably high. Moreover, in Example 8 where three substituents were present on the cyclopentadienyl ring and a substituent was present at the 3-position of the indenyl ring, a decrease of g' was large while high activity was still maintained and thus there was revealed a tendency that an ethylene-based polymer having excellent long-chain branches introduced therein was obtained with high productivity.

While the present invention has been described in detail and with reference to specific embodiments thereof, it will be apparent to one skilled in the art that various changes and modifications can be made therein without departing from the spirit and scope thereof. The present application is based on Japanese Patent Application No. 2016-51152 filed on Mar. 15, 2016, and the contents are incorporated herein by reference.

The invention claimed is:

1. A metallocene compound represented by the following formula (3):

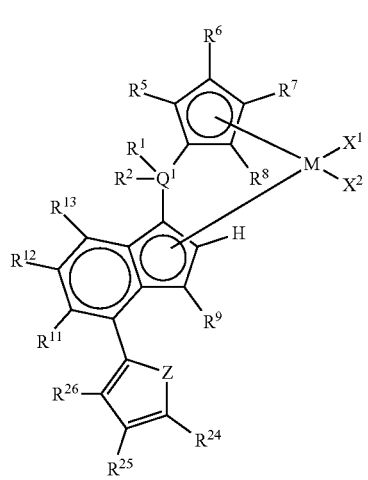

(3)

wherein M represents any transition metal of Ti, Zr, and Hf; $X^1$ and $X^2$ each independently represents a hydrogen atom, a halogen, a hydrocarbon group having a carbon number of 1 to 20, an oxygen or nitrogen-containing hydrocarbon group having a carbon number of 1 to 20, an amino group substituted with a hydrocarbon group having a carbon number of 1 to 20, or an alkoxy group having a carbon number of 1 to 20; $Q^1$ represents a carbon atom, a silicon atom, or a germanium atom; $R^1$ and $R^2$ each independently represents a hydrogen atom or a hydrocarbon group having a carbon number of 1 to 10, and optionally form a ring together with $Q^1$ bonded thereto; $R^5$, $R^6$, $R^7$, and $R^8$ represent a methyl group, $R^9$ represents a hydrocarbon group having a carbon number of 1 to 6, $R^{11}$, $R^{12}$, and $R^{13}$ each independently represents a hydrogen atom; Z represents an oxygen atom or a sulfur atom; $R^{24}$, $R^{25}$, and $R^{26}$ each independently represents a hydrogen atom, a hydrocarbon group having a carbon number of 1 to 20, a silicon-containing hydrocarbon group having a carbon number of 1 to 18, which contains a silicon number of 1 to 6, a halogen—containing hydrocarbon group having a carbon number of 1 to 20, an oxygen, sulfur, or nitrogen—containing hydrocarbon group having a carbon number of 1 to 20, or a silyl group substituted with a hydrocarbon group having a carbon number of 1 to 20, and adjacent substituents of $R^{24}$, $R^{25}$, and $R^{26}$ optionally form a ring together with the carbon atoms to which they are bonded.

2. The metallocene compound according to claim 1, wherein M is Zr or Hf in the above formula (3).

3. The metallocene compound according to claim 1, wherein M is Zr in the above formula (3).

4. The metallocene compound according to claim 1, wherein $R^9$ is a methyl group in the above formula (3).

5. A catalyst component for olefin polymerization, comprising the metallocene compound according to claim 1.

6. A catalyst for olefin polymerization, comprising the metallocene compound according to claim 1.

7. A catalyst for olefin polymerization, comprising the following essential components (A), (B) and (C):

Component (A): the metallocene compound according to claim 1,

Component (B): a compound reacting with the metallocene compound of the component (A) to form a cationic metallocene compound, and Component (C): a fine particle carrier.

8. The catalyst for olefin polymerization according to claim 7, wherein the component (B) is an aluminoxane.

9. The catalyst for olefin polymerization according to claim 7, wherein the component (C) is silica.

10. The catalyst for olefin polymerization according to claim 7, which further comprises the following component (D):

Component (D): an organoaluminum compound.

11. A method for producing an olefin-based polymer, comprising polymerizing an olefin in the presence of the catalyst for olefin polymerization according to claim 6.

12. The method for producing an olefin-based polymer according to claim 11, wherein the olefin comprises at least ethylene.

13. The method for producing an olefin-based polymer according to claim 12, wherein the olefin-based polymer is an ethylene-based polymer.

* * * * *